United States Patent
Kochi et al.

(10) Patent No.: US 7,206,080 B2
(45) Date of Patent: Apr. 17, 2007

(54) SURFACE SHAPE MEASUREMENT APPARATUS, SURFACE SHAPE MEASUREMENT METHOD, SURFACE STATE GRAPHIC APPARATUS

(75) Inventors: Nobuo Kochi, Tokyo (JP); Hitoshi Otani, Tokyo (JP); Satoru Niimura, Tokyo (JP)

(73) Assignee: Topcon Corporation, Tokyo (JP)

( * ) Notice: Subject to any disclaimer, the term of this patent is extended or adjusted under 35 U.S.C. 154(b) by 264 days.

(21) Appl. No.: 10/485,276

(22) PCT Filed: Jul. 30, 2002

(86) PCT No.: PCT/JP02/07710

§ 371 (c)(1),
(2), (4) Date: May 26, 2004

(87) PCT Pub. No.: WO03/012368

PCT Pub. Date: Feb. 13, 2003

(65) Prior Publication Data

US 2004/0234122 A1    Nov. 25, 2004

(30) Foreign Application Priority Data

Jul. 30, 2001  (JP) .............................. 2001-230368
Aug. 2, 2001   (JP) .............................. 2001-234644
Aug. 28, 2001  (JP) .............................. 2001-257832

(51) Int. Cl.
   G01B 11/24   (2006.01)
   G01B 11/30   (2006.01)
(52) U.S. Cl. .................................................. 356/611
(58) Field of Classification Search ........ 356/601–613, 356/2, 243.1, 247; 382/154; 250/558
See application file for complete search history.

(56) References Cited

U.S. PATENT DOCUMENTS

| | | | | |
|---|---|---|---|---|
| 4,993,836 A | * | 2/1991 | Furuhashi et al. | 356/611 |
| 5,495,330 A | * | 2/1996 | Champaneri et al. | 356/240.1 |
| 5,563,703 A | * | 10/1996 | Lebeau et al. | 356/237.5 |
| 5,774,589 A | * | 6/1998 | Aritake et al. | 382/232 |
| 5,793,493 A | * | 8/1998 | Lane | 356/613 |
| 5,852,672 A | * | 12/1998 | Lu | 382/154 |
| 5,909,285 A | * | 6/1999 | Beaty et al. | 356/394 |
| 5,911,126 A | * | 6/1999 | Massen | 702/153 |
| 6,055,054 A | * | 4/2000 | Beaty et al. | 356/601 |
| 2005/0117215 A1 | * | 6/2005 | Lange | 359/462 |

FOREIGN PATENT DOCUMENTS

JP           9-081790 A           3/1997

(Continued)

*Primary Examiner*—Gregory J. Toatley, Jr.
*Assistant Examiner*—Isiaka O. Akanbi
(74) *Attorney, Agent, or Firm*—Foley & Lardner LLP

(57) ABSTRACT

A surface shape measuring apparatus, comprising: a stereo-photographing part 3 for photographing an object 1 in stereo; a relative position changing part 4 for changing the positional relation between the stereo-photographing part 3 and the object 1; means 5 for storing stereo-photographing parameters in a plurality of directions from which the stereo-photographing part 3 photographs the object 1; a stereo-image generating means 6 for controlling the stereo-photographing part 3 to photograph the object 1 from the plurality of directions with the stored stereo-photographing parameters and generating stereo images of the object 1; and a surface shape processing means 7 for measuring the surface shape of the object 1 based on the stereo images of the object 1.

12 Claims, 39 Drawing Sheets

FOREIGN PATENT DOCUMENTS

| | | |
|---|---|---|
| JP | 9-119819 A | 5/1997 |
| JP | 10-091790 A | 4/1998 |
| JP | 10-221036 A | 8/1998 |
| JP | 11-096374 A | 4/1999 |
| JP | 11-161794 A | 6/1999 |
| JP | 2000-339467 A | 12/2000 |
| JP | 2001-197521 A | 7/2001 |

* cited by examiner

FIG.3
(A)
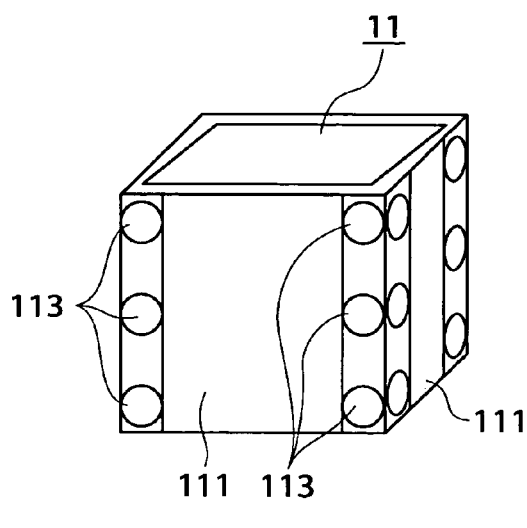
(B)
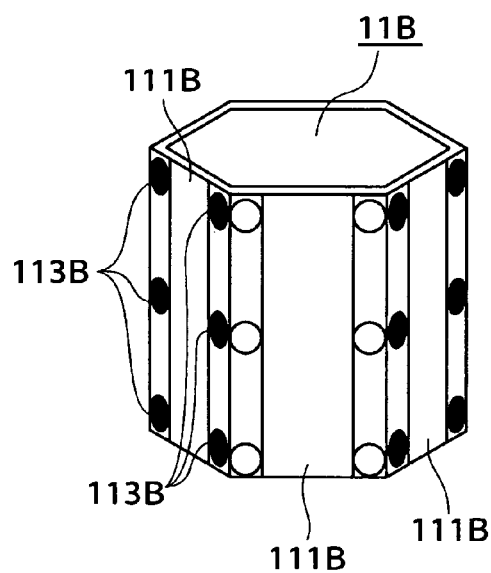
(C)
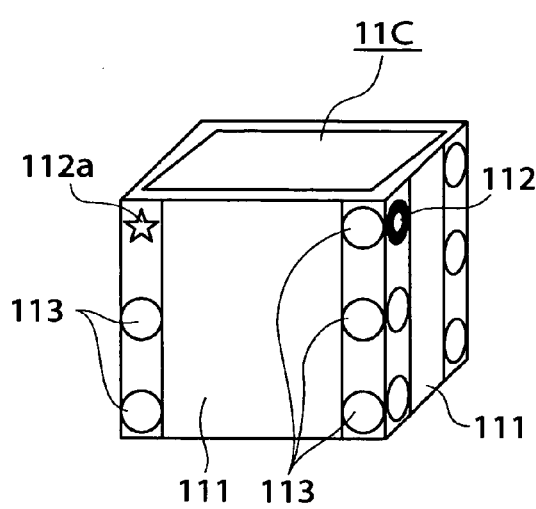
(D)
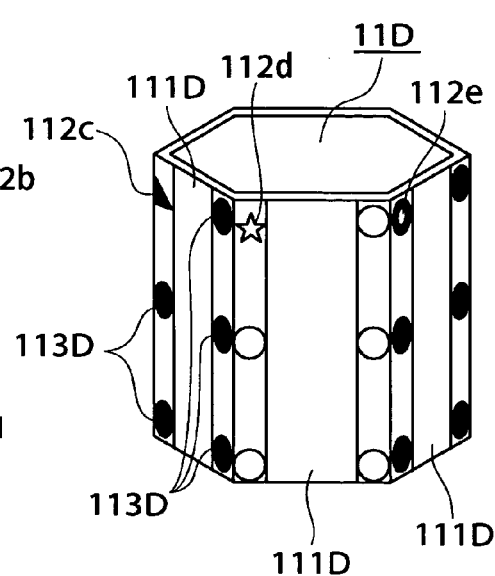

FIG.4
(A)
(A1) (A2) (A3)
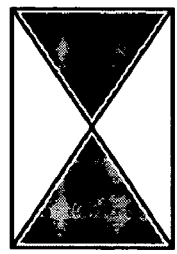 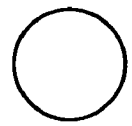 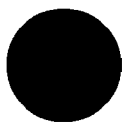
(B)
(B1) (B2) (B3)
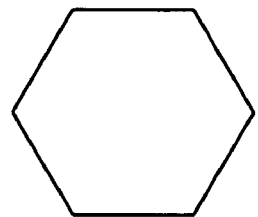 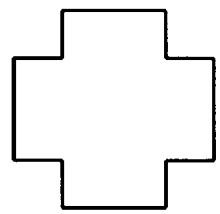 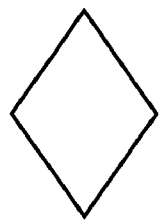
(B4) (B5) (B6)
1       2       3
(B7) (B8) (B9)
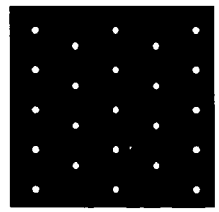 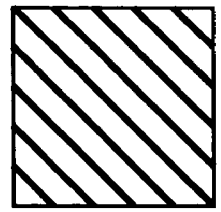 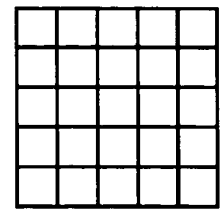

Flow of measuring process

Left image         Right image

Measurement flow

FIG.16
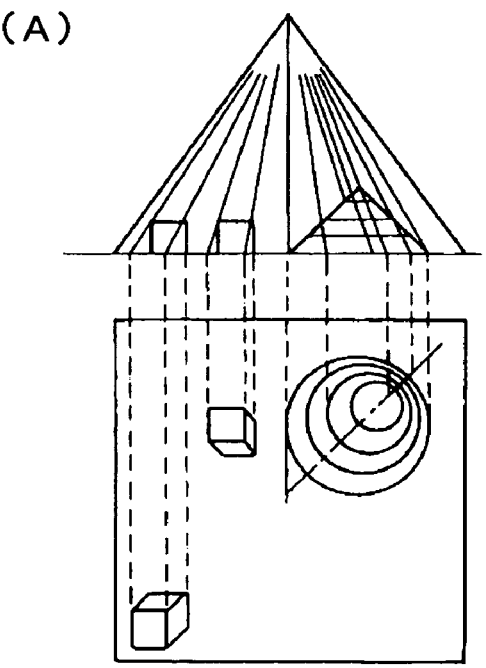
Central projection image
(photograph)
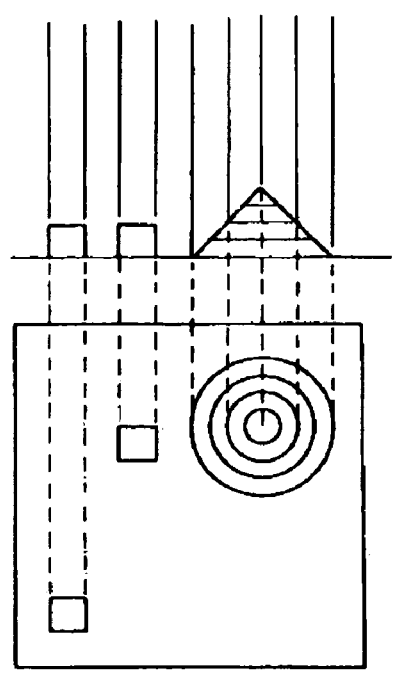
Orthogonal projection image

FIG.20
(A)
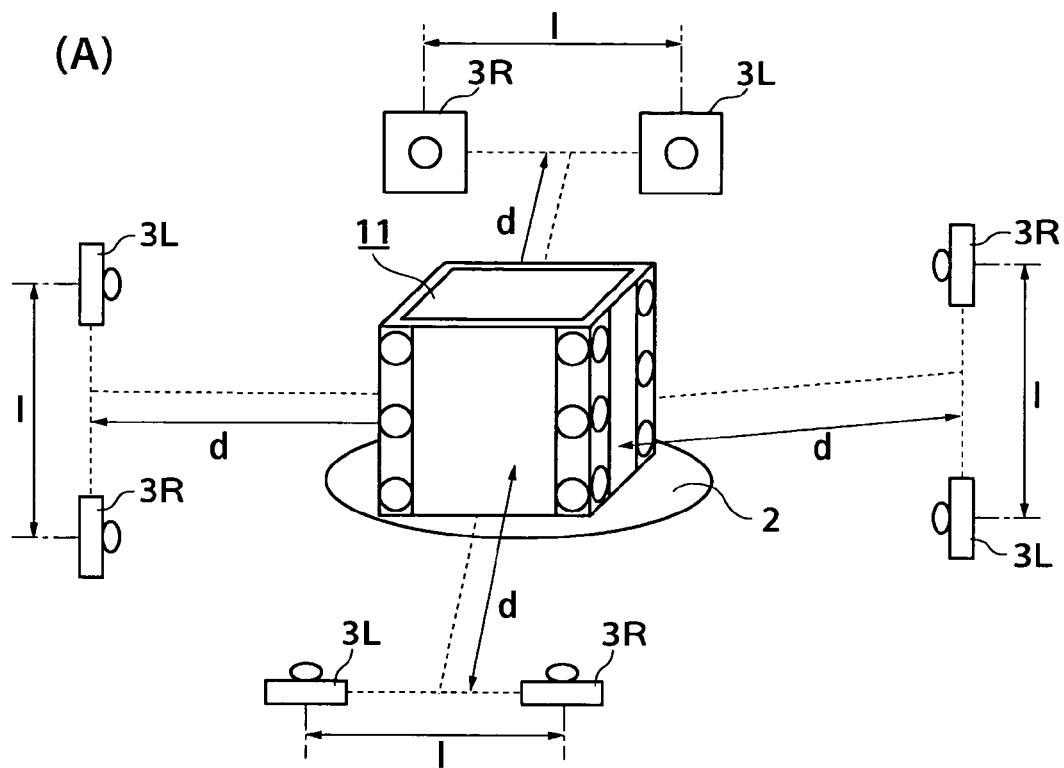
(B)
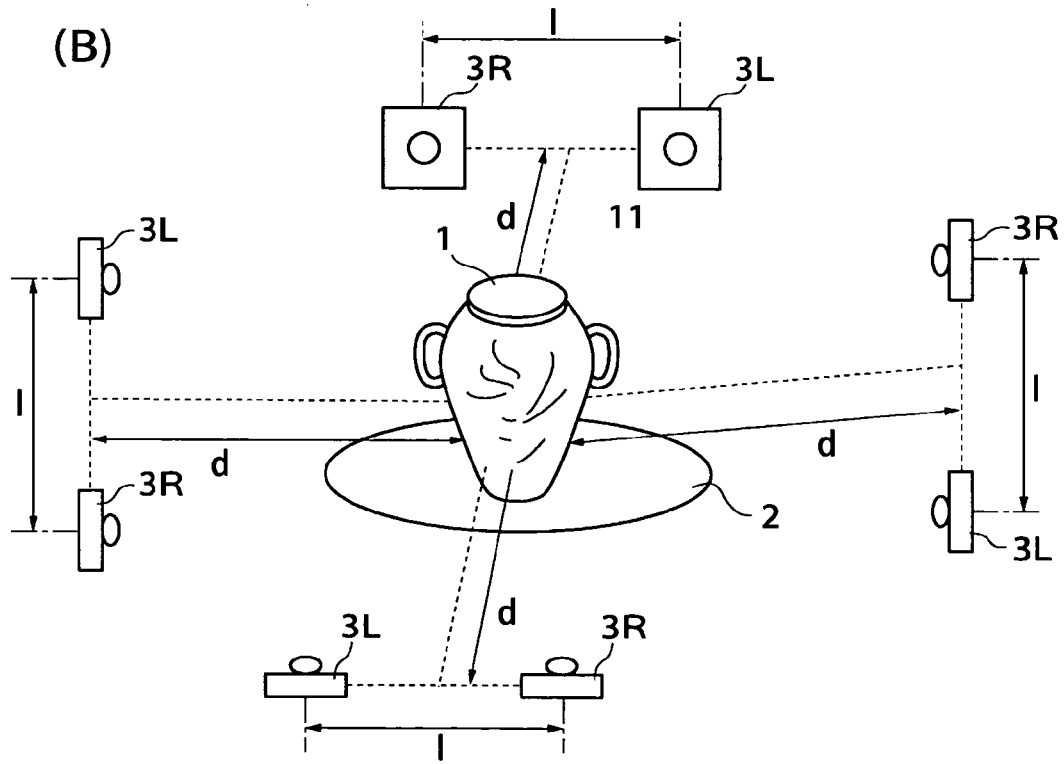

FIG.24
(A)
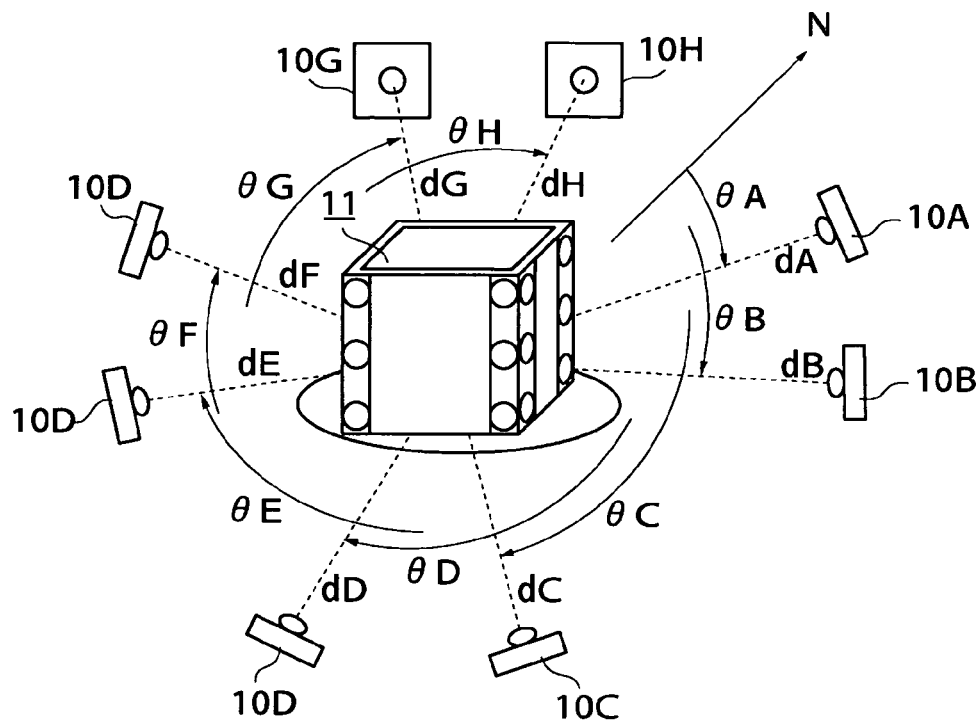
(B)
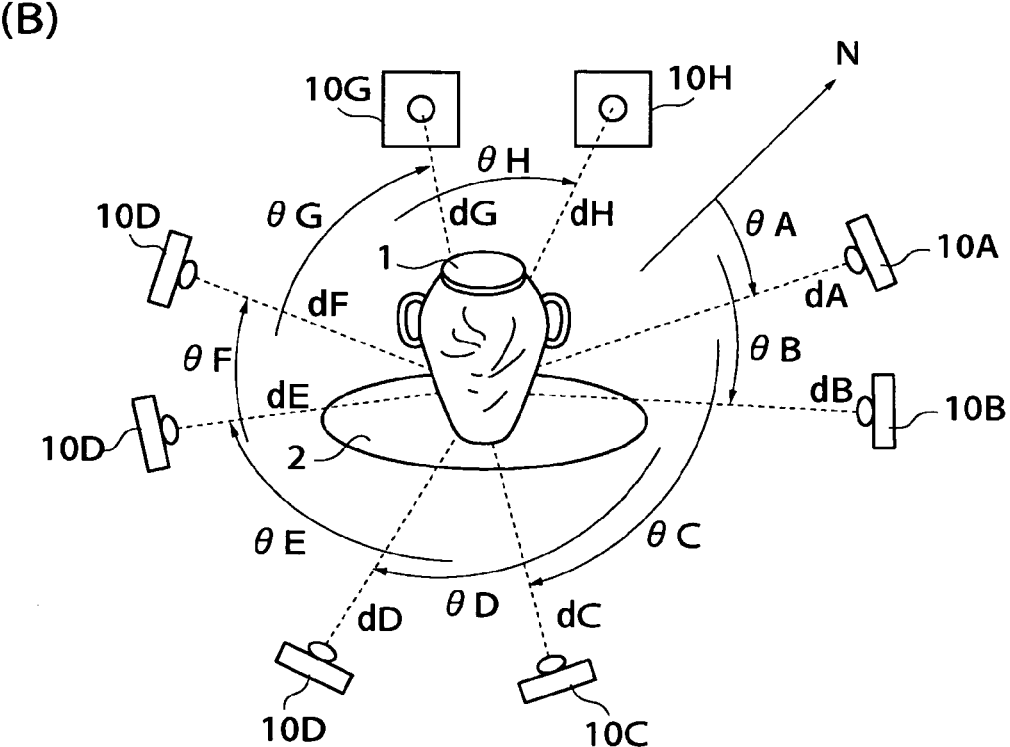

Measurement flow

FIG.34
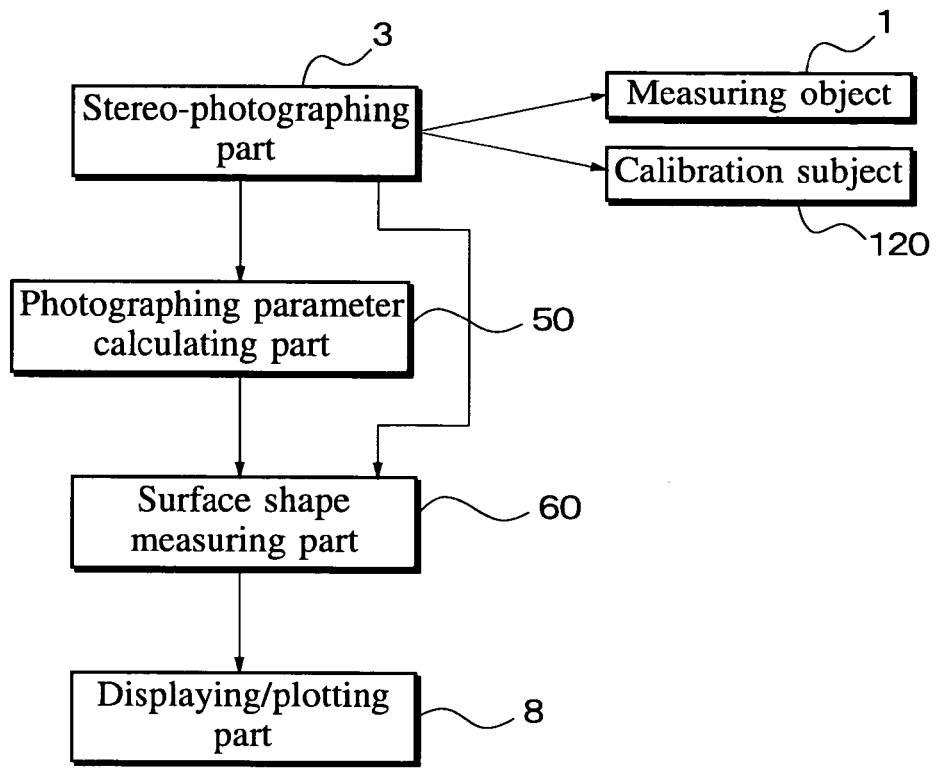
FIG.35
(A)
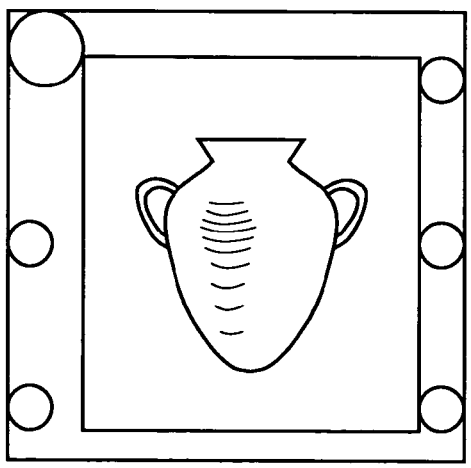
(B)
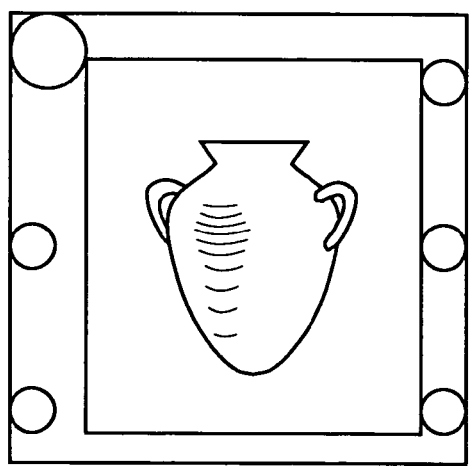

FIG.36
(A)
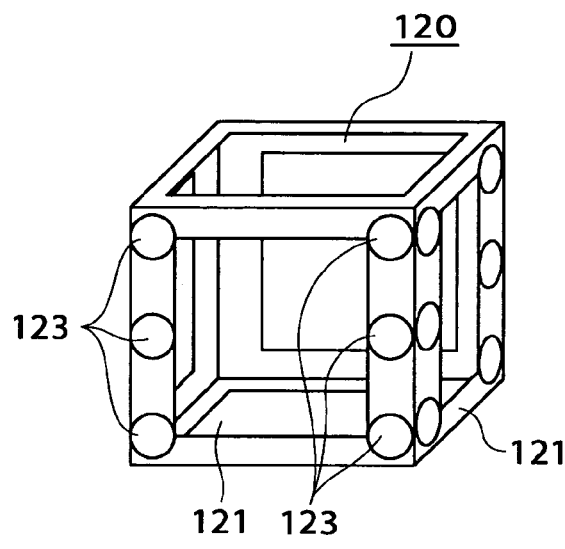
(B)
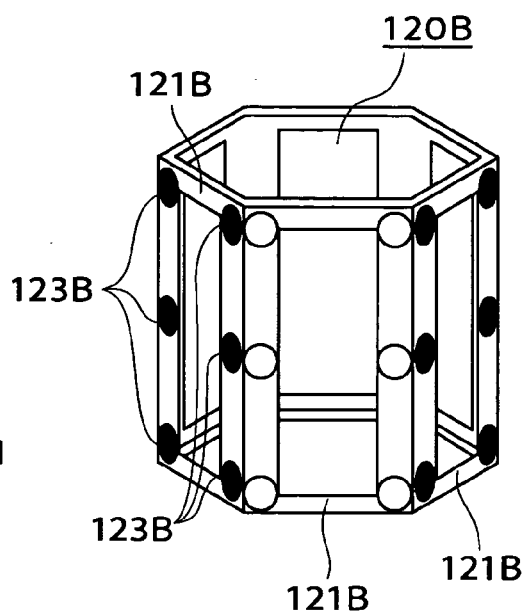
(C)
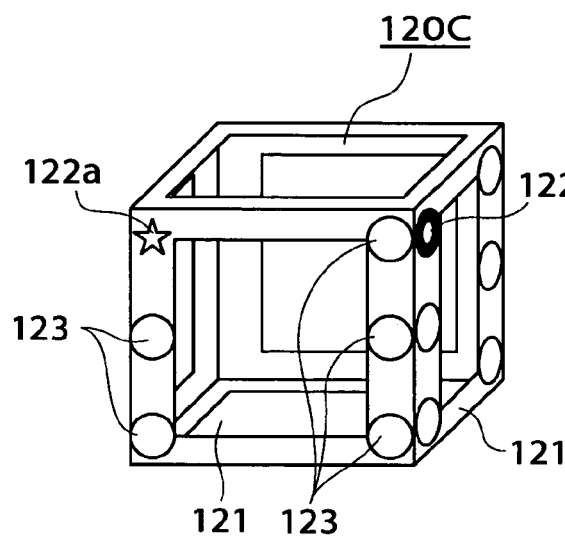
(D)
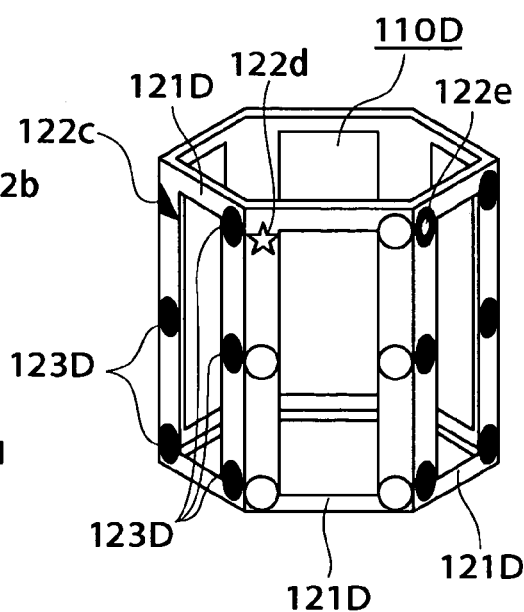

Flow of measuring process

FIG.46
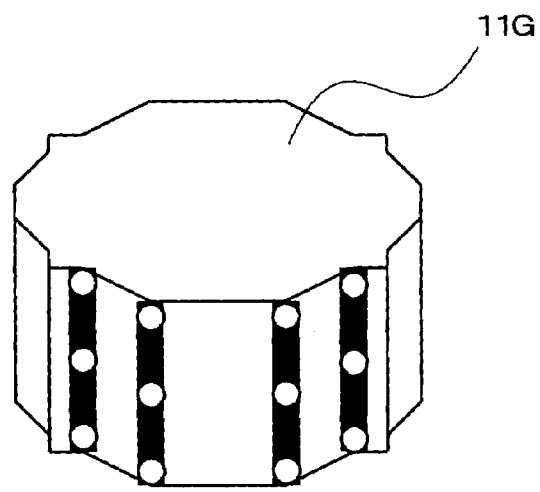
FIG.47
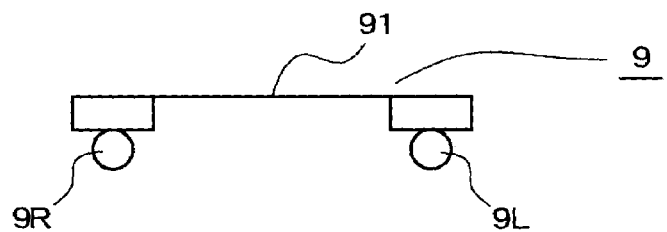
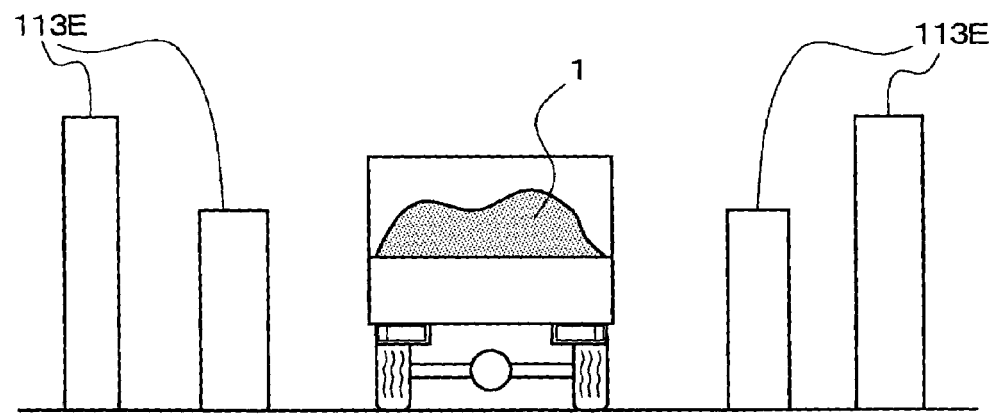

SURFACE SHAPE MEASUREMENT APPARATUS, SURFACE SHAPE MEASUREMENT METHOD, SURFACE STATE GRAPHIC APPARATUS

TECHNICAL FIELD

This invention relates to an apparatus and a method for three-dimensionally measuring the surface shape or pattern of a trove, human body, vehicle, machine structure or the like in a non-contact manner. This invention also relates to a surface shape plotting apparatus for plotting the surface shape or pattern of a trove or the like measured with the surface shape measuring apparatus.

BACKGROUND ART

To measure the surface shape of a trove such as a clay pot, a person makes a sketch of it, measuring it with a ruler or the like, or a contact type measuring instrument which measures the surface shape of the object by tracing the contour of the object is used. A non-contact type measuring instrument which photographs the object using a slit light source or measures the object using a laser beam is also used.

In clothing stores, salespeople measure the body size of customers with tape measures to determine the size of clothing items which suit them best. In the case of a vehicle or a machine structure, a surface shape measuring apparatus is used to check a prototype in designing, to check the products before shipment, or to determine the replacement timing of parts at periodic inspections.

However, the equipment cost is high to measure the surface shape of a trove with a conventional contact or non-contact type measuring instrument. In the field of archeology, the surface state of a trove such as the patterns on its surface has to be plotted as images. However, it is difficult for the conventional system to plot the images precisely. More specifically, there are following problems, depending upon the way of measuring.
1) It takes significant time and effort for a person to measure the patterns and make a sketch of them. Although the work requires many skills, the results differ between individuals. Also, it is difficult to get high accuracy in dimension and shape.
2) In the case of a contact type measuring instrument, it takes long time to trace the surface of a trove as a measuring object. Also, after the measurement, an operator has to observe the characteristics on the surface of the trove and make a drawing of them.
3) With a non-contact type measuring instrument using a slit right or a laser beam, the surface of the trove can be measured in a non-contact manner. However, in plotting the surface shape or pattern, an operator has to plot it, comparing the real surface shape or pattern with the measurement data. Thus, the drawing is less accurate in the positional relation of the surface shape or pattern than the measurement data.
4) There is a problem common to the above cases 1) to 3). Since the drawing is made from an archeological point of view, the correctness of the drawing cannot be judged without comparing with a photograph of the object.
5) When a buried cultural property is found in a public work site, or civil engineering or construction work site, archeological survey is conducted. When the survey takes a long time, the interruption of the work is prolonged and the period of construction is prolonged. Thus, shortening of the archeological survey period is highly demanded by constructors. Speeding-up the plotting of buried cultural properties will significantly contribute to the public interest.

In the case of human bodies, there are many customers who don't want to have their body size measured by a salesperson. It may be a good idea to install a non-contact type measuring instrument for measuring the surface shape of a human body in retail shops. However, such a system has not been widely adopted since it causes a problem regarding privacy of the customers and requires the shops to invest a large amount of money.

In the case of a vehicle or machine structure, a large scale apparatus for measuring the surface shape is required and the measurement takes a long time. Especially, in checking products before shipment, a delay in the check affects the delivery date of the products to the customers. In periodic inspections, if the measurement cannot be quickly performed within a given period, the influence on the operation of the equipment will be significant at the customers.

In earth volume measurement, there are following problems.
1) It takes time and effort to smooth the earth. Also it is difficult to get high accuracy.
2) To measure the entire surface with a electro-optical distance measuring instrument or an ultrasonic distance measuring instrument is not practical because it takes a long time. Only a part of the earth surface is measured in some cases to shorten the measurement time, but it is difficult to get high accuracy.
3) When a GPS (Global Positioning System) is used, an operator must carry a GPS terminal. It is troublesome to the operator.

The first object of the present invention is to solve the above problems and to provide an apparatus and method with which the surface shape or pattern of a measuring object such as a trove or human body can be measured quickly. The second object of this invention is to provide a surface shape plotting apparatus which can make a precise drawing of the surface shape or pattern of a trove or the like measured with the surface shape measuring apparatus.

DISCLOSURE OF THE INVENTION

The surface shape measuring apparatus of the first invention, which accomplished the first object, comprises, as shown in FIG. 1, a stereo-photographing unit 90 for photographing an object 1 in stereo; a relative position changing part 4 for changing the positional relation between the stereo-photographing unit 90 and the object 1; a parameter storing part 5 for storing stereo-photographing parameters in a plurality of directions from which the stereo-photographing unit 90 photographs the object 1; a stereo-image generating part 6 for controlling the stereo-photographing unit 90 to photograph the object 1 from the plurality of directions with the stored stereo-photographing parameters and generating stereo images of the object 1; and a surface shape processing part 7 for measuring the surface shape of the object 1 based on the stereo images of the object 1.

In an apparatus constituted as described above, the object 1 is placed in a position to be photographed by the stereo-photographing unit 90, and the positional relation is relatively changed by the relative position changing part 4 so that the object 1 can be photographed from a plurality of directions. Since the object 1 is photographed from a plurality of directions, a wider range of surface shape of the object 1 can be measured than when it is photographed from one direction. Since the stereo-photographing parameters in specified photographing directions are stored in advance, the surface shape can be precisely measured even if the object 1 and the stereo-photographing unit 90 are not positioned precisely.

Preferably, the relative position changing part 4 has a stage 2 for changing the position of the stereo-photographing unit 90 or the position of the object 1. It is recommendable that the object 1 is placed in a specified position on the stage 2. When the relative position changing part 4 is configured to make a relative displacement in the same directions as the plurality of directions with calculated stereo-photographing parameters when the stereo-photographing unit 90 photographs the object 1, the surface shape of the object 1 can be measured precisely using the stereo-photographing parameters.

Preferably, the parameter storing part 5 stores stereo-photographing parameters obtained by the steps of placing a calibration subject 11 on which reference points are three-dimensionally arranged in a position where the object 1 is to be placed, setting the relative position changing part 4 so that the stereo-photographing unit 90 is pointed in a direction to photograph the calibration subject 11, photographing the calibration subject 11 with the stereo-photographing unit 90, and calculating the stereo-photographing parameters based on the photographed stereo images of the calibration subject 11. Since the positions of the reference points on the calibration subject 11 are known precisely, the stereo-photographing parameters can be calculated precisely.

Preferably, the parameter storing part 5 stores parameters calculated by comparing the position of reference points on the calibration subject 11 stored in advance with positions of reference points calculated based on the stereo images of the reference points on the calibration subject 11 photographed by the stereo-photographing unit 90.

Preferably, the stereo-photographing parameters include at least one of the baseline length, photographing position and tilt of the stereo-photographing unit 90 in the direction from which the photographing unit 90 photographs the object 1. The stereo-photographing parameters are parameters used to convert a pair of images photographed by the stereo-photographing unit 90 into rectified images. Since the rectified images can be stereoscopically viewed, the unevenness on the surface of the object 1 can be precisely calculated based on the parallax difference between the stereo images. Preferably, the stereo-photographing unit 90 has two imaging devices 9R and 9L attached to an imaging device fixing body 91 in parallel to each other at a specified distance "l" apart from each other. Since the stereo-photographing unit 90 has two imaging devices, stereo images of an object can be photographed simultaneously. This is advantageous when the number of objects is large and the work to measure the surface shapes of them is large, or when stereo images cannot be obtained unless they are photographed simultaneously since the object vibrates or moves.

The surface shape measuring apparatus of the second invention, which accomplishes the first object, comprises, as shown in FIG. 17, a stereo-photographing unit 90 for photographing an object 1 in stereo; a relative position changing part 4 for changing the positional relation between the stereo-photographing unit 90 and the object 1; a stereo-photographing direction control part 12 for controlling the relative position changing part 4 so that the stereo-photographing unit 90 can photograph the object 1 from at least three directions to obtain stereo images of primary peripheral surfaces of the object 1; a parameter storing part 5 for storing stereo-photographing parameters in directions which are determined by the stereo-photographing direction control part 12 and from which the stereo-photographing unit 90 photographs the object; a stereo-image generating part 6 for controlling the stereo-photographing unit 90 to photograph the object 1 from the plurality of directions and generating stereo images of the object 1 in the photographing directions; and a surface shape processing part 7 for composing the stereo images of the object 1 in directions determined by the stereo-photographing direction control part 12 and measuring the surface shape of primary peripheral surfaces of the object 1.

In an apparatus constituted as described above, the function of measuring the surface shape of the primary peripheral surfaces of the object is accomplished by activating the relative position changing part 4 based on control of the stereo-photographing control part 12 so that the stereo-photographing unit 90 can photograph the object 1 in stereo from at least three directions and obtaining stereo images of the primary peripheral surfaces of the object. With stereo images photographed from one direction, only a limited range of the surface shape of the object 1 can be measured. However, when stereo images are photographed from at least three directions, the surface shape can be measured over most of the circumference of the object 1.

The surface shape measuring apparatus of the third invention, which accomplishes the first object, comprises, as shown in FIG. 18, an imaging device 10 for photographing an object 1; a relative position changing part 4 for changing the positional relation between the imaging device 10 and the object 1; a stereo-photographing control part 9 for controlling the relative position changing part 4 so that the imaging device 10 can photograph the object 1 from stereo-photographing directions including a pair of right and left photographing directions; a parameter storing part 5 for storing stereo-photographing parameters in a plurality of stereo-directions from which the imaging device 10 photographs the object 1; a stereo image generating part 6 for controlling the imaging device 10 to photograph the object 1 from the plurality of stereo-photographing directions with calculated photographing-parameters and generating stereo images of the object 1; and a surface shape processing part 7 for measuring the surface shape of the object based on the stereo images of the object 1.

In an apparatus constituted as described above, the function of photographing stereo images of an object is accomplished by one imaging device 10 and the stereo-photographing control part 9. Since the number of imaging devices is smaller than that of imaging devices of the stereo-photographing unit 90 in the first invention, the equipment cost can be reduced. This is advantageous when the number of the objects 1 is small.

Preferably, the relative position changing part 4 has a stage for changing the position of the imaging device 10 or the position of the object 1. Also, when the relative position changing part 4 is configured to make a relative displacement in the same directions as the plurality of directions with calculated stereo-photographing parameters when the imaging device photographs the object 1, the surface shape of the object 1 can be measured precisely using the stereo-photographing parameters.

Preferably, the parameter storing part 5 stores stereo-photographing parameters obtained by the steps of placing a calibration subject 11 on which reference points are three-dimensionally arranged in a position where the object 1 is to be placed, controlling the relative position changing part 4 so that the imaging device 10 can photograph the calibration subject 11 from the right or left photographing directions, photographing the calibration subject 11 with the imaging device 10, and calculating the stereo-photographing parameters of the imaging device 10 based on stereo images of the calibration subject 11 photographed from the right and left photographing directions.

Preferably, the parameter storing part 5 stores parameters calculated by comparing the position of reference points on the calibration subject 11 stored in advance with positions of reference points calculated from stereo images of the reference points on the calibration subject 11 photographed from the right and left photographing directions by the imaging device 10.

Preferably, the stereo-photographing parameters include at least one of the baseline length between the positions where the imaging device 10 photographs the object 1, the photographing positions of the imaging device 10, and the tilt of the imaging device 10 in the right and left photographing directions. The unevenness on the surface of the object 1 can be precisely calculated based on the parallax difference between the stereo images.

The surface shape measuring apparatus of the fourth invention, which accomplishes the first object, comprises, as shown in FIG. 19, an imaging device 10 for photographing an object 1; a relative position changing part 4 for changing the positional relation between the imaging device 10 and the object 1; a stereo-photographing control part 9 for controlling the relative position changing part 4 so that the imaging device 10 can photograph the object 1 from stereo-photographing directions including a pair of right and left photographing directions; a primary peripheral surface photographing direction control part 13 for controlling the stereo-photographing control part 9 so that the imaging device 10 can photograph the object 1 in stereo from at least three directions to obtain stereo images of primary peripheral surfaces of the object 1; a parameter storing part 5 for storing stereo-photographing parameters in stereo-photographing directions from which the imaging device 10 photographs the object 1; a stereo-image generating part 6 for controlling the imaging device 10 to photograph the object 1 from directions determined by the primary peripheral surface photographing direction control part 13 and having calculated stereo-photographing parameters, and generating stereo images of the object 1; and a surface shape processing part 7 for composing the stereo images of the object in directions determined by the stereo-photographing direction control part and measuring the surface shape of primary peripheral surfaces of the object 1.

Preferably, the surface shape measuring apparatuses of the first and second inventions further comprise an orthogonal projection image producing part for producing an orthogonal projection image of the object 1 from stereo images of the object 1 photographed by the stereo-photographing unit 90. Preferably, the surface shape measuring apparatuses of the third and fourth inventions further comprise an orthogonal projection image producing part for producing an orthogonal projection image of the object 1 from stereo images of the object 1 photographed by the stereo-photographing control part 9 and the imaging device. 10. Preferably, in producing an orthogonal projection image of the object 1, the surface shape of the object 1 measured by the surface shape processing part 7 is taken into account. By reconstructing stereo images into an orthogonal projection image based on the measurement data of the surface shape of the object 1, an image with precise dimensions can be produced from real photographed images. Even when such an image is not produced, since an orthogonal projection image is accurate in dimensions, it can be used to judge the real conditions and is highly useful. When orthogonal projection images are stored in a database as data of the surface shapes of objects, they are valuable as materials. Image processing may be performed on the orthogonal projection image to extract characteristics or to sharpen the stereo images.

The surface shape measuring method of the fifth invention, which accomplishes the first object, comprises, as shown in FIG. 7 and FIG. 8, the steps of placing a calibration subject 11 on which reference points are three-dimensionally arranged in a position where an object 1 is to be placed (S10) and setting one of the stereo-photographing unit 90 or the calibration subject 11 in a specified direction from which a stereo-photographing unit 90 photographs the calibration subject 11 (S20); photographing the calibration subject 11 with the stereo-photographing unit 90 (S30); and calculating stereo-photographing parameters based on the photographed stereo images of the calibration subject 11 (S40 and S48). Preferably, the calculated stereo-photographing parameters are stored. Then, the method further comprises, as shown in FIG. 12 and FIG. 13, the steps of photographing the object 1 from a plurality of directions having calculated photographing parameters (S70) with the stereo-photographing unit 90 (S80); producing stereo images of the object 1 from the photographed images using the stereo-photographing parameters (S100 and S101); and measuring the surface shape of the object 1 based on the stereo images of the object 1 (S102).

The surface shape measuring method of the sixth invention, which accomplishes the first object, comprises, as shown in FIG. 7 and FIG. 8, the steps of placing a calibration subject 11 on which reference points are three-dimensionally arranged in a position where the object 1 is to be placed (S10); setting the direction from which an imaging device 10 photographs the calibration subject 11 to right and left photographing directions as stereo-photographing directions of the imaging device 10 in sequence (S20), and photographing the calibration subject 11 from the right and left photographing directions in sequence with the imaging device 10(S30); and calculating stereo-photographing parameters based on the photographed stereo images of the calibration subject 11 (S40 and S48). Preferably, the calculated stereo-photographing parameters are stored. Then, the method further comprises, as shown in FIG. 12 and FIG. 13, the steps of photographing the object 1 from the stereo-photographing directions having calculated photographing parameters (S70) with imaging device 10 (S80); producing stereo images of the object 1 from the photographed images using the stereo-photographing parameters (S100 and S101); and measuring the surface shape of the object 1 based on the stereo images of the object 1 (S102).

The surface state plotting apparatus of the seventh invention, which accomplishes the second object, has a plotting device 8 for plotting the surface shape of an object 1 based on stereo images of the object 1 measured by the surface shape measuring apparatus of one of the first to forth inventions. Preferably, an artificial intelligence engine suitable to plot the surface shape of the object 1 is used in the plotting. For example, the object 1 is a buried cultural property, the measured surface shape can be appropriately corrected from an archeological point of view to remove scratches and extraneous matters and extract archaeologically valuable information.

The surface shape measuring apparatus of the eighth invention, which accomplishes the first object, comprises, as shown in FIG. 20 and FIG. 21, a stereo photographing part 3 having a plurality of stereo-photographing units for photographing a measuring object 1 in stereo; a parameter storing part 5 for storing stereo-photographing parameters in each of the plurality of directions from which the stereo-photographing units photograph the measuring object 1; a stereo image generating part 6 for controlling the stereo-photographing part 3 to photograph the measuring object 1 from the plurality of directions with stored stereo-photographing parameters, and generating stereo images of the measuring object 1; a surface shape processing part 7 for measuring the surface shape of the measuring object 1 based on the stereo images of the measuring object 1.

In an apparatus constituted as described above, the measuring object 1 is placed in a position to be photographed by the stereo-photographing part 3, and at least two stereo-photographing units constituting the stereo-photographing part 3 photographs the measuring object 1 in stereo from a plurality of directions. Each of the stereo-photographing units has right and left imaging devices 3R and 3L for photographing the measuring object 1 in stereo. Since the measuring object 1 is photographed in stereo from a plurality of directions, a wider range of surface shape of the object 1 can be measured than when it is photographed from one direction. Since the stereo-photographing parameters in specified photographing directions are stored in advance, the surface shape can be precisely measured even if the object 1 and the stereo-photographing unit 90 are not positioned precisely. Further, since the stereo-photographing part 3 has at least two stereo-photographing units, the measuring object 1 does not have to be rotated or the stereo-photographing units do not have to be moved and the photographing can be performed quickly when a large area of the peripheral surface of the measuring object 1 must be photographed.

Preferably, the parameter storing part 5 stores parameters obtained by the steps of placing a calibration subject 11 on which reference points are three-dimensionally arranged in a position where the measuring object 1 is to be placed, photographing the calibration subject 11 with the stereo-photographing part 3, and calculating the stereo-photographing parameters in each of the photographing directions of the stereo-photographing units based on the photographed stereo images of the calibration subject 11. Since the positions of the reference points on the calibration subject 11 are known precisely, the stereo-photographing parameters of each stereo-photographing unit can be calculated precisely.

Preferably, the parameter storing part 5 stores stereo-photographing parameters calculated by comparing the position of reference points on the calibration subject 11 stored in advance with positions of reference points calculated based on the stereo images of the reference points on the calibration subject 11 photographed by the stereo-photographing part 3. Preferably the stereo-photographing parameters include at least one of the baseline length, photographing position and tilt of each stereo-photographing unit in the photographing directions. The stereo-photographing parameters are parameters used to convert a pair of images photographed by each stereo-photographing unit into rectified images. Since the rectified images can be stereoscopically viewed, the unevenness on the surface of the measuring object 1 can be precisely calculated based on the parallax difference between the stereo images.

The surface shape measuring apparatus of the ninth invention, which accomplished the first object, comprises, as shown in FIG. 24 and FIG. 25, an imaging device group 20 having at least three imaging devices (10A, 10B, . . . , and 10H) for photographing a measuring object 1 from predetermined directions; a stereo-photographing area extracting part 21 for extracting an overlapping photographic area from images of the measuring object 1 photographed by two imaging devices of the imaging device group 20; a parameter storing part 5 for storing stereo-photographing parameters in the photographing directions of at least two pairs of imaging devices included in the imaging device group 20 which have photographed the images having an overlapping photographic area extracted by the stereo-photographing area extracting part 21; a stereo image generating part 6 for controlling the imaging devices to photograph the measuring object 1 from the photographing directions of the at least two pairs of imaging devices having calculated stereo-photographing parameters, and generating stereo images of the measuring object 1; and a surface shape processing part 7 of the surface shape of the measuring object 1 based on the stereo images of the measuring object 1.

The surface shape measuring apparatus of the tenth invention, which accomplished the first object, comprises, as shown in FIGS. 28 and 30, a stereo-photographing unit 90 having right and left imaging devices for photographing a measuring object 1 from a first photographing direction; a light path changing part 22 for changing a light path between the stereo-photographing unit 90 and the measuring object 1 so that the measuring object 1 can be photographed from a second photographing direction; a parameter storing part 5 for storing stereo-photographing parameters in the first and second photographing directions from which the stereo-photographing unit 90 photographs the measuring object 1 in stereo; a stereo image generating part 6 for controlling the stereo-photographing unit 90 to photograph the measuring object 1 from the first and second photographing directions with stored stereo-photographing parameters, and generates stereo images of the measuring object 1; and a surface shape processing part 7 for measuring the surface shape of the measuring object 1 based on the stereo images of the measuring object 1.

Preferably, the surface shape measuring apparatuses of the eighth to tenth invention further comprise an orthogonal projection image producing part for producing an orthogonal projection image of the measuring object 1 from stereo images of the measuring object 1.

The surface shape measuring method of the eleventh invention, which accomplished the first object, comprises, as shown in FIG. 20, the step of providing stereo-photographing units (3R and 3L) in number suitable for at least two directions to photograph a measuring object 1 in stereo. The surface shape measuring method further comprises, as shown for example in FIG. 22, the steps of placing a calibration subject 11 on which reference points are three-dimensionally arranged in a position where the measuring object 1 is to be placed (S110); photographing the calibration subject 11 in stereo from at least two directions with the stereo-photographing units (S111); and calculating stereo-photographing parameters in the at least two photographing directions based on the photographed stereo images of the calibration subject 11 (S115).

The surface shape measuring method further comprises, as shown in FIG. 23, the steps of photographing the measuring object 1 in stereo from the at least two directions with the stored stereo-photographing parameters (S121); generating stereo images of the measuring object 1 from the photographed images using the stereo-photographing parameters (S122); and measuring the surface shape of the measuring object 1 based on the stereo images of the measuring object 1 (S123).

The surface shape measuring method of the twelfth invention, which accomplished the first object, comprises, as shown for example in FIG. 24 and FIG. 26, the steps of placing a calibration subject 11 on which reference points are three-dimensionally arranged in a position where a measuring object is to be placed (S130); photographing the calibration subject 11 with at least three imaging devices for photographing from predetermined directions (S131); extracting an overlapping photographic area from images of the calibration subject 11 photographed by two imaging devices of the at least three imaging devices (S132 and S133), and calculating stereo-photographing parameters (S137).

The surface shape measuring method further comprises, as shown in FIG. 27, the steps of photographing the measuring object 1 with the at least three imaging devices (S141); extracting an overlapping photographic area from images of the measuring object 1 photographed by two imaging devices of the at least three imaging devices (S142 and S143); generating stereo images of the measuring object 1 from the images of the extracted overlapping photographic area using the stereo-photographing parameters (S144); and measuring the surface shape of the measuring object 1 based on the stereo images of the measuring object 1.

The surface shape measuring method of the thirteenth invention, which accomplished the first object, relate to, as shown in FIG. 28, a surface shape measuring method using a surface shape measuring apparatus including a stereo-photographing unit having right and left imaging devices 9R and 9L for photographing from a first photographing direction, and a light path changing parts (22R and 22L) which allows the stereo-photographing unit to photograph from a second photographing direction. The surface shape measuring method comprises, as shown in FIG. 31, the steps of placing a calibration subject on which reference points are three-dimensionally arranged in a position where the object is to be placed (S150); orienting the calibration subject to the first photographing direction with respect to the stereo-photographing unit (S151), photographing the calibration subject in stereo together with an image of the calibration subject viewed from the second photographing direction formed by the light path changing part with the stereo-photographing unit (S153); and calculating stereo-photographing parameters in the first and second photographing directions from which the calibration subject is photographed in stereo by the stereo-photographing unit (S153 to S162). The surface shape measuring method further comprises, as shown in FIG. 32, the steps of placing the measuring object in the position to be placed (170); orienting the measuring object to the first photographing direction with respect to the stereo-photographing unit (S171), photographing the measuring object in stereo together with an image of the measuring object viewed from the second photographing direction formed by the light path changing part with the stereo-photographing unit (S172); generating stereo images of the measuring object from the images photographed from the first and second photographing directions using the stereo-photographing parameters (S173, S174, S177, and S178); and measuring the surface shape of the measuring object based on the stereo images of the measuring object (S175, S176, S179, and S180).

The surface state plotting apparatus of the fourteenth invention, which accomplishes the second object, has a plotting device 8 for plotting the surface shape of a measuring object 1 based on stereo images of the measuring object 1 measured by the surface shape measuring apparatus of the eighth or tenth invention. Preferably, an artificial intelligence engine suitable to plot the surface state of the measuring object 1 is used in the plotting. For example, the measuring object 1 is a buried cultural property, the measured surface state can be appropriately corrected from an archeological point of view to remove scratches and extraneous matters and extract archaeologically valuable information.

The surface shape measuring apparatus of the fifteenth invention, which accomplished the first object, comprises, as shown in FIG. 33 and FIG. 34, a stereo-photographing part 3 for photographing in stereo a measuring object 1 together with a calibration subject 120 placed in the vicinity of the measuring object 1 and having reference points whose three-dimensional relative positional relation have been determined in advance from a plurality of directions; a photographing parameter calculating part 50 for extracting images of the reference points from image data photographed in stereo by the stereo-photographing part 3 and obtaining stereo-photographing parameters in each stereo-photographing directions based on the positions of the reference points; and a surface shape measuring part 60 for obtaining the surface shape of the measuring object 1 based on the image position of the measuring object 1 in the photographed image data from which the images of reference points have been extracted.

In an apparatus constituted as described above, the measuring object 1 is photographed by the stereo-photographing part 3 together with the calibration subject 120. Since the measuring object 1 is photographed from a plurality of directions with the stereo-photographing part 3, a wider range of surface shape of the measuring object 1 can be measured than when it is photographed from one direction. The photographing parameters in the directions from which the measuring object 1 is photographed are calculated based on the images of the reference points on the calibration subject 120 photographed together with the measuring object 1 and the positions of reference points known in advance. Thus, the surface shape can be precisely measured even if the measuring object 1 and the stereo-photographing part 3 are not positioned precisely.

Preferably, as shown in FIG. 33, the stereo-photographing part 3 has stereo-photographing units for each of the stereo-photographing directions. Each of the stereo units has at least two imaging devices 3R and 3L attached to in parallel to each other at a specified distance "l" apart from each other and can photograph stereo images of the measuring objects 1 simultaneously. This is advantageous when the number of measuring objects 1 is large and the work to measure the surface shapes of them is large, or when stereo images cannot be obtained unless they are photographed simultaneously since the measuring object 1 vibrates or moves.

Preferably, as shown in FIG. 39, the stereo-photographing part 3 has a plurality of single-lens imaging devices 10 for photographing the measuring object 1, and deals with overlapping photographic areas of images photographed by adjacent imaging devices 10 as stereo images. Since the stereo-photographing part 3 is configured to deal with overlapping photographic areas of images photographed by adjacent single-lens imaging devices 10 as stereo images, the degree of freedom in the positions of the imaging devices 10 is large as compared with a stereo-photographing unit.

Preferably, the stereo-photographing parameters include at least one of the baseline length, photographing position and tilt of the stereo-photographing part 3. The stereo-photographing parameters are parameters used to convert a pair of images photographed by the stereo-photographing part 3 into rectified images. Since the rectified images can be stereoscopically viewed, the unevenness on the surface of the measuring object 1 can be precisely calculated based on the parallax difference between the stereo images. When the stereo-photographing part 3 has stereo-photographing units for each of the stereo-photographing directions, the photographing parameters are the baseline length, photographing position and tilt of each stereo-photographing unit. When the stereo-photographing part 3 deals with overlapping photographic areas of images photographed by adjacent imaging devices 10 as stereo images, the photographing parameters are the baseline lengths between adjacent imaging devices 10, the photographing positions and tilts of the imaging devices.

Preferably, the surface shape measuring apparatuses further comprises an orthogonal projection image producing part for producing an orthogonal projection image of the measuring object 1 from at least either of stereo images of the object 1 photographed by the stereo-photographing part 3 and the image position of the measuring object 1. By reconstructing stereo images into an orthogonal projection image based on the surface shape measurement data of the measuring object 1, an image with precise dimensions can be produced from real photographed images. Even when such an image is not produced, since an orthogonal image is accurate in dimensions, it can be used to judge the real conditions and is highly useful.

Preferably, as shown in FIG. 40 and FIG. 41, the surface shape measuring apparatus further comprises a relative position changing part 4 for changing the positional relation between the measuring object 1 and the stereo-photographing part 3; and a stereo-photographing control part 17 for controlling the relative position changing part 4 to move at least one of the measuring object 1 and the stereo-photographing part 3 so that the stereo-photographing part 3 can photograph the measuring object 1 from a plurality of directions and is configured to obtain the surface shape of the measuring object 1 based on stereo images photographed from a plurality of directions controlled by the stereo-photographing control part 17.

The surface shape measuring method of the sixteenth invention, which accomplish the first object, comprises, as shown in FIG. 37, the steps of placing a calibration subject on which reference points whose three-dimensional positional relation have been determined in advance are arranged in the vicinity of a measuring object (S201); photographing in stereo the measuring object 1 together with the calibration subject 120 from a plurality of directions with the stereo-photographing part (S202); extracting images of the reference points from stereo images photographed by the stereo-photographing part, and obtaining photographing parameters based on the positions of the reference points (S203); and measuring the surface shape of the measuring object 1 based on the image positions of the measuring object 1 in the stereo images from which the reference points have been extracted (S203).

The surface shape measuring apparatus of the seventeenth invention, which accomplish the first object, comprises, as shown in FIG. 42, a stereo-photographing unit 90 for photographing in stereo a measuring object 1 together with a calibration subject 11E placed in the vicinity of the background of the measuring object 1 and having reference points whose three-dimensional relative positional relation have been determined in advance from a specified direction; a relative position changing part 4 for changing the positional relation between the measuring object 1 and the stereo-photographing unit 90; a stereo-photographing control part 17 for controlling the relative position changing part 4 to move at least one of the measuring object 1 and the stereo-photographing unit 90 so that the stereo-photographing unit 90 can photograph the measuring object 1 from a plurality of directions; a photographing parameter calculating part 50 for extracting images of the reference points from image data photographed in stereo by the stereo-photographing control part 17 and obtaining stereo-photographing parameters in each stereo-photographing directions based on the positions of the reference points; and a surface shape measuring part 60 for obtaining the surface shape of the measuring object 1 based on the image position of the measuring object 1 in the photographed image data from which the images of extracting points have been extracted.

Preferably, the positional relation between the calibration subject and the stereo-photographing unit is fixed while the stereo-photographing unit is stereo-photographing from the plurality of directions.

The surface shape measuring apparatus of the eighteenth invention, which accomplish the first object, comprises, as shown in FIG. 43, a single-lens imaging device 10 for photographing a measuring object 1 together with a calibration subject 11E placed in the vicinity of the background of the measuring object 1 and having reference points whose three-dimensional relative positional relation have been determined in advance from a specified direction; a relative position changing part 4 for changing the positional relation between the measuring object 1 and the imaging device 10; a stereo single direction control part 18 for controlling the relative position changing part 4 to change the positional relation between the measuring object 1 and the imaging device 10 so that the imaging device 10 can photograph in stereo from first and second photographing directions; a stereo-photographing control part 17 for controlling the relative position changing part 4 to move at least one of the measuring object 1 and the imaging device 10 and controlling the stereo single direction control part 18 so that the imaging device 10 can photograph the measuring object 1 from a plurality of directions; a photographing parameter calculating part 50 for extracting images of the reference points from image data photographed in stereo by the imaging device 10 and obtaining stereo-photographing parameters in each stereo-photographing directions based on the positions of the reference points; and a surface shape calculating part 60 for obtaining the surface shape of the measuring object based on the image position of the measuring object 1 in the photographed image data from which the images of extracting points have been extracted.

The surface state plotting apparatus of the nineteenth invention, which accomplishes the second object, has a plotting device 8 for plotting the surface shape of a measuring object 1 based on stereo images of the measuring object 1 measured by the surface shape measuring apparatus of the sixteenth, seventeenth or eighteenth invention. Preferably, an artificial intelligence engine suitable to plot the surface shape of the measuring object 1 is used in the plotting. For example, the measuring object 1 is a buried cultural property, the measured surface shape can be appropriately corrected from an archeological point of view to remove scratches and extraneous matters and extract archaeologically valuable information.

This application is based on the Patent Application No. 2001-230368 filed on Jul. 30, 2001, No. 2001-234644 filed on Aug. 2, 2001, and No. 2001-257832 filed on Aug. 28, 2001 in Japan, the content of which is incorporated herein, as part thereof.

Also, the present invention can be fully understood, referring to the following description in details. Further extensive applications of the present invention will be apparent from the following description in details. However, it should be noted that the detailed description and specific examples are preferred embodiments of the invention, only for the purpose of the description thereof. Because it is apparent for the person ordinary skilled in the art to modify and change in a variety of manners, within the scope and spirits of the invention.

The applicant does not intend to dedicate any disclosed embodiments to the public, and to the extent that any disclosed modifications or alterations may not literally fall within the scope of the claims, they are considered to be part of the invention under the doctrine of the equivalents.

BRIEF DESCRIPTION OF DRAWINGS

FIG. 3 is a perspective view illustrating the structures of calibration subjects for use in calculation of stereo-photographing parameters;

FIG. 4 is an explanatory view of reference point marks and side reference targets formed on the calibration subject;

FIG. 16 is a view for explaining the difference between a central projection image and an orthogonal projection image;

FIG. 20 is a perspective view of an essential part of a fifth embodiment of this invention;

FIG. 24 is a perspective view of an essential part of a sixth embodiment of this invention;

FIG. 34 is a block diagram illustrating the structure of an essential part of the eighth embodiment of this invention, showing the function of processing the signals of images photographed in stereo by a stereo-photographing part;

FIG. 35 is an explanatory view of a pair of images of a measuring object and calibration subject photographed in stereo, where (A) and (B) show images photographed from right and left photographing directions, respectively;

FIG. 36 is a perspective view illustrating the structures of calibration subjects for use in calculation of photographing parameters;

FIG. 46 is a perspective view illustrating a frame body equivalent to the folding screen type calibration subject; and FIG. 47 is a block diagram illustrating the structure of a thirteenth embodiment of this invention.

BEST MODE FOR CARRYING OUT THE INVENTION

1. First Embodiment

Figure 1:
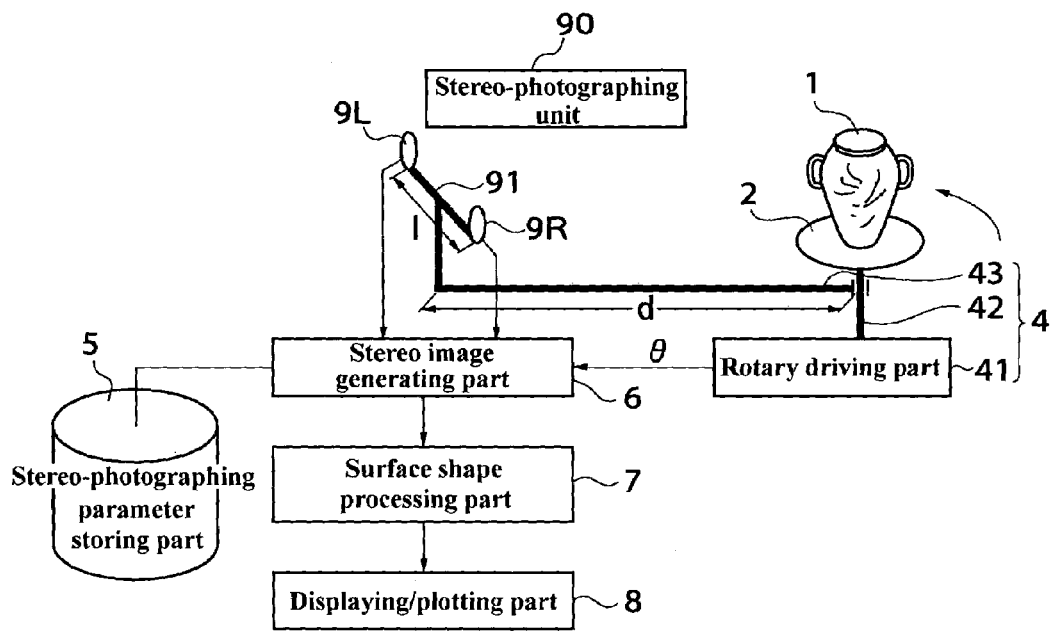
FIG. 1 is a block diagram illustrating the structure of a first embodiment of this invention.

Description will be hereinafter made of this invention with reference to the drawings. FIG. 1 is a block diagram illustrating the structure of a first embodiment of this invention. In the drawing, a measuring object 1 is an object having a surface shape or surface pattern to be three-dimensionally measured in a non-contact manner such as a trove, human body, vehicle, or machine structure. A table 2 is a stand to place the measuring object 1 on, and may be a stage. A stereo-photographing unit 90 is a device for photographing the measuring object 1 placed on the table 2 in stereo and comprises two imaging devices 9R and 9L such as CCDs (charged-coupled devices), digital cameras or film-type cameras which are attached to a rod as an imaging device fixing body 91 at a distance l apart from each other. The two imaging devices 9R and 9L are attached to the imaging device fixing body 91 in such a manner that their optical axes are generally parallel to each other and oriented toward the measuring object 1.

A relative position changing part 4 has a function to rotate the table 2 and comprises a rotary driving part 41 such as a motor, a table rotating shaft 42 for rotating the table 2 by the driving force of the rotary driving part 41, and a stereo-photographing part connecting rod 43. The stereo-photographing part connecting rod 43 keeps the distance d between the table 2 and the stereo-photographing unit 90 constant and supports the two imaging devices 9R and 9L fixed to the imaging device fixing body 91 in attitudes oriented toward the table 2. The rotary driving part 41 may be a handle or grip which can be rotated by an operator since it can only generate a driving force to position the table 2 with an accuracy of a few degrees.

A stereo-photographing parameter storing part 5 stores stereo-photographing parameters in a plurality of directions from which the stereo-photographing unit 90 photographs the measuring object 1. The stereo-photographing parameters will be described in detail later.

A stereo image generating part 6 generates stereo images of the measuring object 1 after the stereo-photographing unit 90 photographs the measuring object 1 from the plurality of directions with the stored stereo-photographing parameters, and comprises a processor which can perform high-speed image processing. The stereo images herein are images obtained by rectifying a pair of images photographed in stereo from right and left photographing directions by the stereo-photographing unit 90 so that a viewer can see a stereoscopic image. The direction θ from which the stereo-photographing unit 90 photographs the measuring object 1 is sent to the stereo image generating part 6 as a measurement signal from a rotational angle sensor attached to the table rotating shaft 42 or is tied to stereo images as photographing angle information.

A surface shape processing part 7 measures the surface shape of the measuring object 1 based on the stereo images of the measuring object 1. The measurement uses an operation method for measuring unevenness of a surface based on its stereo images such as that used in aerial photogrammetry. It is preferred that the surface shape processing part 7 extract the characteristic points of the measuring object 1, obtain the positions of the characteristic points, and then measure the entire surface shape of the measuring object 1 based on the thus obtained positions of the characteristic points. A displaying/plotting part 8 comprises a display device such as a CRT and liquid crystal display for displaying the surface shape of the measuring object 1 measured by the surface shape processing part 7, a plotter or printer for producing graphics on a sheet of paper, a digital plotter for producing three-dimensional impression data, or the like. The displaying/plotting part 8 may be a stereo monitor on which stereo images can be displayed. A stereo monitor can not only reproduce the measuring object 1 as a three-dimensional image but also allow an operator to perform measurement or make a drawing easily with reference to an image. The stereo image generating part 6, the surface shape processing part 7 and the displaying/plotting part 8 may be incorporated in a digital plotter or a personal computer.

Figure 2:
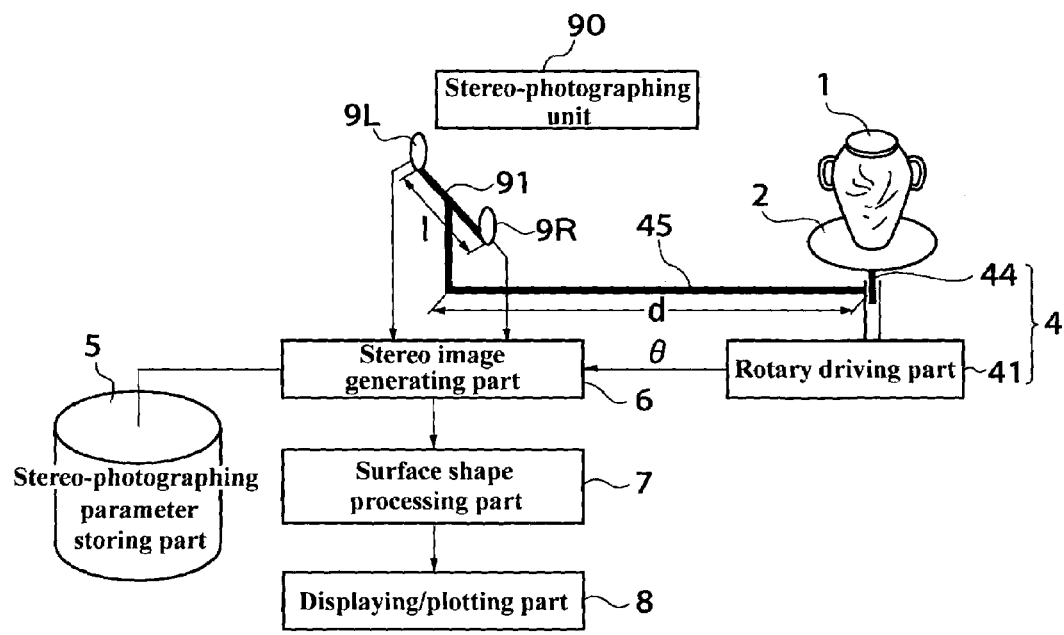
FIG. 2 is a view illustrating the structure of an essential part of a modification of a relative position changing part.

FIG. 2 is a diagram illustrating the structure of an essential part showing a modification of the relative position changing part. The relative position changing part 4 may be configured to rotate the stereo-photographing unit 90 about a supporting shaft 44 of the table 2. A stereo-photographing part rotating shaft 44 keeps the distance d between the table 2 and the stereo-photographing unit 90 constant and orients the two imaging devices 9R and 9L attached to the imaging device fixing body 91 toward the table 2. The stereo-photographing part rotating shaft 44 is rotated about the supporting shaft 44 of the table 2 by the driving force of a rotary driving part 41.

FIG. 3 is a perspective view illustrating the structures of calibration subjects for use in calculation of stereo-photographing parameters. FIG. 3(A) shows a calibration subject having a tubular body with a rectangular cross-section, FIG. 3(B) shows a calibration subject having a tubular body with a hexagonal cross-section, FIG. 3(C) shows another aspect of the calibration subject having a tubular body with a rectangular cross-section, and FIG. 3(D) shows another aspect of the calibration subject having a tubular body with a hexagonal cross-section. As shown in FIG. 3(A), a calibration subject 11 having a tubular body with a rectangular cross-section has four reference sides 111. On each of the reference sides 111, at least six reference point marks 113 are formed. This is because at least six known points are necessary to determine the attitude or coordinates of one plane. The reference point marks 113 may be a white mark on a black background, a black mark on a white background, or a reflective mark such as a retroreflective target. The reference point marks 113 may be formed by attaching stickers on which the reference point marks 113 are printed or by directly printing the reference point marks 113 on the reference sides 111. As shown in FIG. 3(B), a calibration subject 11B having a tubular body with a hexagonal cross-section has six reference sides 111B. At least six reference point marks 113B are formed on each of the reference sides 111B, by which information necessary to determine the attitude or coordinates of one plane is provided.

Side reference targets 112 may be directly formed on the reference sides 111 of the calibration subject 11 in addition to the reference point marks 113 so that the reference sides 111 may be distinguished from one another. The side reference targets 112 have functions as reference point marks 113 in addition to being used to distinguish the reference sides 111 of the calibration subject 11 from one another. In the case of the tubular body with a rectangular cross-section, five reference point marks 113 and one side reference target 112a or 112b are formed on each reference side 111 as shown in FIG. 3(C). A calibration subject 11D having a tubular body with a hexagonal cross-section has six reference sides 111D, on each of which five reference point marks 113D and one side reference target 112c, 112d or 112e are formed as shown in FIG. 3(D).

In the examples shown in FIG. 3(C) and FIG. 3(D), the reference sides 111 of the calibration subject 11 have different side reference targets 112. However, the same mark as the side reference target 112 maybe used for all or some of the reference point marks 113 on each of the reference side 111. The side reference targets 112 may have different sizes or colors. The colors of the marks may be different for each reference side 111 of the calibration subject 11 so that the reference sides 111 can be distinguished from one another.

FIG. 4 is an explanatory diagram of reference point marks and side reference targets formed on a calibration subject. FIG. 4(A) shows examples of the reference point marks and FIG. 4(B) shows examples of the side reference targets. For the reference point marks, there may be used a pattern, graphic form or symbol, such as a strike mark (A1), white circle with black outline (A2) or black circle (A3), from which the three-dimensional positions of the reference points can be accurately obtained. The side reference targets are used to distinguish the reference sides 111 of the calibration subject 11, and may be a pattern, graphic form or symbol or the like such as a hexagon (B1), white cross (B2), diamond (B3), numeral 1 (B4), numeral 2 (B5), numeral 3 (B6), black square (B7), square with diagonal lines (B8), square with grid (B9).

Figure 5:
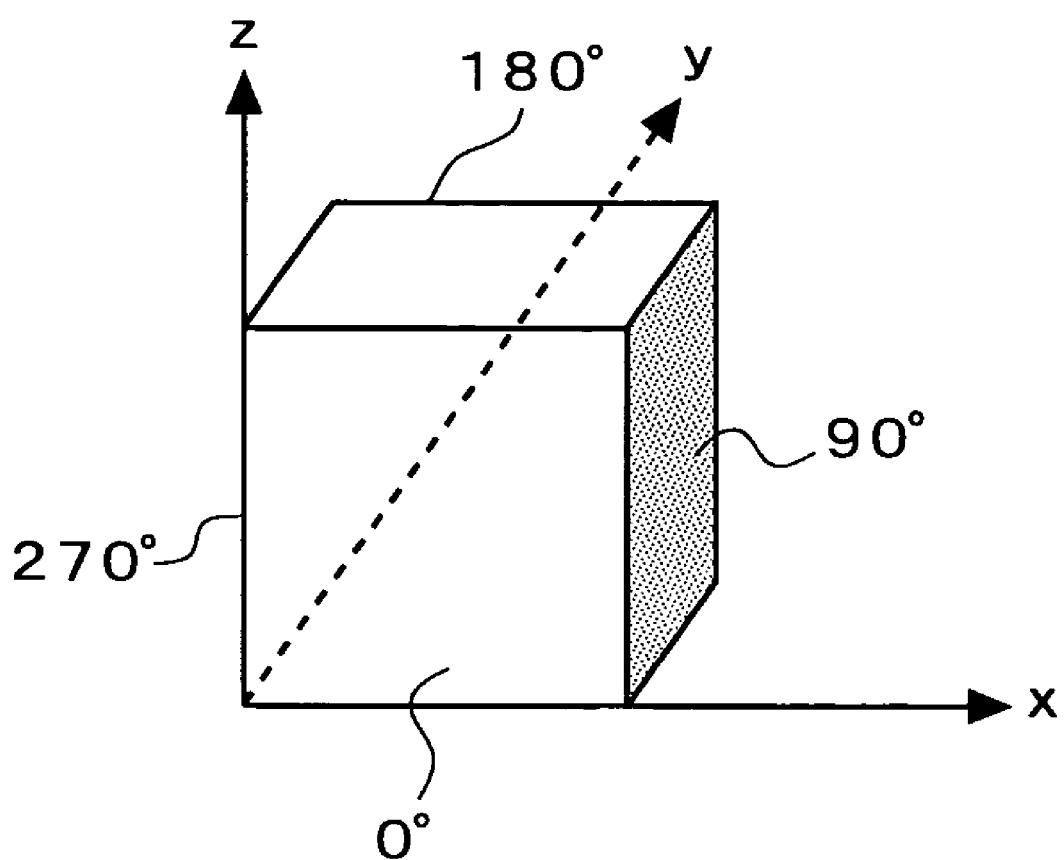
FIG. 5 is an explanatory view of a three-dimensional coordinate system xyz for describing the positions of the reference point marks.

The positions of the reference point marks 113 on the calibration subject 11 must be measured using a three-dimensional coordinate system with a precise instrument in advance. FIG. 5 is an explanatory diagram of a three-dimensional coordinate system xyz for describing the positions of the reference point marks. In the three-dimensional coordinate system xyz, when the calibration subject 11 is a tubular body with a rectangular cross-section, the coordinates of the reference point marks 113 on the calibration subject 11 are determined using an arbitrary reference side 111 as a reference face. For example, the xy plane is assigned to any one of the reference sides 111 as 0° direction, and other three reference sides 111 are designated as 90° direction, 180° direction and 270° direction, respectively, so that they can be distinguished from one another. Then, the zy plane is assigned to the reference sides 111 in the 90° direction and 270° direction and the xy plane is assigned to the reference side in the 180° direction.

In this embodiment, stereo-photographing is performed for each reference side 111 of the calibration subject 11. Thus, stereo-photographing is performed the same number of times as the number of the reference sides 111. The directions from which stereo-photographing is performed are the directions from which the stereo-photographing unit 90 photographs the reference sides 111 in stereo and are preferably coincident with the directions normal to the reference sides 111. Thus, the number of the reference sides 111 of the calibration subject 11 is preferably determined based on the number of sides by which the entire circumference of the measuring object 1 is divided. To measure the measuring object 1 precisely, the number of the reference sides 111 of the calibration subject 11 has to be large. For example, six reference sides 111 are preferably provided on the calibration subject 11 as shown in FIG. 3(B).

Figure 6:
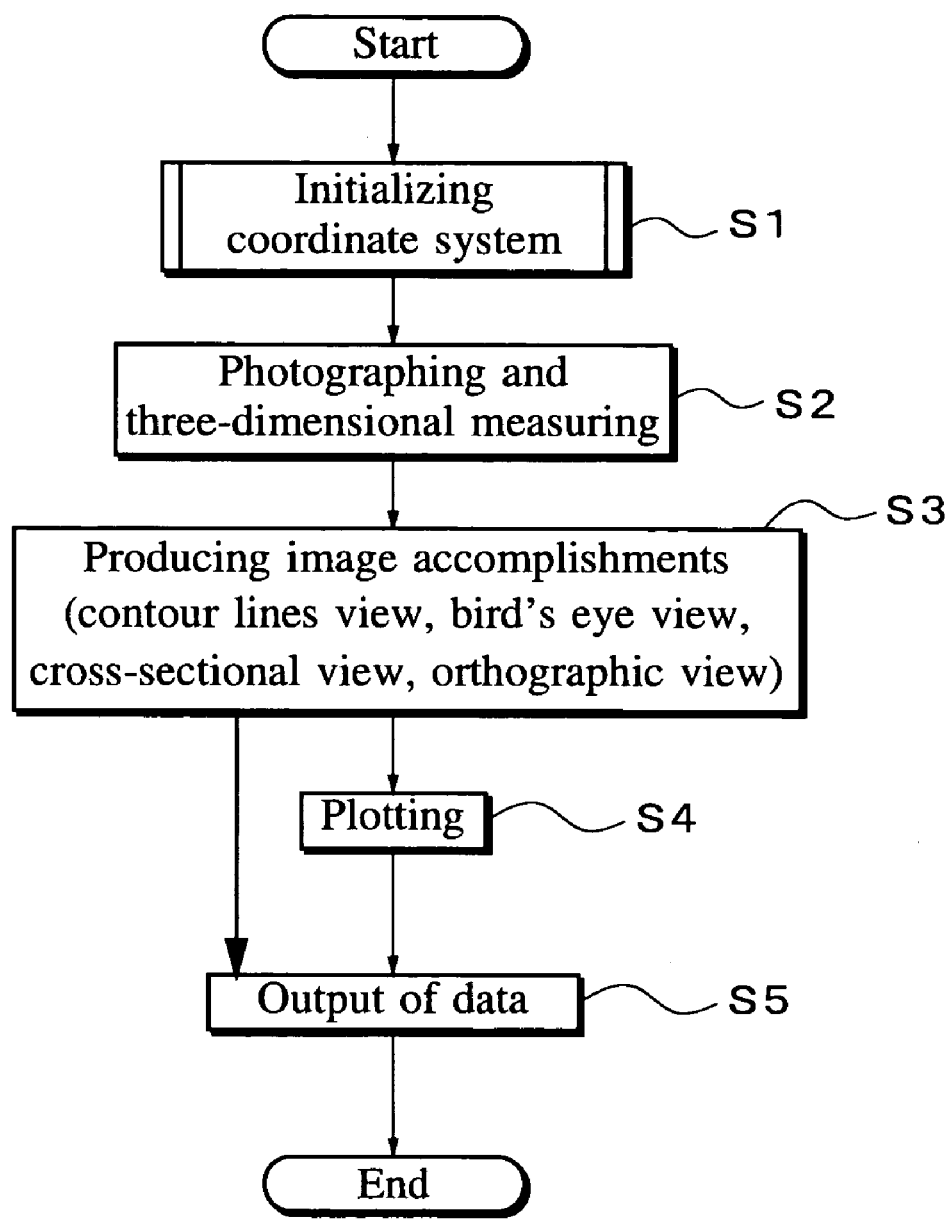
FIG. 6 is a flowchart for generally explaining the process for measuring a measuring object with an apparatus shown in FIG. 1.

Description will be made of the process for measuring the surface shape of the measuring object 1 with an apparatus constituted as described above. FIG. 6 is a flowchart for generally explaining the entire process for measuring the measuring object with the apparatus shown in FIG. 1. At first, the coordinate system is initialized for measurement (S1). At this time, stereo-photographing parameters in the directions from which stereo-photographing is performed have to be obtained using the calibration subject 11. Then, stereo-photographing and three-dimensional measurement of the measuring object 1 are performed (S2). Based on the result of the three-dimensional measurement of the measuring object 1, image accomplishments are produced (S3). For example, a contour lines view, a bird's eye view, a cross-sectional view, and/or an orthographic view are produced.

The plotting of the result of three-dimensional measurement is performed based on an orthogonal projection image of the measuring object 1 produced as a result of the three-dimensional measurement (S4). If the plotting is not performed, step S4 may be skipped. Then, the result of the three-dimensional measurement of the measuring object 1 is outputted as data (S5). The data, which includes the accomplishments in the form of drawings, may be printed as images with a printer or outputted as a DXF data file. The data may be transferred to another CAD system and processed therein.

Figure 7:
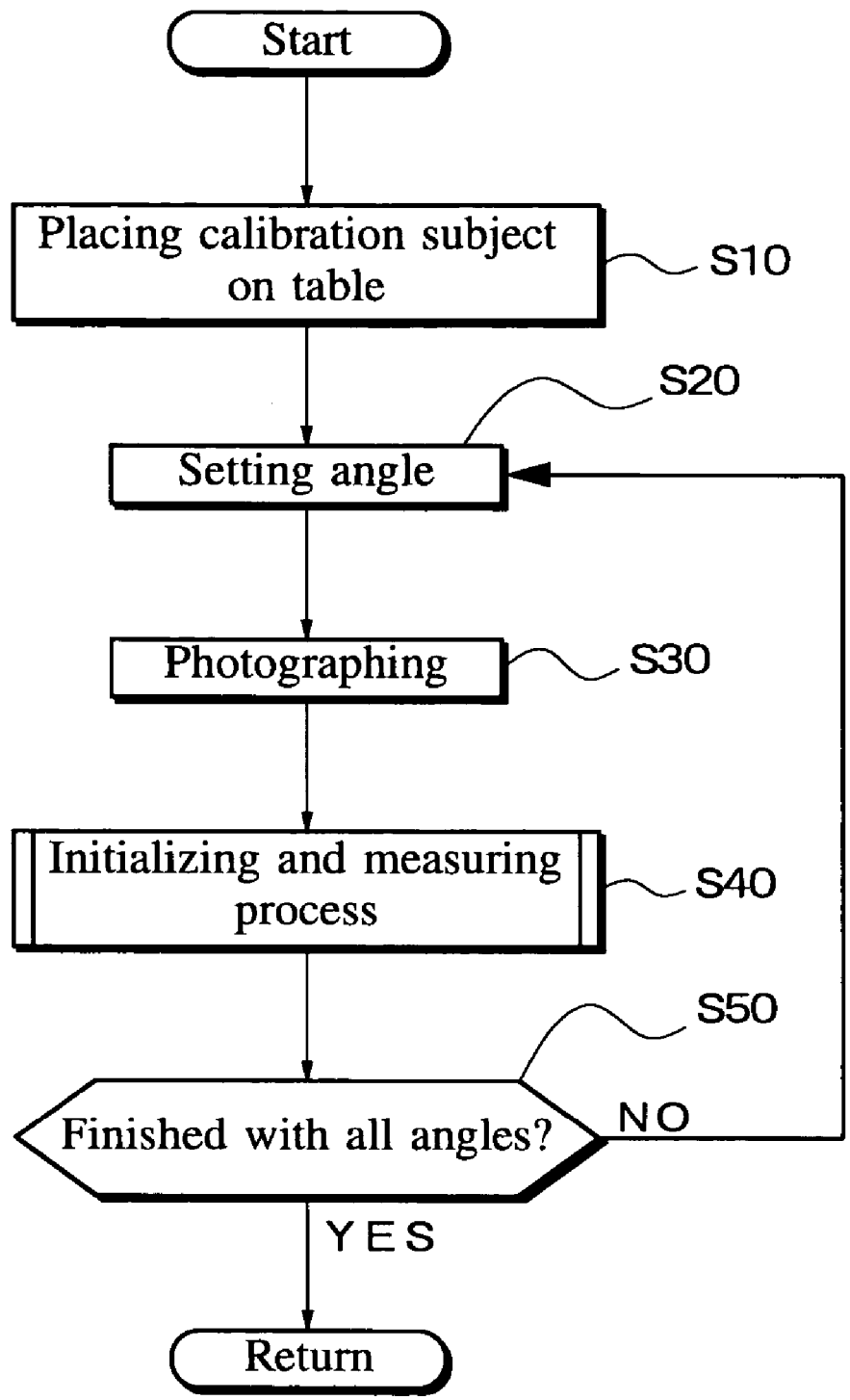
FIG. 7 is a flowchart for explaining the initialization in a direction from which stereo-photographing is performed.

Description will be made in detail of the initialization of the coordinate system in step S1. FIG. 7 is a flowchart for explaining the initialization in a direction from which stereo-photographing is performed. First, the calibration subject 11 is placed on the table 2 (S10). Then, the relative position changing part 4 sets the angle θ of the table 2 or that of the stereo-photographing unit 90 (S20). For example, the angle θ is set to 0° at first. Next, stereo-photographing unit 90 photographs one of the reference sides 111 of the calibration subject 11 in stereo (S30). In the case of stereo cameras, the two cameras photograph simultaneously. When retroreflective targets are attached to the calibration subject 11 as the reference point marks 113, the photographing is performed with a flashbulb.

Then, an initializing and measuring process necessary for stereo-photographing is executed (S40). This step is repeated until all the reference sides 111 of the calibration subject 11 are photographed and subjected to the initializing and measuring process (S50). This is because the number of the reference sides 111 is the same as the number of directions from which stereo-photographing is performed. For example, when the calibration subject 11 with a rectangular cross-section as shown in FIG. 3(A) is used, photographing is carried out at angles of 0°, 90°, 180° and 270° for the angle θ since there are four reference sides 111. When the calibration subject 11B with a hexagonal cross-section as shown in FIG. 3(B) is used, photographing is carried out at angles of 0°, 60°, 120°, 180°, 240° and 300° for the angle θ since there are six reference sides 111B.

Figure 8:
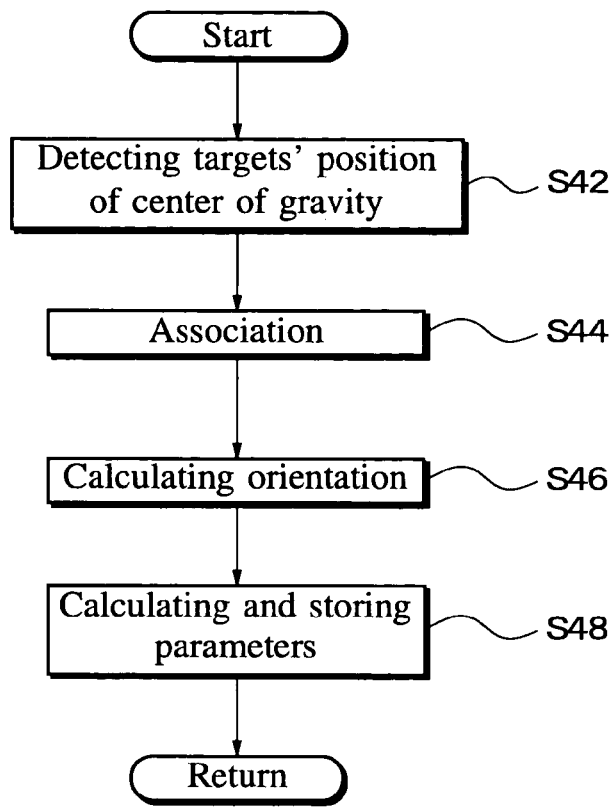
FIG. 8 is a flowchart for explaining the initializing and measuring process in FIG. 7 in detail.

The flowchart in FIG. 7 shows a case in which the initializing and measuring process is executed for each reference side 111 of the calibration subject 11 in step S40. However, the apparatus may be configured to send the photographed stereo images to the stereo image generating part 6 and the surface shape processing part 7 after photographing all the reference sides 111 and execute the initializing and measuring process on the stereo images by one operation after step S50. At this time, in addition to the information on the angle θ, when the side reference targets 112 to distinguish the reference sides 111 are placed on the reference sides 111 (see FIG. 3(C) and FIG. 3(D)), the reference sides 111 can be distinguished from one another more reliably. In this case, the apparatus may be configured to execute an initializing and measuring process as shown in FIG. 8 for each of the reference sides 111 after determining the reference sides 111 using the calibration subject 11.

Description will be made of a process for associating the images with measuring surfaces using the calibration subject 11 as shown in FIG. 3(C) or FIG. 3(D). When measurement and plotting are carried out on one side, there is no need for the process for associating images with measuring surfaces.

(i) When an operator performs the process manually, the operator displays images on the displaying/plotting part 8 and manually determines pairs of images of the reference sides 111 to be stereo images. At this time, the pairs of images of the reference sides 111 to be stereo images are determined based on the characteristics of the side reference targets 112 such as shape, pattern and color.

Figure 9:
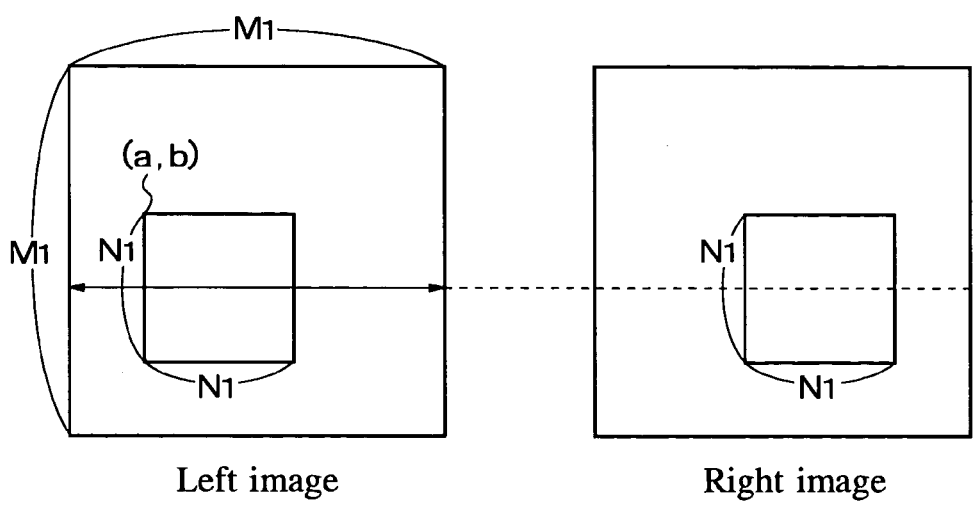
FIG. 9 is a view for explaining the relation between a template image for use in the sequential similarity detection algorithm and the normalized correlation method and right and left images.

(ii) The apparatus may be configured to discriminate the side reference targets 112 on the reference sides 111 by image processing and automatically determine pairs of images of the reference sides 111 to be stereo images. For example, the apparatus may be configured to distinguish the marks by image correlation processing using the images of the side reference targets on the reference sides 111 as template images. In the image correlation processing, the sequential similarity detection algorithm (SSDA method) or normalized correlation method may be used. In this case, the marks can be distinguished more reliably by the normalized correlation processing. For example, images with a size of N1×N1 as shown in FIG. 9 are used as template images and searches are made for the templates within image areas with a size of M1×M1. In the case of the normalized correlation method, the template with the highest correlation coefficient is determined as the desired side. The normalized correlation method will be described in detail later. The distinction of the side reference targets 112 may be made by a method of extracting characteristics or another method instead of by image correlation processing. The photographing order is preferably fixed to be from left to right, for example, since it is difficult to distinguish right and left images depending upon the photographing conditions.

Description will be made of the initializing and measuring process in step S40 in detail. FIG. 8 is a flowchart for explaining the initializing and measuring process in FIG. 7 in detail. The initializing and measuring process is executed on the stereo images for each of the reference sides 111. Thus, the process is executed on right and left images photographed by the stereo-photographing unit 90 as a pair of stereo images.

First, the positions of the center of gravity of the reference point marks 113 as targets on two stereo pair images are detected (S42). The positions of the reference point marks are detected roughly by, for example, a correlation method and the positions of the center of gravity of the reference point marks are then precisely calculated. The precise positions could be detected in one step. In that case, however, the operation takes a long time. Here, the sequential similarity detection algorithm as a process for determining the rough positions will be described.

1.1 [Correlation Method]

To process at a high speed, the sequential similarity detection algorithm (SSDA method) or the like is used. FIG. 9 is a diagram for explaining the relation between a template image for use in the sequential similarity detection algorithm and a pair of right and left images. For example, an image with a size of N1×N1 is adopted from the left image as a template image to be searched in the right image. Then, a search is made for the same image as the N1×N1 image in the left image along an identical line in the right image. The point where the residual R(a, b) given by the equation (1) is minimum is the position of the desired image.

$$R(a, b) = \sum_{m1=0}^{N1-1} \sum_{n1=1}^{N1-1} |I_{(a,b)}(m_1, n_1) - T(m_1, n_1)| \quad (1)$$

where $T(m_1, n_1)$ is the template image, $I_{(a,b)}(m_1, n_1)$ is a partial image in the object image, (a, b) are the coordinates of the upper left corner of the template image, and R(a, b) is a residual.

To increase the speed of the calculation process, addition of the equation (1) is stopped when the value of R(a, b) exceeds the minimum value of the past residuals and is moved to the next (a, b). When the rough position of the image is detected, the position of the center of gravity of the reference point mark is precisely detected. Although the normalized correlation method, the moment method or the edge detection method can be used, the most suitable process should be used depending on the shape or the accuracy of the reference point marks. For example, when the reference point marks are circular targets, the moment method is used. When the reference point marks are strike marks, edge extraction method is used. Here, the moment method will be described.

[Moment Method]

Figure 10:
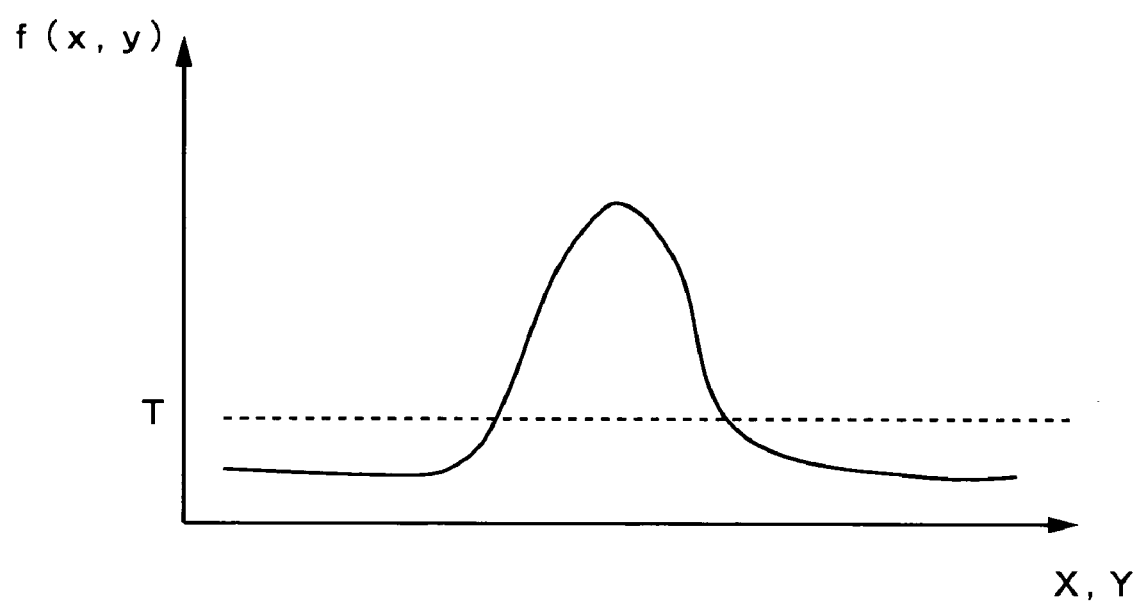
FIG. 10 is a graph for explaining the moment method, wherein the vertical axis indicates the measurement value f (x, y) and the horizontal axis indicates the spatial distribution X, Y.

FIG. 10 is a graph for explaining the moment method, wherein the vertical axis indicates the measurement value f(x, y) and the horizontal axis indicates the spatial distribution X, Y. In the graph, points having a measurement value f(x, y) which is greater than a threshold value T are subjected to the equations (2) and (3) below. Although FIG. 10 is shown in one dimensional form for simplicity, the process is two-dimensionally executed in reality.

$$xg = \{\Sigma x^* f(x,y)\}/\Sigma f(x,y) \quad (2)$$

$$yg = \{\Sigma y^* f(x,y)\}/\Sigma f(x,y) \quad (3)$$

where (xg, yg) are the coordinates of the center of gravity, and f(x, y) is the density value at the point (x, y).

Although the correlation method and moment method have been described as the initializing and measuring process, there are other various methods for obtaining stereo-photographing parameters in a direction from which stereo-photographing is performed. As long as the shape of the reference point marks or the calibration subject can be easily detected, an equivalent method having the same function as the correlation method or moment method may be adopted.

Returning to FIG. 8, the reference point marks in the two images whose centers of gravity have been detected are associated with the reference point marks of the calibration subject 11 whose coordinates have been precisely measured in advance (S44). The reference side 111 to be measured is known based on the photographing angle θ. Thus, when there are six reference point marks, for example, the six points on the reference side 111 are associated with the corresponding points. Since the positions of the reference point marks are known in advance, it can be predicted where the reference point marks are positioned in the images. To determine the positions more precisely, reference point marks with different shapes or sizes may be provided as a reference mark on the reference sides 111 or the reference point marks may be numbered.

Then, orientation calculation is executed to obtain stereo-photographing parameters of the imaging devices 9R and 9L, such as the three-dimensional positions and tilts, the distance between the cameras (baseline length: l) and so on based on the coordinate system of the calibration subject 11 (S46). Here, description will be made of the case where the imaging devices are cameras.

1.2 [Equation of Orientation Calculation]

Here, the orientation calculation will be described in detail. Orientation calculation is used in the field of aerial photogrammetry and so on. By orientation calculation, the positions of the right and left imaging devices can be obtained. The stereo-photographing parameters are obtained from the coplanar conditional equations shown below.

Figure 11:
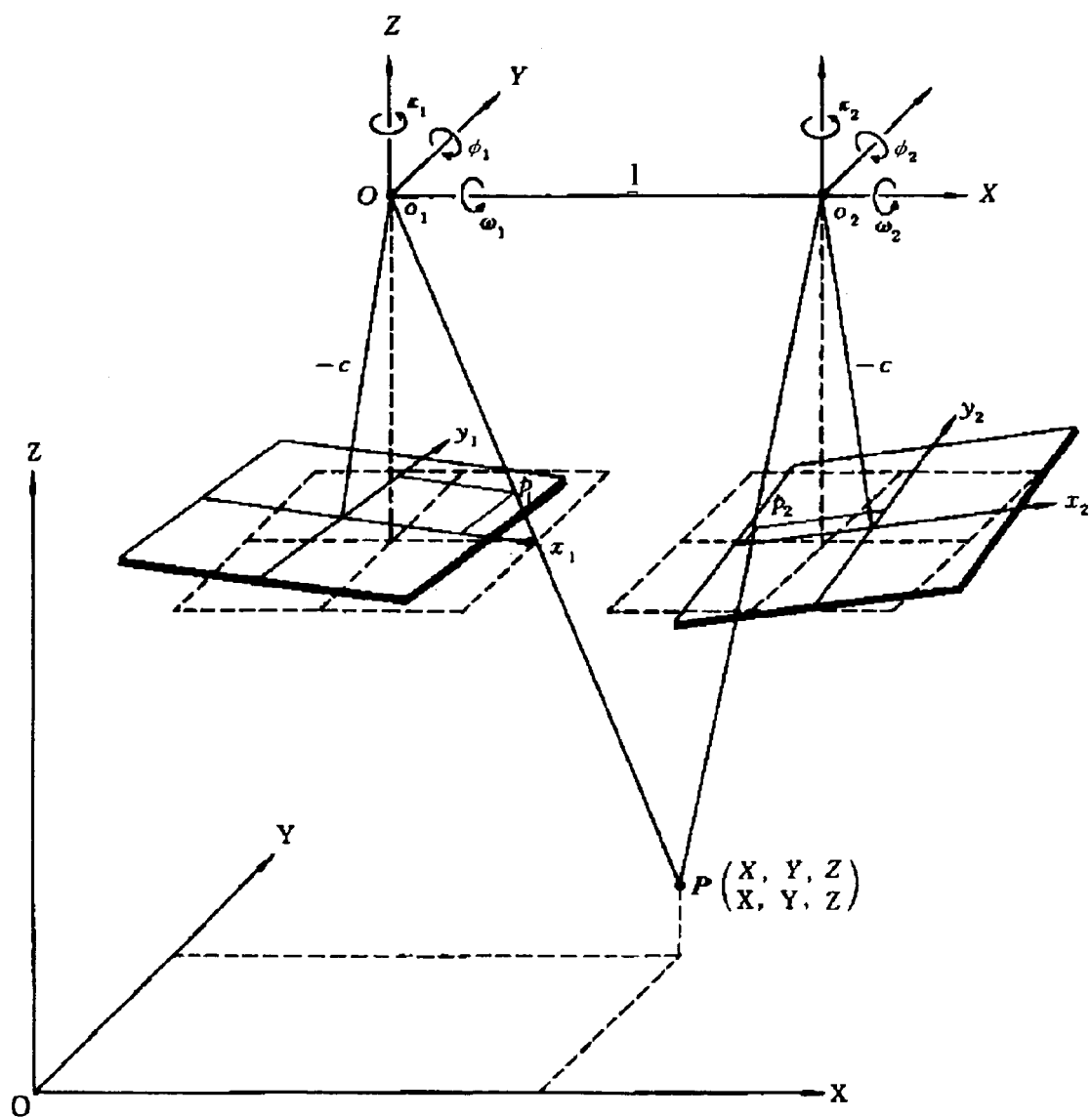
FIG. 11 is a view for explaining orientation calculation using a model coordinate system XYZ and right and left camera coordinate systems xyz.

FIG. 11 is a diagram for explaining the orientation calculation using a model coordinate system XYZ and right and left camera coordinate systems xyz. The origin O of the model coordinate system xyz is placed at the left projection center and a line connecting the origin O and the right projection center is designated as the X-axis. The baseline length 1 is used as the unit length. The parameters to be obtained are the following five rotational angles: the rotational angle $\kappa_1$ of the Z-axis and the rotational angle $\phi_1$ of the Y-axis of the left camera, and the rotational angle $\kappa_2$ of the Z-axis, the rotational angle $\phi_2$ of the Y-axis and the rotational angle $\omega_2$ of the X-axis of the right camera.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \qquad (4)$$

where $X_{01}, Y_{01}, Z_{01}$: coordinates of the projection center of the left image;

$X_{02}, Y_{02}, Z_{02}$: coordinates of the projection center of the right image;

$X_1, Y_1, Z_1$: the left image coordinates; and $X_2, Y_2, Z_2$: the right image coordinates.

The rotational angle $\omega_1$ of the X-axis of the left camera is 0 and thus is not needed to be taken into account. Under the above conditions, the coplanar conditional equation (4) becomes the equation (5) and the parameters can be obtained by solving the equation.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \qquad (5)$$

The following relationship for converting coordinates holds true between the model coordinate system XYZ and the camera coordinate systems xyz.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \qquad (6)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \qquad (7)$$

-continued $$\begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Using the equations (4), (5), (6) and (7) above, unknown parameters are obtained according to the following process.

S461: Assume an initial approximate value of zero as a rule.

S462: Taylor expand the coplanar conditional equation (5) about the approximate value, and make it linear. Determine the differential coefficients at this time using the equations (6) and (7), and determine an observation equation.

S463: Determine the correction amount for the approximate value by the least square method.

S464: Correct the approximate value.

S465: Repeat steps S462 to S465 using the corrected approximate value until the result converges.

By the above operation process, the three-dimensional positions and tilts of the cameras can be obtained in the coordinate system of the calibration subject. Based on the stereo-photographing parameters, rectified images which can be viewed stereoscopically can be produced, and three-dimensional measurement by the stereo method can be carried out. Images which can be stereoscopically viewed are images without vertical parallax which are parallel and normal to an object.

Then, the thus obtained stereo-photographing parameters are stored for all the angles θ representing each of the reference sides 111 (S48). The initialization of the coordinate system in step S1 is thereby completed. The process may be executed prior to each measurement or can be executed once when the coordinate systems do not include errors due to changes over time. When a motor is used as the rotary driving part 41 and sequentially controlled so that the angle θ between the table 2 on which the calibration subject 11 is placed and the stereo-photographing unit 90 coincides with the photographing angle θ for the reference side 111 to be measured, the entire process can be executed automatically when the calibration subject 11 is placed on the table 2. An operator may manually adjust the table 2 on which the calibration subject 11 is placed so that the angle of the table 2 coincides with the photographing angle θ prior to photographing and processing.

Figure 12:
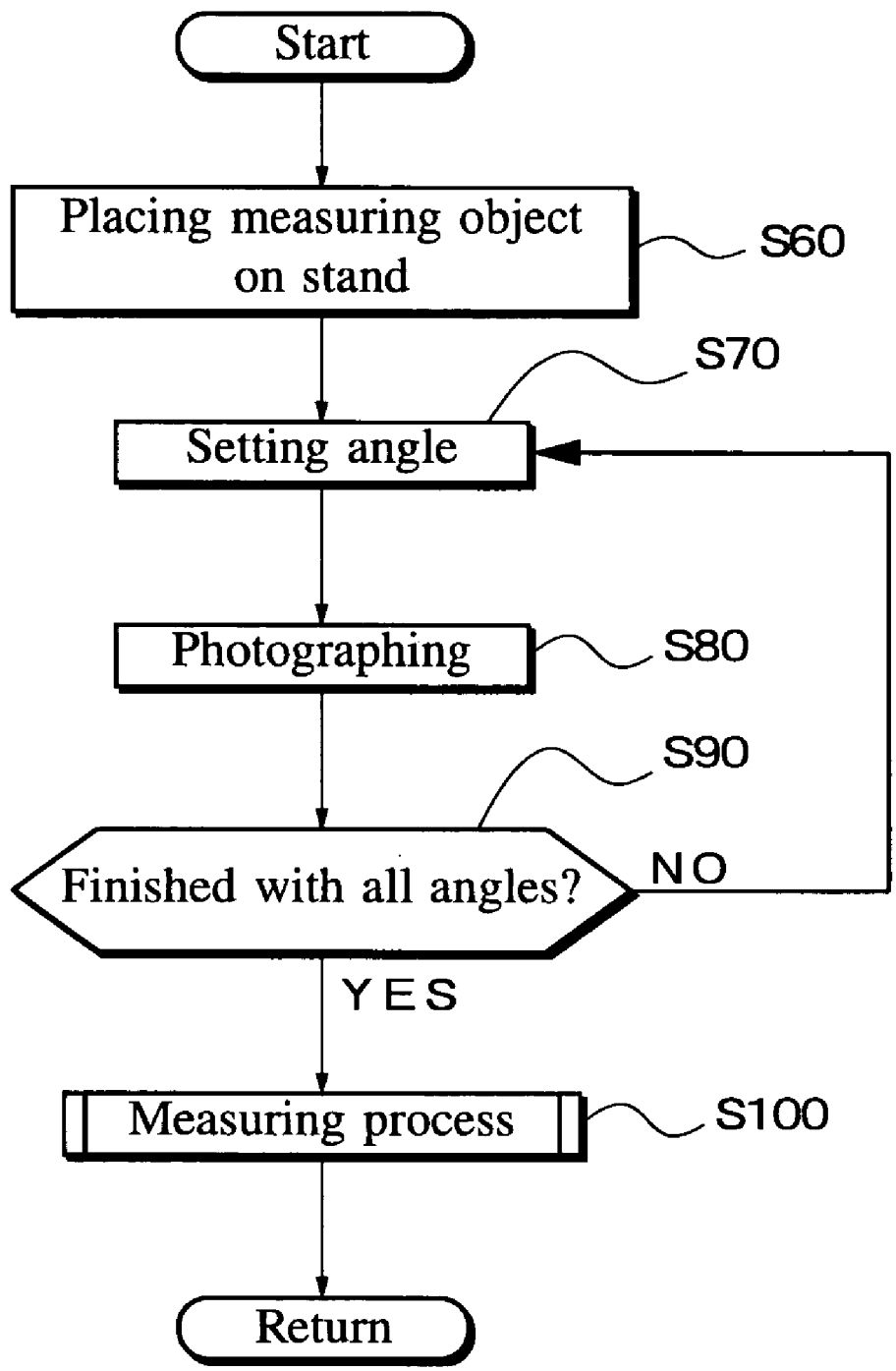
FIG. 12 is a flowchart for explaining the process for photographing a measuring object in stereo.

Description will be made of the stereo-photographing of the measuring object 1 in step S2. FIG. 12 is a flowchart for explaining the process for photographing a measuring object in stereo. A measuring object 1 is placed on the table 2 (S60). The relative position changing part 4 sets an angle θ corresponding to a direction from which the measuring object 1 is to be photographed by the stereo-photographing unit 90 (S70). For example, the angle is set to 0° at first. Then, the stereo-photographing unit 90 photographs the measuring object 1 (S80). In the case of stereo cameras, the cameras photograph the measuring object 1 simultaneously.

Then, it is judged whether the measuring object 1 has been photographed from all the angles corresponding to the directions from which it has to be photographed (S90). If not, the relative position changing part 4 sets another angle θ corresponding to another direction from which the measuring object 1 is to be photographed by the stereo-photographing unit 90 (S70). For example, when initializing correction is made using the calibration subject 11 with a rectangular cross-section as shown in FIG. 3(A), the measuring object 1 is photographed at angles of 0°, 90°, 180° and 270°. When initializing correction is made using the calibration subject 11 with a hexagonal cross-section as shown in FIG. 3(B), the photographing must be carried out at angles of 0°, 60°, 120°, 180°, 240° and 300°.

After the measuring object 1 has been photographed at all the photographing angles, the surface shape processing part 7 executes the measuring process (S100). The measuring process in the surface shape processing part 7 may be sequentially executed immediately after the stereo-photographing at each angle, namely, between steps S80 and S90. In this case, since the photographing of the measuring object 1 and the measuring process in the surface shape processing part 7 are executed in parallel, the operation time can be reduced as a whole.

Figure 13:
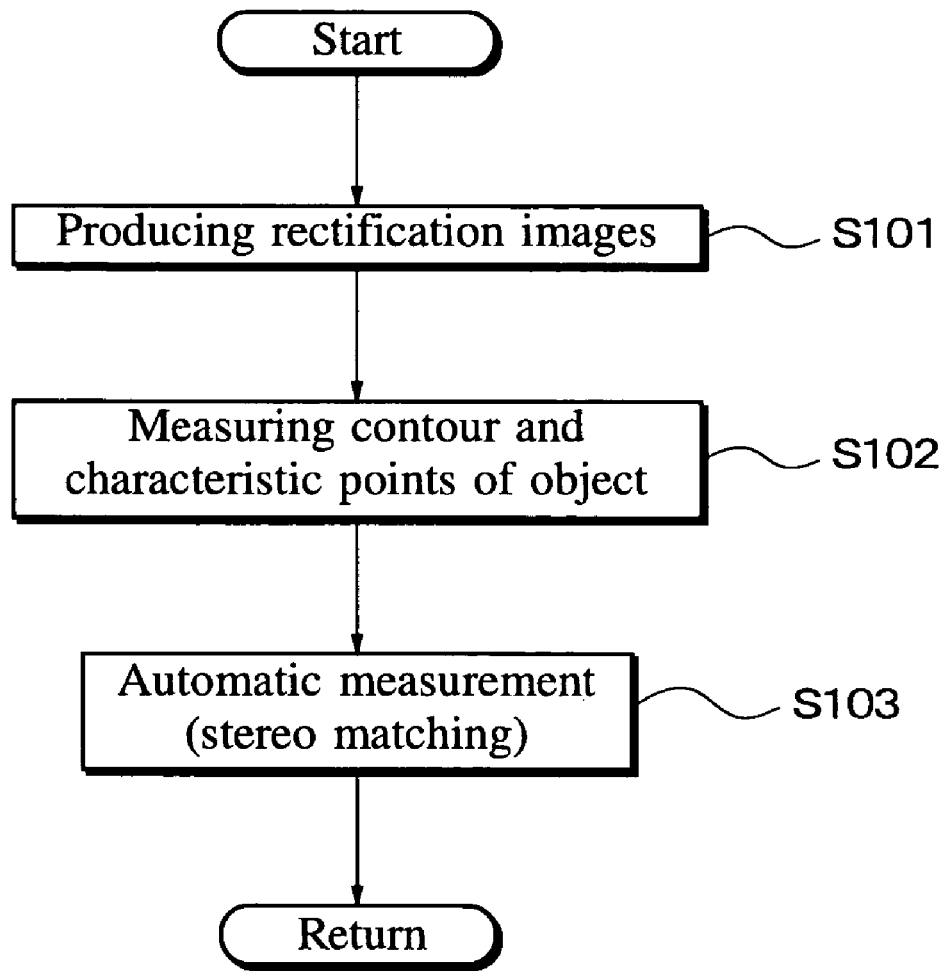
FIG. 13 is a flowchart for explaining the measuring process in a surface shape processing part.

FIG. 13 is a flowchart for explaining the measuring process in the surface shape processing part. The measuring process in the surface shape processing part 7 is executed on each pair of stereo images photographed at each photographing angle. Based on the stereo-photographing parameters obtained in advance, the actual stereo images of the measuring object 1 are reconstructed into rectified images which can be stereoscopically viewed (S101). The process in step S101 is unnecessary when the stereo cameras are attached in parallel to each other without vertical parallax and when the positions of the cameras do not change over time. However, when the process in step S101 is executed, there is no need to position the stereo cameras precisely or no need to takes changes over time into account.

Figure 14:
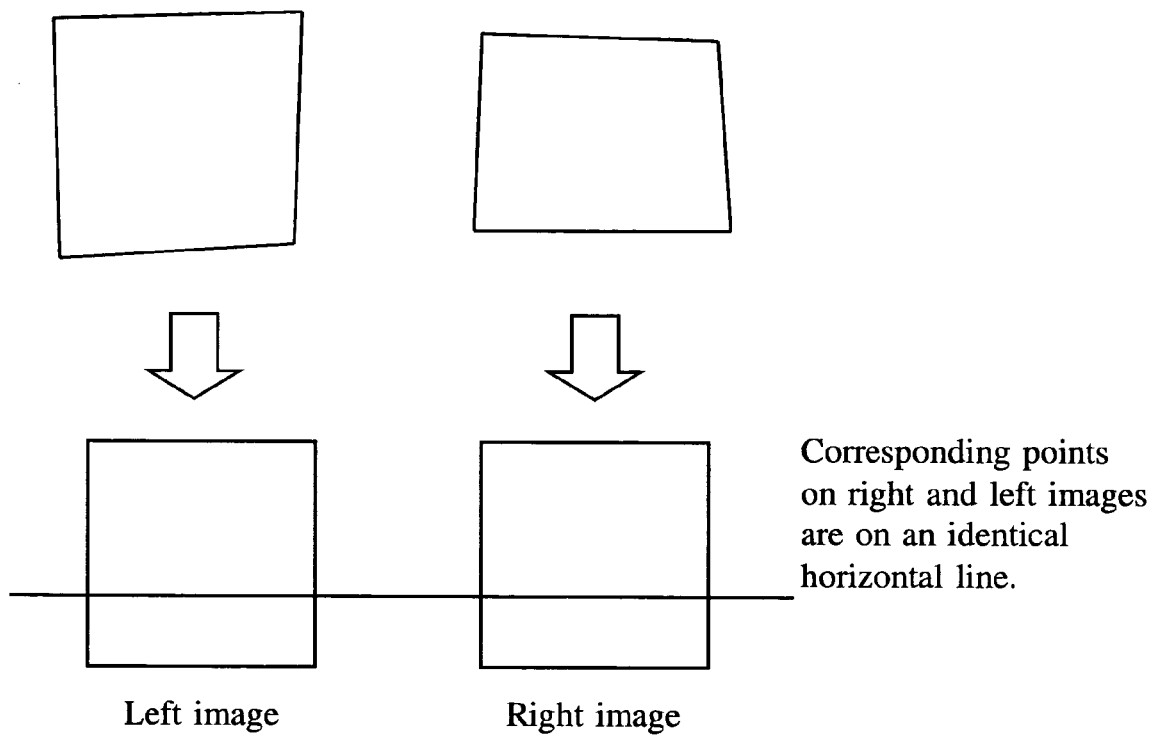
FIG. 14 is a view illustrating an example of rectification process, showing right and left images before and after the rectification process.

FIG. 14 is a diagram of one example of the rectification process, showing right and left images before and after the rectification process. By the rectification process, the vertical parallax between the right and left images is removed and horizontal lines on the right and left images are aligned into one straight line, whereby distortion-free, rectified images can be obtained.

Then, the contour and characteristic points of the measuring object 1 are measured at each photographing angle of the measuring subject 1 (S102). The measurement of the contour and characteristic points of the measuring object 1 is made by designating corresponding points on the right and left images with a mouse or the like, referring to stereo images displayed on the displaying/plotting part 8. In the measuring process in step S102, only by designating the corresponding points on the right and left images, the three-dimensional coordinates of the positions can be determined from the principle of the stereo method since rectified images parallel to the measuring object have been obtained based on the stereo-photographing parameters of the images.

1.3 [Stereo Method]

Figure 15:
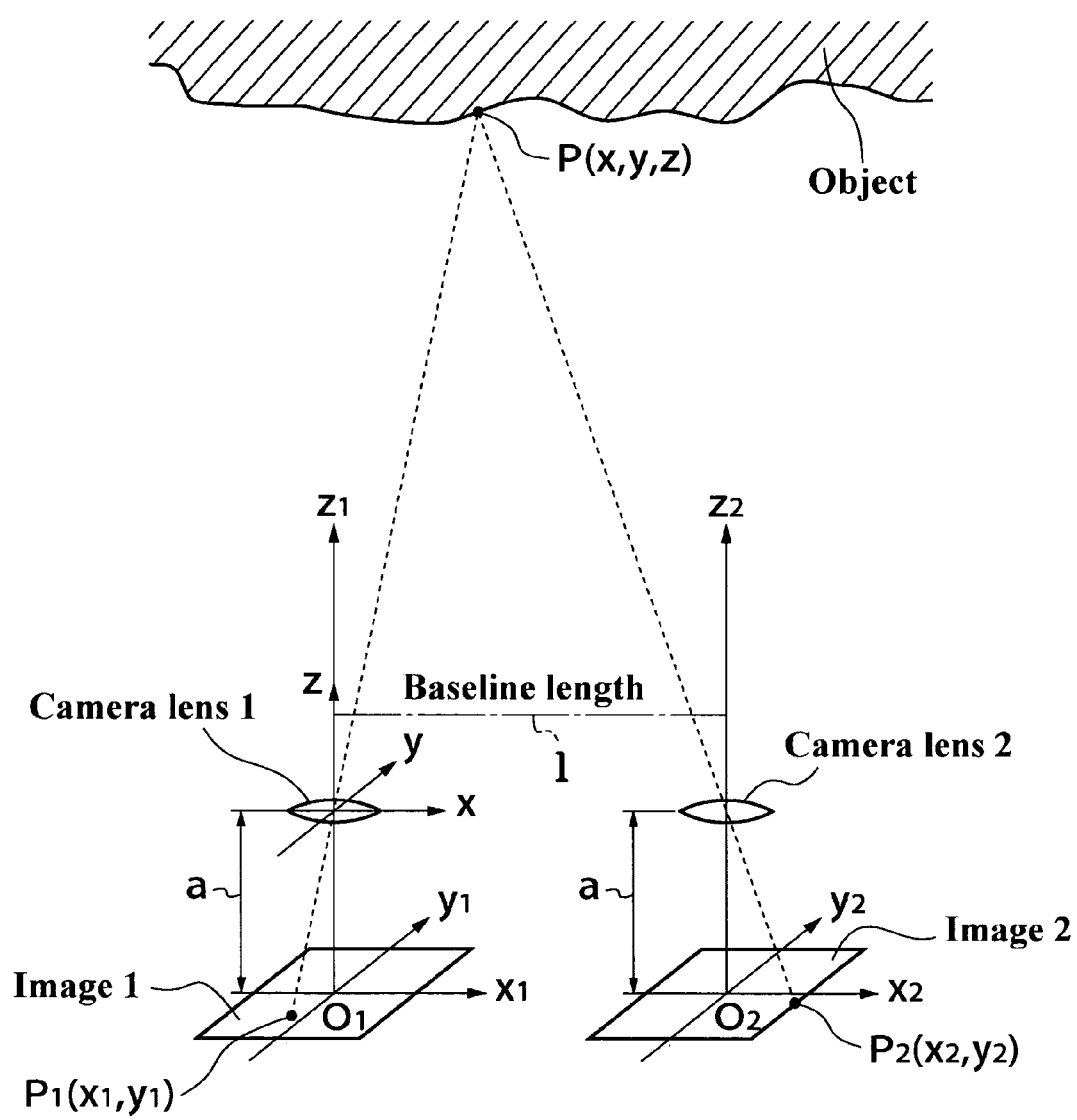
FIG. 15 is a view for explaining the principle of the stereo method.

FIG. 15 is a diagram for explaining the principle of the stereo method. Here, for simplicity, two identical cameras are placed with their optical axes parallel to each other and with the principal points of their lenses at an equal distance "a" from a CCD plane on which images 1 and 2 are focused, and the CCD is placed at a right angle to the optical axes. The distance between the two optical axes (baseline length) is assumed to be 1. The coordinates of the points P1 (x1, y1) and P2(x2, y2) on the object are in the following relationship:

$$x1 = ax/z \quad (8)$$

$$y1 = y2 = ay/z \quad (9)$$

$$x2 - x1 = a1/z \quad (10)$$

where the origin of the entire coordinate system (x, y, z) is located at the principal point the lens of the camera 1. Obtaining z from the equation (10) and using it with the equations (8) and (9), x and y are obtained.

By designating the contour of the measuring object 1 in step S102, the automatic measurement area in step S103 is set. Thus, it is sufficient to designate a rough contour (automatic measurement area) on each image without measuring the characteristic points for the next automatic measurement. The automatic measurement area may be automatically set using the information on the distance to the object or image processing such as characteristic point extracting process.

When the characteristic points are measured, the data are also used as initial values for the automatic measurement. When there is no need for three-dimensional measurement over the entire measuring surface and when there is need only for measurement of characteristic points, the data obtained here can be used without executing the process in step S103. However, when the process in step S103 is not executed, the images which will be produced by the displaying/plotting part 8 are less accurate than when the process in step S103 is executed.

Then, automatic measurement (stereo matching) is executed (S103). In the stereo matching process, area-based matching using the normalized correlation process is used. When the characteristic points have been measured in step S102, the information is also used. A large number of three-dimensional coordinates on the surface of the object can be thereby obtained.

1.4 [Normalized Correlation Method]

Description will be made of the normalized correlation process. As shown in FIG. 9, an N1×N1 pixel image is cut out from the left image as a template image to be searched from the right image and a search is made along an identical line in the right image. Then, a position where the correlation coefficient C(a, b) defined by the equation 11 is maximum is the position of the desired image.

$$C(a, b) = \sum_{mI=0}^{NI-1} \sum_{nI=0}^{NI-1} \frac{\{I_{(a,b)}(m_1, n_1) - \bar{I}\}\{T(m_1, n_1) - \bar{T}\}}{\sqrt{I_{\sigma_{ab}} T_\sigma}} \quad (11)$$

$$\text{where } \bar{I} = \frac{1}{NI^2} \sum_{mI=0}^{NI-1} \sum_{nI=0}^{NI-1} I_{(a,b)}(m_1, n_1) \quad (12)$$

$$\bar{T} = \frac{1}{NI^2} \sum_{mI=0}^{NI-1} \sum_{nI=0}^{NI-1} T(m_1, n_1) \quad (13)$$

$$I_{\sigma_{ab}} = \frac{1}{NI^2} \sum_{mI=0}^{NI-1} \sum_{nI=0}^{NI-1} \{I_{(a,b)}(m_1, n_1) - \bar{I}\}^2 \quad (14)$$

$$T_\sigma = \frac{1}{NI^2} \sum_{mI=0}^{NI-1} \sum_{nI=0}^{NI-1} \{T(m_1, n_1) - \bar{T}\}^2 \quad (15)$$

$I_{(a,b)}$ ($m_1$, $n_1$): a partial image in the object image, and $T(m_1, n_1)$: the template image.

From the coordinates of the corresponding points calculated by the automatic measurement, the three-dimensional coordinates of the points are calculated by the equations (8), (9) and (10). Based on the three-dimensional coordinates, image accomplishments can be produced. Since the image accomplishments are produced based on three-dimensional coordinate values, as the number of coordinate values is larger, the image accomplishments can be more accurate.

Since the coordinate system on each measuring surface is the coordinate system of the calibration subject 11, a complete circumferential image of the measuring object 1 can be produced only by connecting the images photographed at each photographing angle θ.

Description will be made of the plotting in step S4 in FIG. 6. For example, when three-dimensional coordinates have been obtained, an orthogonal projection image can be produced based on the three-dimensional coordinates. FIG. 16 is a diagram for explaining the difference between a central projection image and an orthogonal projection image. An image taken using a lens is a central projection image and is distorted since the subject is captured at the principal point of the lens. On the contrary, an orthogonal projection image is an image obtained by projecting a subject in parallel with a lens located at an infinite distance from the subject. Thus, the precise dimension of the subject is expressed in the image as in a map.

Thus, when an orthogonal projection image of the measuring object 1 is produced, a drawing of the measuring object 1 can be easily produced by tracing the orthogonal projection image. As compared with making a sketch of a buried cultural property or the like, time and labor can be significantly saved and the dimensional accuracy of the image can be improved because of the orthogonal projection image. In other words, any person can easily produce a drawing with high accuracy. Even when no drawing is produced, it is advantageous to store stereo images or an orthogonal projection image of the measuring object 1 since the measuring object 1 can be reproduced or developed into a drawing from the stereo images or orthogonal projection image at any time.

2. Second Embodiment

Figure 17:
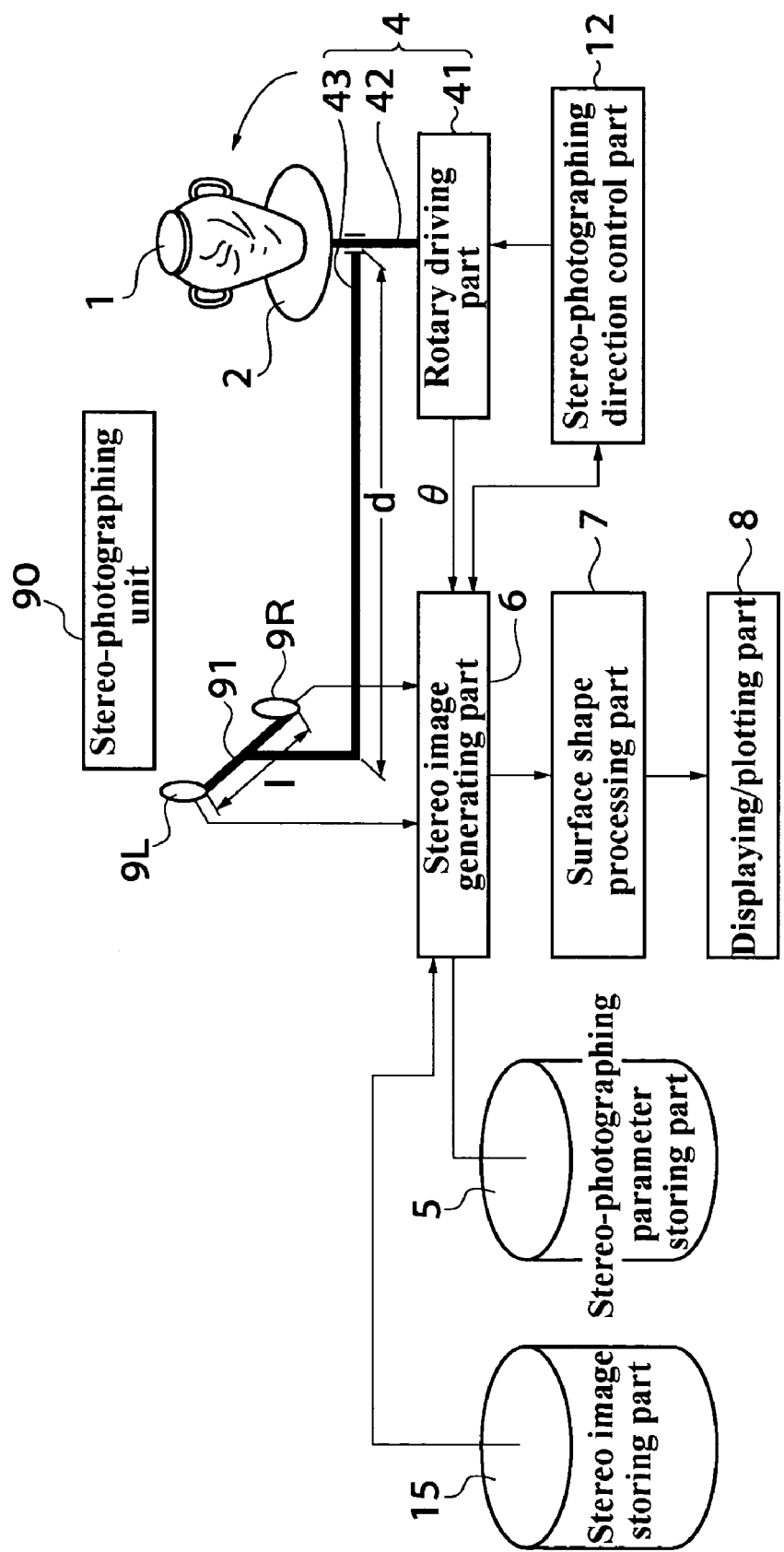
FIG. 17 is a block diagram illustrating the structure of a second embodiment of this invention.

FIG. 17 is a block diagram illustrating the structure of a second embodiment of this invention. The second embodiment differs from the first embodiment in that a stereo-photographing direction control part 12 and a stereo image storing part 15 are provided. The stereo-photographing direction control part 12 controls the relative position changing part 4 to change the angle θ corresponding to the direction from which the stereo-photographing unit 90 photographs the measuring object 1 so that the stereo-photographing unit 90 can photograph the measuring object 1 from at least three directions to obtain stereo images of the primary peripheral surfaces of the measuring object 1. The stereo-photographing direction control part 12 allows the measurement of a large number of measuring objects 1 to be made with high efficiency. The stereo-photographing control part 12 may be a sequence program registered in a PLC (programmable logic controller) which controls the rotary driving part 41 and the stereo-photographing unit 90 in an interlocking manner.

The stereo image storing part 15 stores a pair of stereo images of the measuring object 1 photographed by the stereo-photographing unit 90, preferably together with the photographing angle θ. The stereo image storing part 15 preferably stores the generated orthogonal projection image of the measuring object 1 together with the stereo images.

3. Third Embodiment

Figure 18:
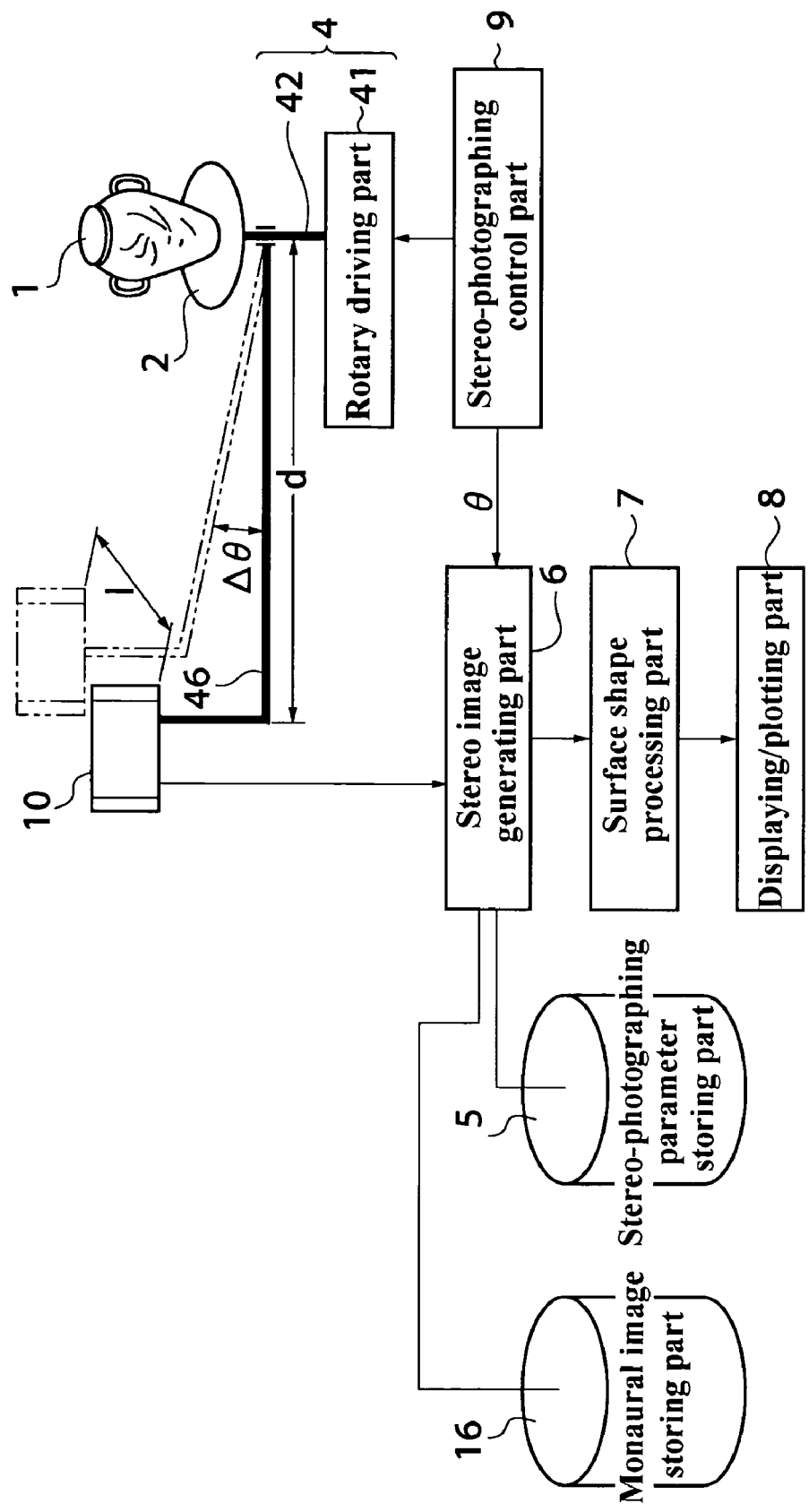
FIG. 18 is a block diagram illustrating the structure of a third embodiment of this invention.

FIG. 18 is a block diagram illustrating the structure of a third embodiment of this invention. The third embodiment differs from the first embodiment in that the function of photographing an object in stereo is accomplished by one imaging device 10 and a stereo-photographing control part 9. The stereo-photographing control part 9 rotates an imaging device connecting rod 46 as the relative position changing part 4 so that the imaging device 10 can photograph the measuring object 1 from stereo-photographing directions consisting of a pair of right and left photographing directions. The imaging device connecting rod 46 keeps the distance d between the table 2 and the imaging device 10 constant and is driven by the rotary driving part 41 to move the imaging device 10 by a rotational angle difference Δθ. The distance from the original position of the imaging device 10 to the position a rotational angle difference Δθ away from the original position is the baseline length "l", and the positions correspond to the right and left photographing directions. Here, the images of the measuring object 1 photographed by the imaging device 10 are preferably stored in a monaural image storing part 16 together with the photographing angle θ. By combining the paired photographing directions of the stereo-photographing control part 9 and two images photographed from given directions and stored in the monaural image storing part 16, the processing in the stereo image generating part 6 can be executed.

In the third embodiment, each stereo pair images are obtained by converging photographing, in other words, the photographed images are perpendicular to the object and are not parallel to each other. Thus, the imaged area and its scale in the right and left images are less stable as compared with the images photographed by the stereo-photographing unit 90 of the first or second embodiment. Thus, when the measuring object 1 has a complicated shape, the possibility that the measurement accuracy is unstable or the automatic measurement (stereo matching) does not succeed is higher as compared with the stereo-photographing unit 90 of the first or second embodiment.

4. Fourth Embodiment

Figure 19:
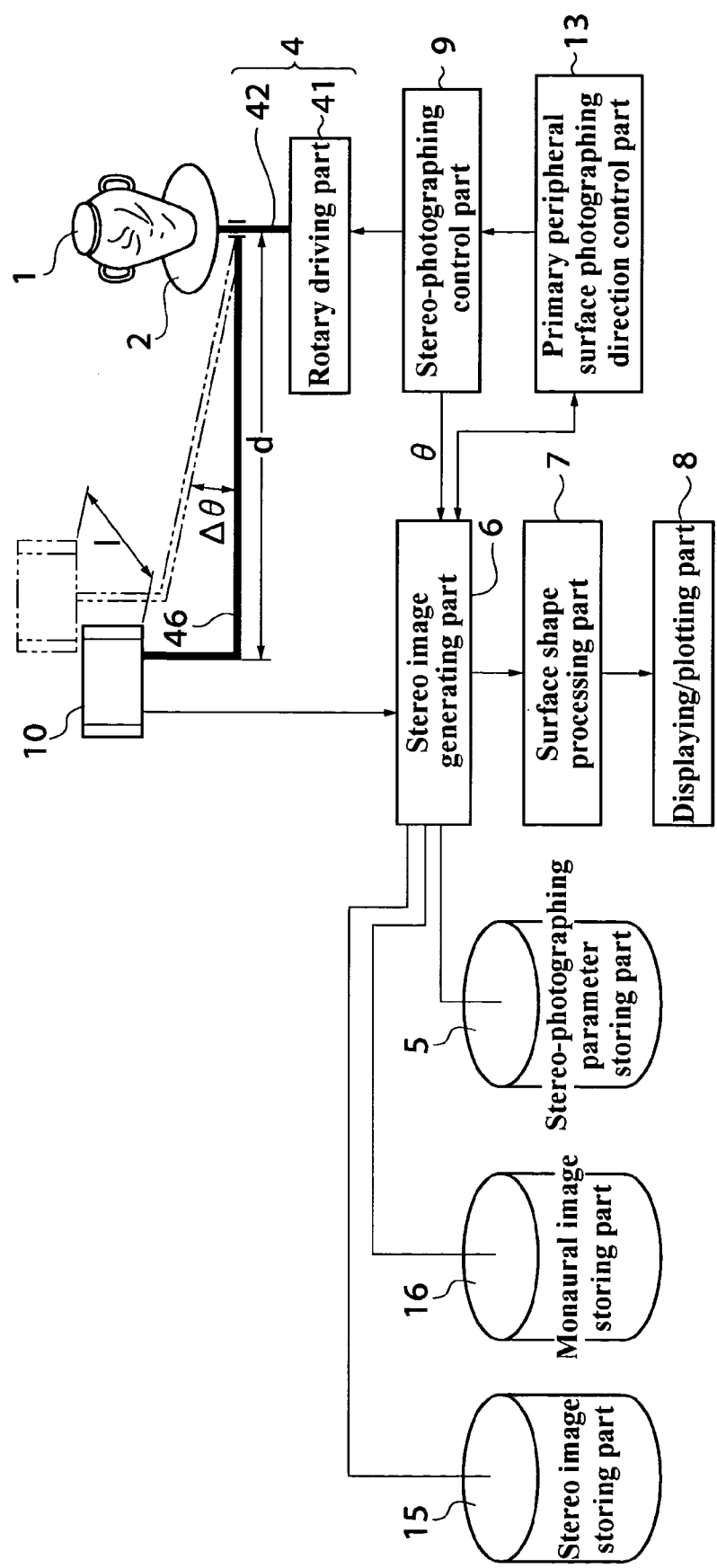
FIG. 19 is a block diagram illustrating the structure of a fourth embodiment of this invention.

FIG. 19 is a block diagram illustrating the structure of a fourth embodiment of this invention. The fourth embodiment differs from the third embodiment in that a primary peripheral surface photographing direction control part 13 and a stereo image storing part 15 are provided. The primary peripheral surface photographing direction control part 13 controls the stereo-photographing control part 9 so that the measuring object 1 can be photographed from at least three directions to obtain stereo images of the primary peripheral surfaces of the measuring object 1. To photograph from three directions means to obtain stereo images consisting of a pair of right and left images from three angles. The primary peripheral surface photographing direction control part 13 allows the measurement of a large number of measuring objects 1 to be made with high efficiency. The primary peripheral surface photographing direction control part 13 may be a sequence program registered in a PLC which controls the rotary driving part 41, the stereo-photographing control part 9 and the imaging device 10 in an interlocking manner.

The stereo image storing part 15 stores the images stored in the monaural image storing part 16 as a pair of stereo images of the measuring object 1 photographed by the stereo-photographing control part 9, preferably together with the photographing angle θ. The stereo image storing part 15 preferably stores the generated orthogonal projection image of the measuring object 1 together with the stereo images.

In the above embodiments, description has been made of a case where images covering the entire circumference of the measuring object 1 are needed as in the case of a buried cultural property. However, this invention is not limited to the above case. For example, in the case of a human body or a machine structure, the front face and right and left sides of the measuring object must be precisely measured, but precise information on the back face may not be necessary. In such a case, the photographing angles θ are set so that stereo images covering the necessary area can be obtained.

5. Fifth Embodiment

FIG. 20 is a perspective view of an essential part of a fifth embodiment of this invention. FIG. 20(A) shows a manner of photographing a calibration subject 11 in stereo, and FIG. 20(B) shows a manner of photographing a measuring object 1 in stereo. In the drawing, the measuring object 1 is an object having a surface shape or surface pattern to be three-dimensionally measured in a non-contact manner such as a trove, human body, vehicle, or machine structure. The calibration subject 11 has reference point marks as reference points whose three-dimensional relative positional relations have been determined in advance, and may be the one described in FIG. 3. A table 2 is a stand to place the measuring object 1 on, and may be a stage.

A stereo-photographing part 3 photographs the measuring object 1 or the calibration subject 11 placed on the table 2 in stereo and has, for example, four sets of stereo-photographing units for each stereo-photographing direction. Each stereo-photographing unit comprises two imaging devices 3R and 3L such as CCDs (charged-coupled devices), digital cameras or film-type cameras which are attached to a rod (not shown) as an imaging device fixing body at a distance l apart from each other. The optical axes of the two imaging devices 3R and 3L are generally parallel to each other and oriented toward the measuring object 1. Preferably, the two imaging devices 3R and 3L are located generally at the same distance d from the measuring object 1. To improve the accuracy, camera calibration is executed on the imaging devices 3R and 3L as the stereo-photographing unit. To execute camera calibration is to obtain the focal length, principle point position and distortion aberration of the camera with high precision.

Figure 21:
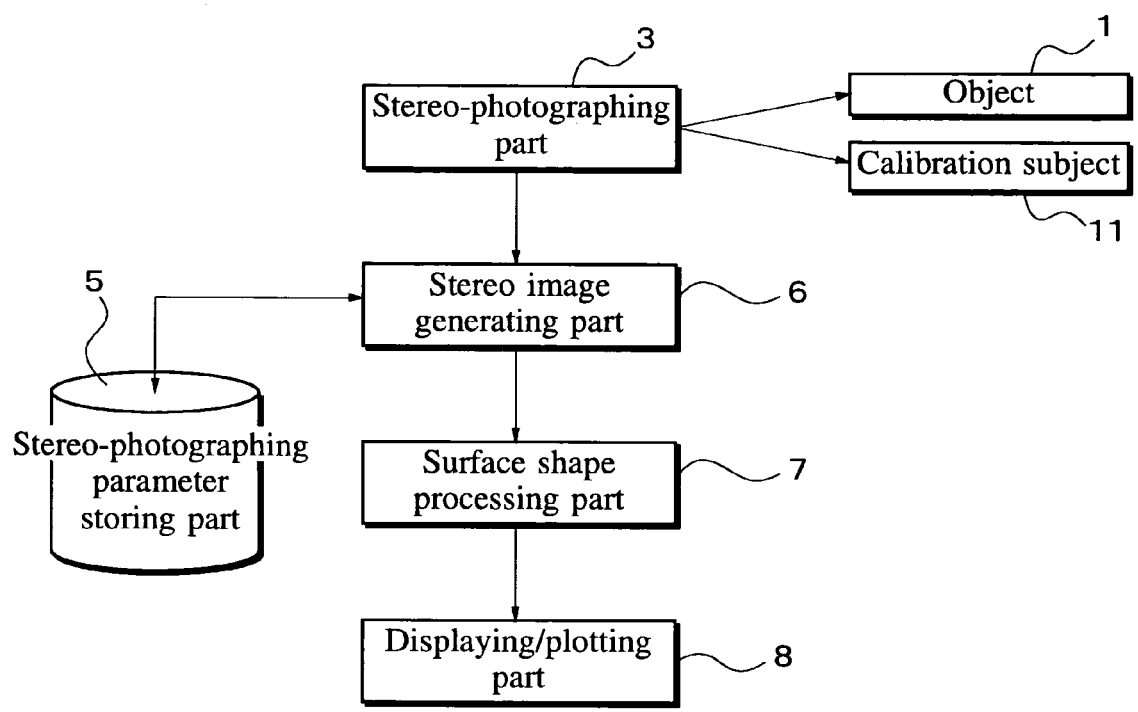
FIG. 21 is a block diagram illustrating the structure of an essential part of the fifth embodiment of this invention.

FIG. 21 is a block diagram illustrating the structure of an essential part of a fifth embodiment of this invention, showing the function of processing the signals of images photographed in stereo by the stereo-photographing part. The stereo-photographing parameter storing part 5 stores stereo-photographing parameters in a plurality of directions from which the stereo-photographing part 3 photographs the measuring object 1 in stereo. The photographing parameters are used to rectify a pair of right and left images photographed in stereo to convert them to stereo images which can be viewed stereoscopically. In the case of the stereo-photographing part 3 having stereo-photographing units for each stereo-photographing direction as shown in FIG. 20, the parameters are the baseline length, photographing position and tilt of each stereo-photographing unit.

A stereo image generating part 6 generates stereo images of the measuring object 1 after the stereo-photographing part 3 photographs the measuring object 1 from the plurality of directions with the stored stereo-photographing parameters, and comprises a processor which can perform high-speed image processing. A surface shape processing part 7 measures the surface shape of the measuring object 1 based on the stereo images of the measuring object 1. A displaying/plotting part 8 comprises a display device such as a CRT and liquid crystal display for displaying the surface shape of the measuring object 1 measured by the surface shape processing part 7, a plotter or printer for producing graphics on a sheet of paper, a digital plotter for producing three-dimensional impression data, or the like. The calibration subject 11 is used to determine a coordinate system used as a reference to produce rectified stereo images and to obtain the positions and tilts of the two imaging devices 3R and 3L constituting the stereo-photographing part 3. To improve the accuracy in producing rectified stereo images, the calibration subject 11 is preferably slightly larger than the measuring object 1.

Description will be made of the process for measuring the surface shape of the measuring object 1 with an apparatus constituted as described above. The process for measuring the surface shape of the measuring object using an apparatus shown in FIG. 20 and FIG. 21 is generally the same as the process shown by the flowchart shown in FIG. 6. Here, the steps peculiar to this embodiment will be described in detail.

Figure 22:
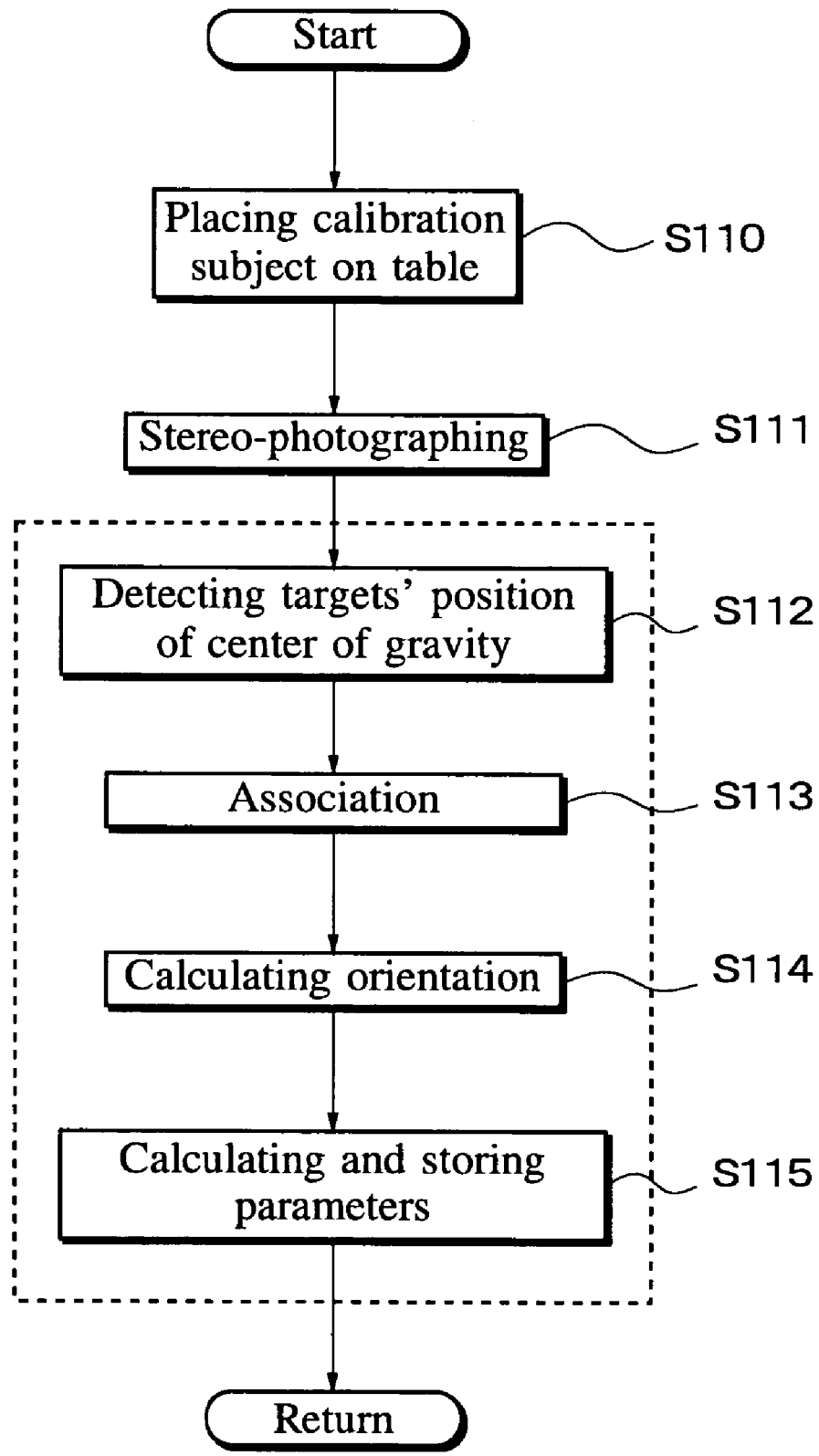
FIG. 22 is a flowchart for explaining the initialization in a direction in which stereo-photographing is performed.

First, initialization of the coordinate system corresponding to step S1 in FIG. 6 will be described in detail. FIG. 22 is a flowchart for explaining the initialization in a direction in which stereo-photographing is performed. The calibration subject 11 on which reference points are three-dimensionally arranged is placed on the position where the measuring object 1 is to be placed (S110). The stereo-photographing unit photographs the calibration subject 11 in stereo from at least two directions (S111). Using the stereo images of the calibration subject 11, initializing and measuring process is executed on the stereo images for each reference side 111. Thus, the process is executed on the two right and left images photographed by the stereo-photographing unit 3 as one stereo pair. First, the positions of the center of gravity of the reference point marks 113 as targets on a pair of stereo images are detected (S112). The detection of the targets' positions of the center of gravity (S112), association (S113), orientation calculation (S114), and calculation of stereo-photographing parameters (S115) are the same as those in steps S42, S44, S46 and S48, respectively, in FIG. 8.

The thus obtained stereo-photographing parameters are stored for all the stereo-photographing directions representing each of the corresponding reference sides 111 or for all pairs of the imaging devices 3R and 3L (S115). The initialization of the coordinate system in step S1 is thereby completed. The process may be executed prior to each measurement or can be executed once when the coordinate systems do not include errors due to changes over time.

Figure 23:
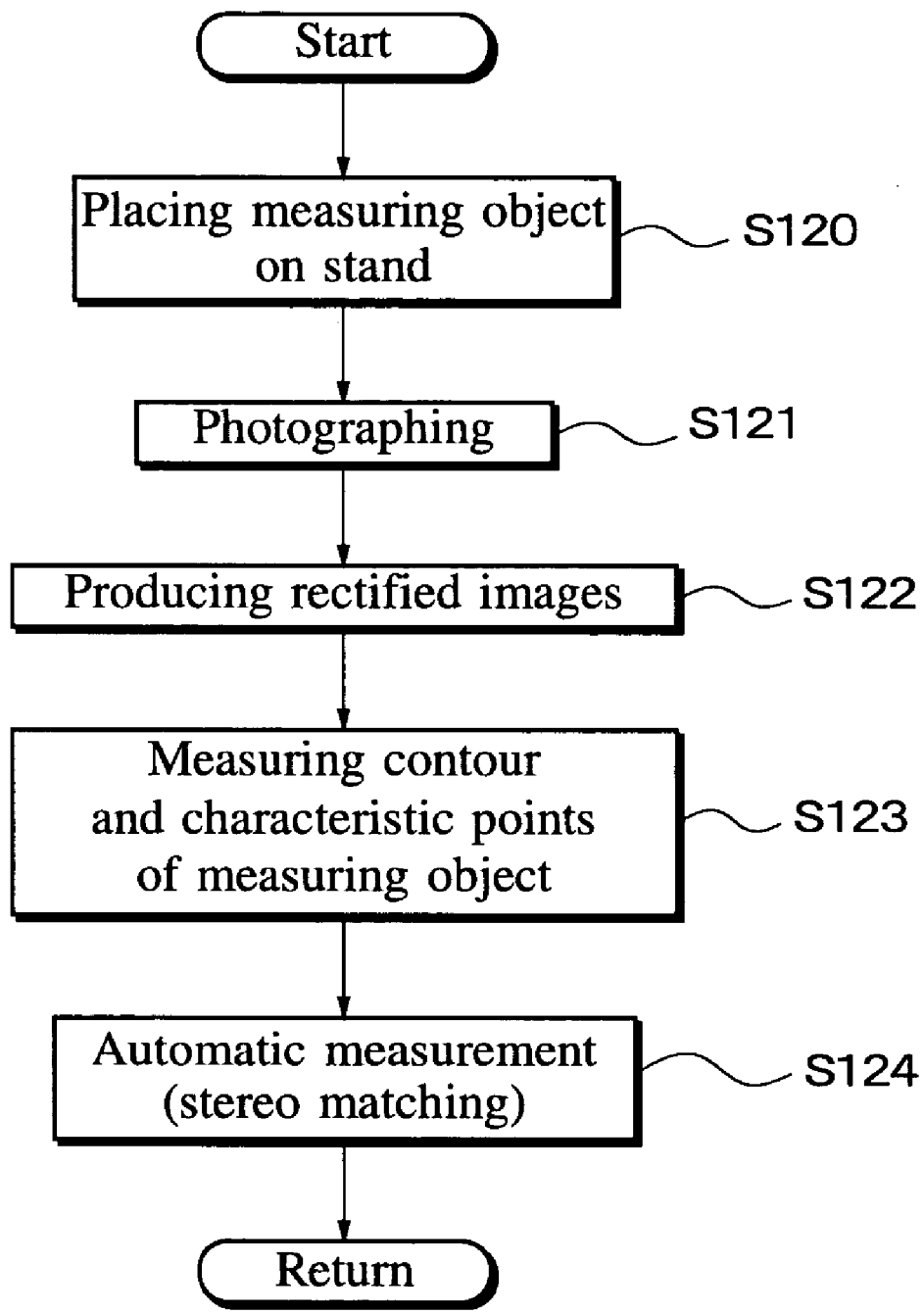
FIG. 23 is a flowchart for explaining the process for photographing a measuring object in stereo.

The step of photographing the measuring object 1 in stereo corresponding to step S2 in FIG. 6 will be described. FIG. 23 is a flowchart for explaining the process for photographing the measuring object in stereo. First, the measuring object 1 is placed on the table 2 (S120). The stereo-photographing unit photographs the measuring object 1 in stereo from at least two directions with stored stereo-photographing parameters (S121). When the measuring object 1 is photographed in stereo from all directions, the surface shape processing part 7 executes the measuring process (S122). By the measuring process, the images photographed in stereo are formed into stereo images of the measuring object 1 using the stereo-photographing parameters. The actual stereo images of the measuring object 1 are reconstructed into rectified images which can be viewed stereoscopically. The reconstruction process into rectified images is not necessary when the stereo cameras are attached parallel to each other without vertical parallax and do not move over time. However, when the reconstruction process into rectified images is executed, the stereo cameras need not be positioned precisely or changes over time do not have to be taken into account.

Returning to FIG. 23, the contour and characteristic points of the measuring object 1 in each photographing direction are measured (S123). The measurement of the contour and characteristic points of the measuring object 1 is made by designating the corresponding points on the right and left images with a mouse or the like, referring to stereo images displayed on the displaying/plotting part 8. In the measuring process in step S123, only by designating the corresponding points on the right and left images, the three-dimensional coordinates of the positions can be obtained from the principle of the stereo method since rectified images parallel to the measuring object have been obtained based on the stereo-photographing parameters of the images.

By designating the contour of the measuring object 1 in step S123, the automatic measurement area in step S124 is set. Thus, it is sufficient to designate a rough contour (automatic measurement area) on each image without measuring the characteristic points for the next automatic measurement. The automatic measurement area may be automatically set using the information on the distance to the object or image processing such as characteristic point extracting process. When the characteristic points of the measuring object 1 have been measured in step S123, the data are also used as initial values for the automatic measurement.

Then, automatic measurement (stereo matching) is executed (S124). In the stereo matching process, area-based matching using the normalized correlation process is used. When the characteristic points have been measured in step S123, the information is also used. A large number of three-dimensional coordinates on the surface of the object can be thereby obtained.

When there is no need for three-dimensional measurement over the entire surface of the measuring surface but there is need for measurement of characteristic points, the data obtained here can be used without executing the process in step S124. When the process in step S124 is not executed, the images which will be produced by the displaying/plotting part 8 are less accurate than when the process in step S124 is executed.

6. Sixth Embodiment

Figure 25:
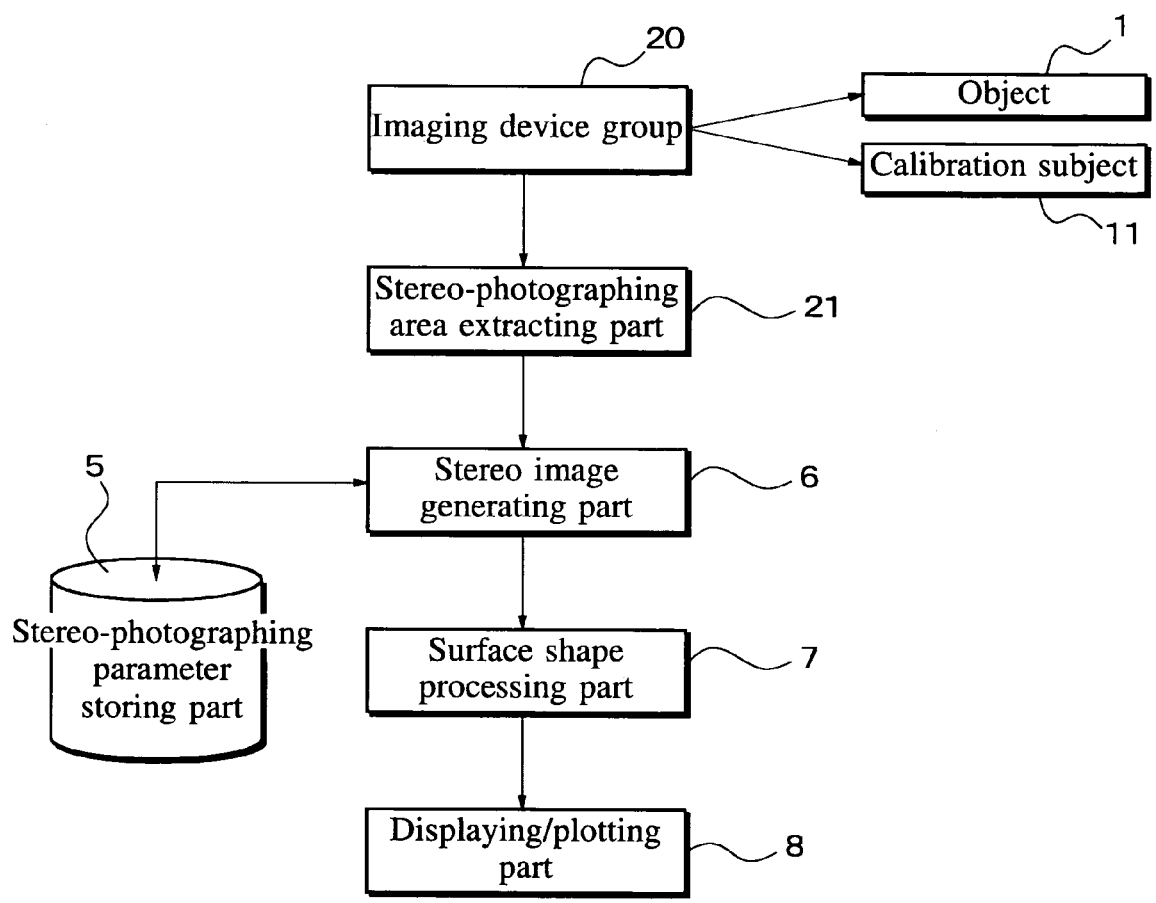
FIG. 25 is a block diagram illustrating the structure of an essential part of the sixth embodiment of this invention.

FIG. 24 is a perspective view of an essential part of a sixth embodiment, and FIG. 25 is a block diagram illustrating the structure of an essential part of the sixth embodiment. The sixth embodiment differs from the fifth embodiment in that an imaging device group 20 and a stereo-photographing area extracting part 21 are provided instead of the stereo-photographing part 3 comprising stereo-photographing units for each stereo-photographing direction. The imaging device group 20 comprises eight imaging devices 10A, 10*b*, . . . , and 10H, each of which photographs the measuring object 1 from a predetermined direction. The imaging devices 10A to 10H have photographing angles θA to θH, respectively, determined with respect to a reference azimuth such as the north direction N and located at distances dA to dH, respectively, from the measuring object 1 or the calibration subject 11. The optical axes of the imaging devices 10A to 10H are directed to the measuring object 1 or the calibration subject 11 although the optical axes of the imaging devices 3R and 3L (see FIG. 20) constituting a stereo-photographing unit are generally parallel to each other and oriented toward the measuring object 1 in the fifth embodiment.

The stereo-photographing area extracting part 21 extracts an overlapping area from images of the measuring object 1 photographed by two imaging devices of the imaging device group 20. The overlapping area is useful to produce stereo images. The stereo-photographing parameter storing part 5 stores parameters in the photographing directions of at least two pairs of imaging devices of the imaging device group 20 which have photographed the images having an overlapping area extracted by the stereo-photographing area extracting part 21.

Figure 26:
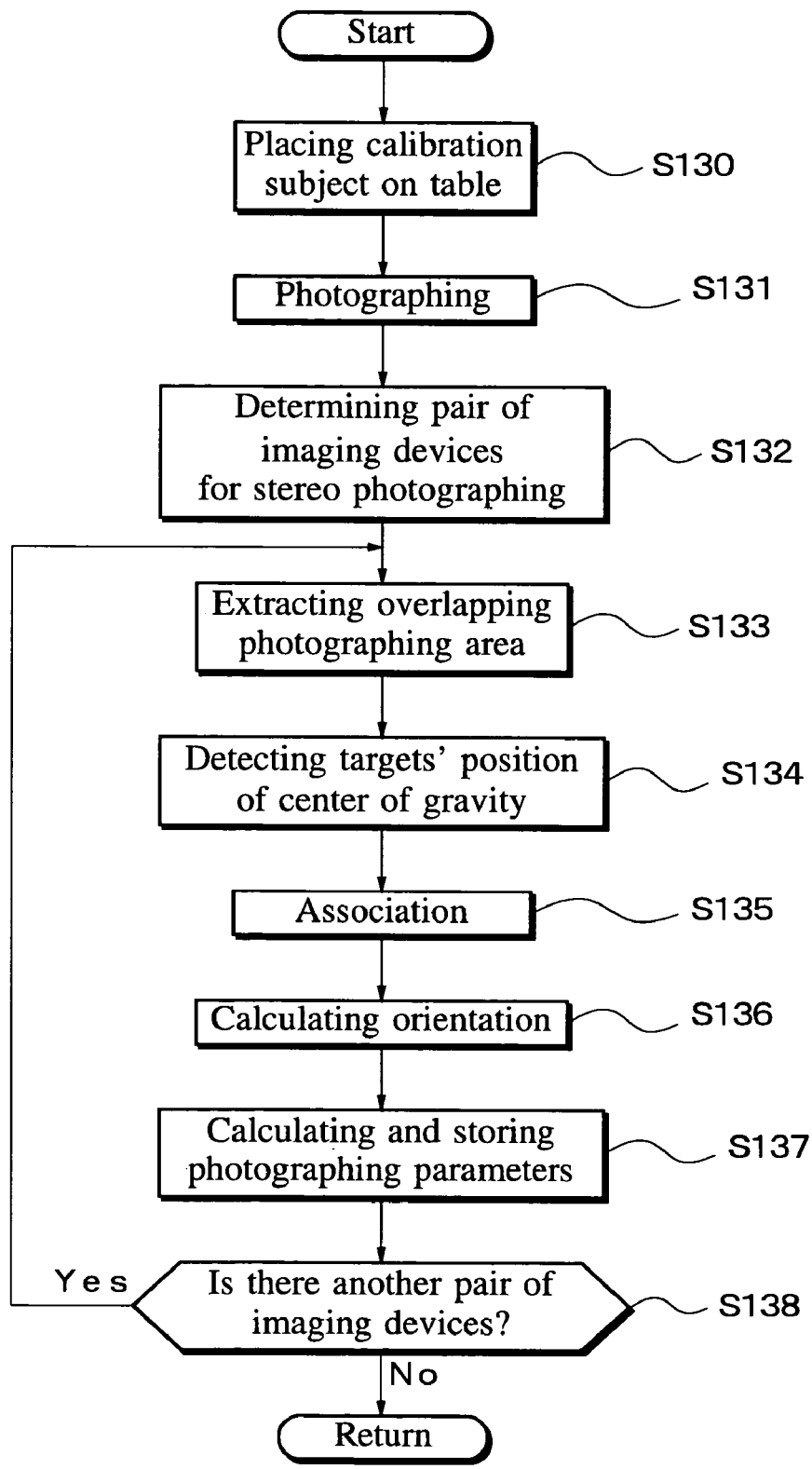
FIG. 26 is a flowchart for explaining the initialization in the sixth embodiment.

Description will be made of the process for measuring the surface shape of the calibration subject 11 and the measuring object 1 with an apparatus constituted as described above. FIG. 26 is a flowchart for explaining the initialization in the sixth embodiment. First, the calibration subject 11 on which reference points are three-dimensionally arranged is placed on the position where the measuring object 1 is to be placed (S130). Then, the imaging devices 10A, 10B, . . . , and 10H of the imaging device group 20 photograph the calibration subject 11 (S131). Then, a pair of imaging devices for stereo-photographing are determined (S132). In general, adjacent imaging devices having a large overlapping area in the images of the calibration subject 11 are determined as the paired imaging devices for stereo-photographing. Then, the stereo-photographing area extracting part 21 extracts the overlapping area of the images of the calibration subject 11 photographed by the two imaging devices for stereo-photographing (S133).

The detection of the targets' positions of the center of gravity (S134), association (S135), orientation calculation (S136), and calculation of stereo-photographing parameters (S137) are the same as those in steps S42, S44, S46 and S48, respectively, in FIG. 8. The calculated stereo-photographing parameters are stored in the stereo-photographing parameter storing part 5 (S137). Then, it is judged whether there are other two imaging devices constituting another pair of stereo-photographing devices (S138). If so, the process returns to step S133. Otherwise, the measurement of the calibration subject 11 is completed.

Figure 27:
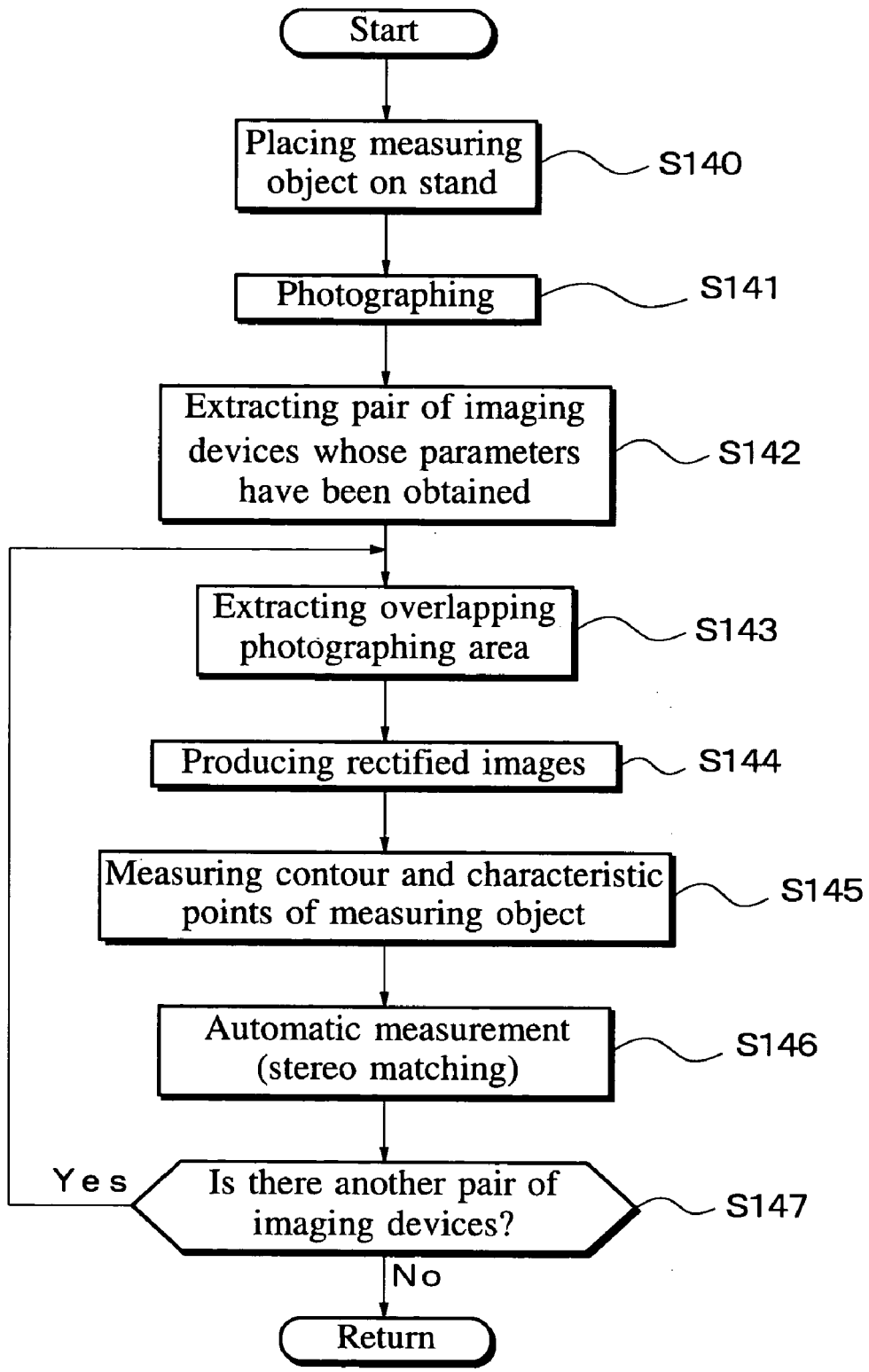
FIG. 27 is a flowchart for explaining the process for photographing a measuring object in stereo in the sixth embodiment.

FIG. 27 is a flowchart for explaining the process for photographing the measuring object in stereo in the sixth embodiment. First, the measuring object 1 is placed in a position such as on the table 2 (S140). The imaging devices 10A, 10B, . . . , and 10H of the imaging device group 20 photograph the measuring object 1 in the position (S141). Then, with reference to the result obtained in step S132 shown in FIG. 26, a pair of imaging devices constituting a pair of stereo-photographing devices are extracted (S142). The stereo-photographing image extracting part 21 extracts an overlapping area from the images photographed by the two imaging devices constituting the paired stereo-photographing devices (S143). Then, using the stereo-photographing parameters of the paired stereo-photographing devices stored in the stereo-photographing parameter storing part 5, the images of the overlapping area extracted in step S143 are formed into stereo images of the measuring object 1 (S144).

The production of rectified images (S144), the measurement of the contour and characteristic points of the measuring object (S145), and the automatic measurement (S146) are the same as those in steps S122 to S124, respectively, in FIG. 23. The measurement of the contour and characteristic points of the measuring object (S145) and the automatic measurement (S146) correspond to the process for measuring the surface shape of the measuring object 1 based on the stereo images of the measuring object 1. Then, it is judged whether there are other two imaging devices constituting another pair of stereo-photographing devices (S147). If so, the process returns to step S143. Otherwise, the measurement of the measuring object 1 is completed.

7. Seventh Embodiment

Figure 28:
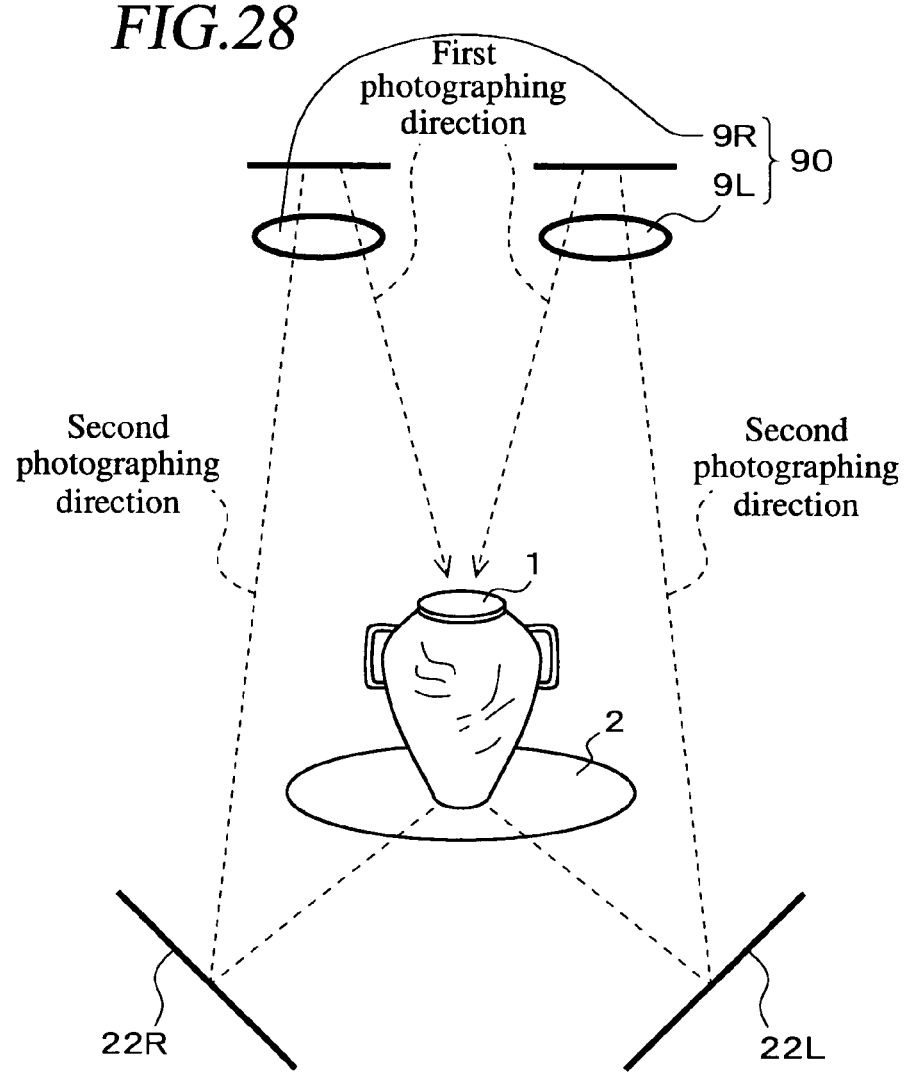
FIG. 28 is a view illustrating the structure of an essential part of a seventh embodiment of this invention.

FIG. 28 is a diagram illustrating the structure of an essential part of a seventh invention of this invention. As shown in FIG. 28, the stereo-photographing unit 90 comprises right and left imaging devices 9R and 9L for photographing the measuring object 1 in stereo directly from first photographing directions. Second photographing directions are formed by light paths reflected from mirrors 22R and 22L as a light path changing part 22 so that the stereo-photographing unit 90 can photograph the measuring object 1 in stereo from the second photographing directions.

Figure 29:
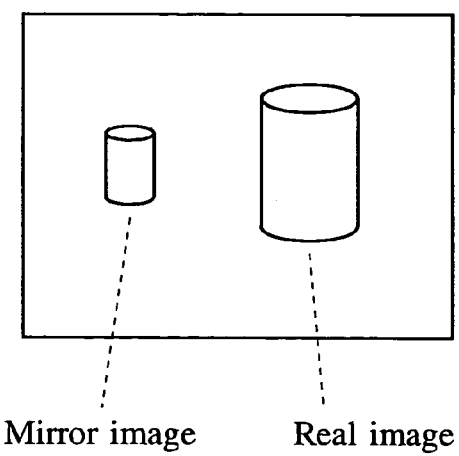
FIG. 29 is an explanatory view of a measuring object captured by each imaging device of a stereo-photographing unit.

FIG. 29 is an explanatory diagram of the measuring object captured by each imaging device of the stereo-photographing unit. As shown in FIG. 29, the right imaging device 9R or the left imaging device 9L captures a real image of the measuring object 1 and an image of the measuring object 1 viewed from a different angle which is reflected from the mirror 22R or 22L. The real images of the measuring object 1 are images photographed in stereo directly from the first photographing directions. The mirror images of the measuring object 1 are images photographed in stereo from the second photographing directions using the light path changing part 22.

Figure 30:
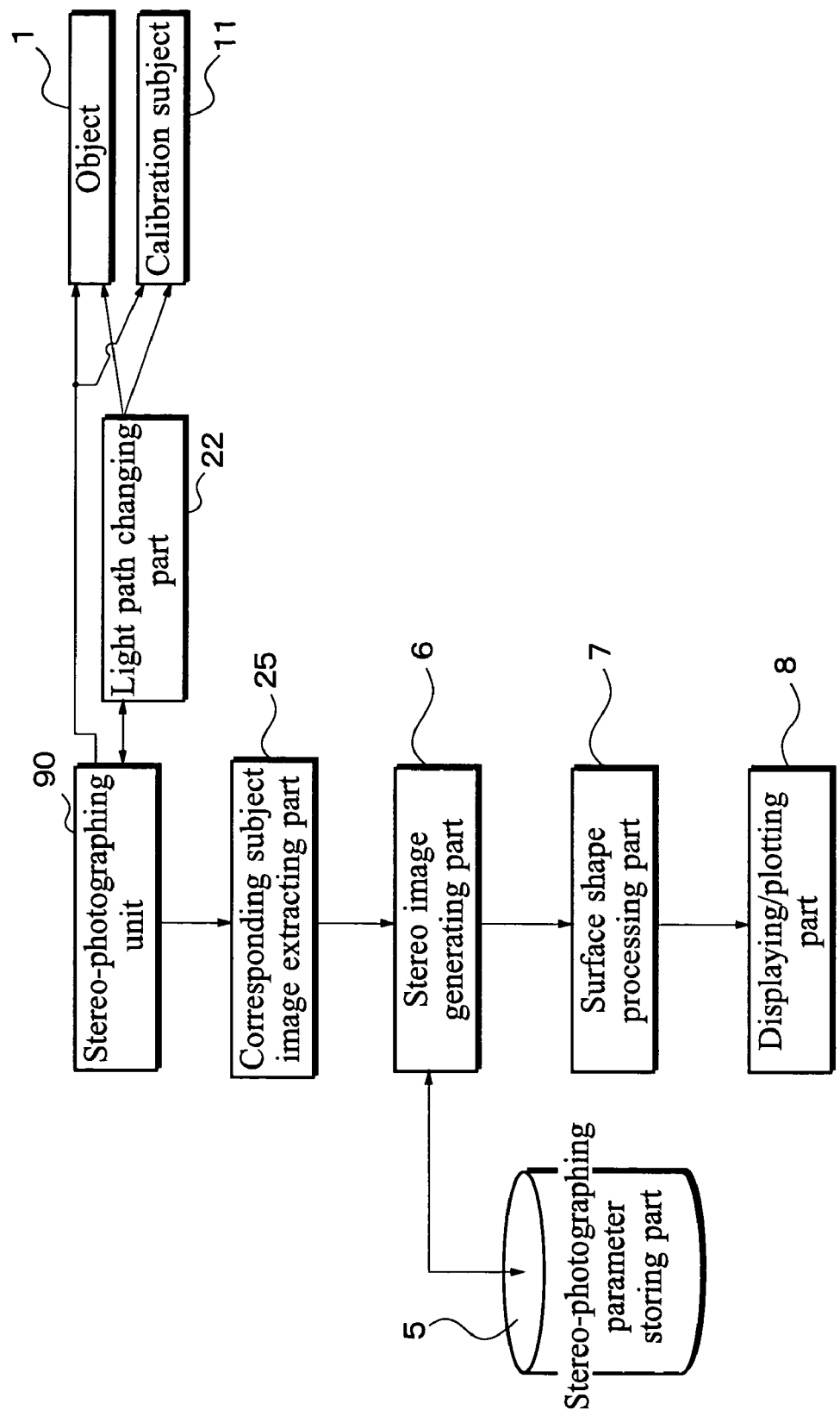
FIG. 30 is a block diagram illustrating the structure of an essential part of the seventh embodiment of this invention.

FIG. 30 is a block diagram illustrating the structure of an essential part of the seventh embodiment of this invention. The stereo-photographing unit 90 comprises a pair of imaging devices 9R and 9L such as CCDs, digital cameras or film-type cameras. The light path changing part 22 changes the light paths between the stereo-photographing unit 90 and the measuring object 1 so that the stereo-photographing unit 90 can photograph the measuring object 1 in stereo from the second photographing directions. As the light path changing part 22, mirrors, for example, are used. A corresponding subject image extracting part 25 separates a real image and a mirror image in an image photographed by the stereo-photographing unit 90. The corresponding subject image extracting part 25 separates an image photographed from the first photographing direction and an image photographed from the second photographing direction based on, for example, the size of the images.

The stereo-photographing parameter storing part 5, which stores stereo-photographing parameters in a plurality of directions from which the stereo-photographing unit 90 photographs the measuring object 1, stores stereo-photographing parameters obtained using the calibration subject 11 for paired real images or mirror images in right and left images photographed in stereo. In this embodiment, the real images and mirror images are photographed at different distances, so that the parameters such as the scale are different for each stereo pair. However, the parameters can be corrected completely by stereo-photographing parameters measured using the calibration subject 11 in initialization (described later).

The stereo image generating part 6 executes a process for obtaining rectified images from the paired real images or mirror images in the right and left images photographed in stereo using the stereo-photographing parameters. The images photographed in stereo only need to have necessary accuracy or resolution regarding the measuring object 1. Namely, in measuring the measuring object 1 three-dimensionally, since the coordinates obtained regarding the measuring object 1 are converted into coordinates on the calibration subject 11, the difference in the photographing distance does not make a large difference. However, the magnification difference between the paired real images and that between the paired mirror images must be within the magnification difference between the real images and mirror images since the smaller magnification difference between the paired real images and the smaller magnification difference between the paired mirror images are more preferable. The other component elements are the same as those which have already been described.

Figure 31:
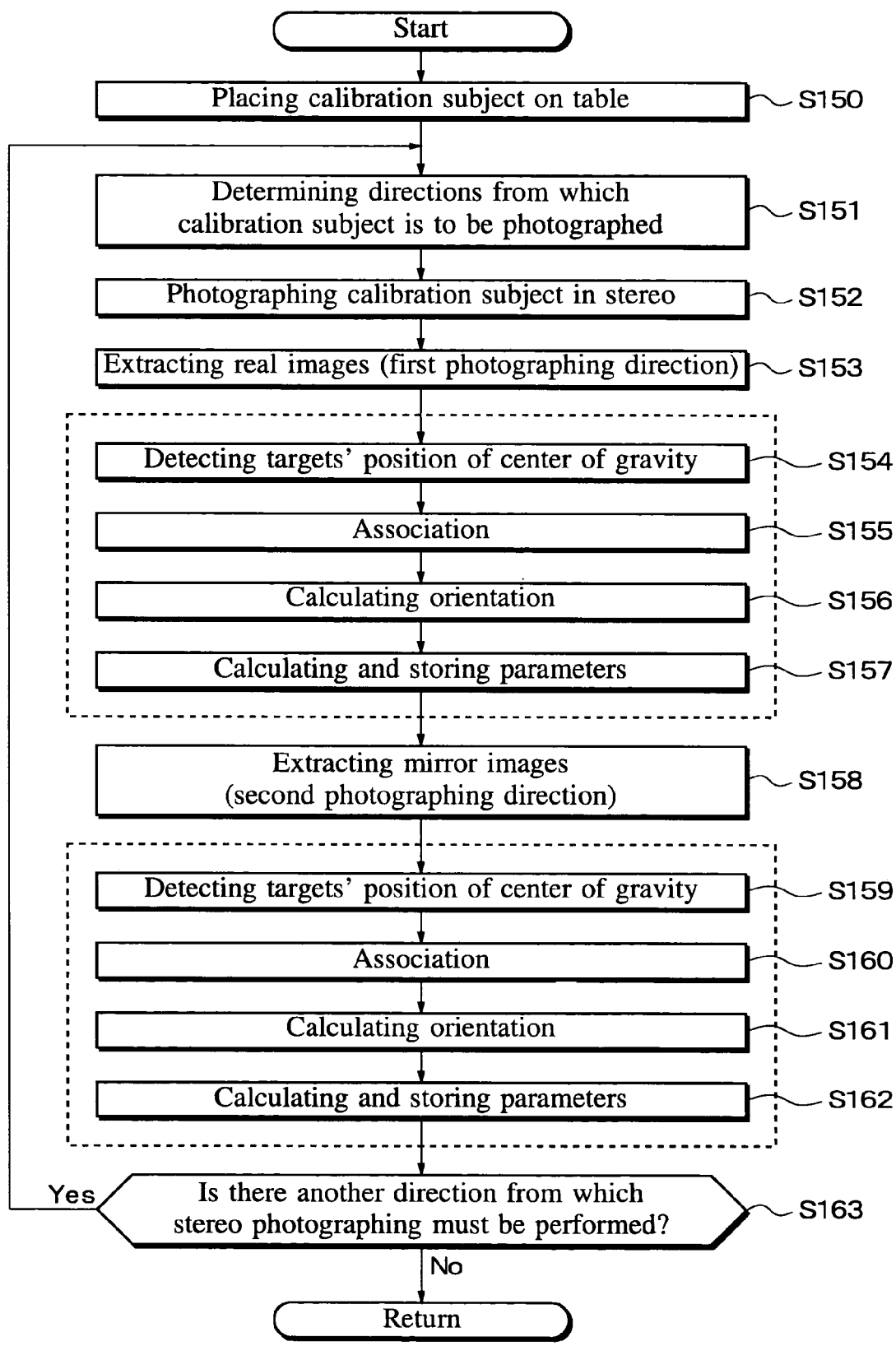
FIG. 31 is a flowchart for explaining the initialization in the seventh embodiment.

Description will be made of the process for measuring the surface shape of the calibration subject 11 and the measuring object 1 with an apparatus constituted as described above. FIG. 31 is a flowchart for explaining the initialization in the seventh embodiment. First, the calibration subject 11 on which reference points are three-dimensionally arranged is placed in a position where the measuring object 1 is to be placed (S150). Then, the direction from which the calibration subject 11 is to be photographed by the imaging devices 9R and 9L constituting the stereo-photographing unit 90 is determined (S151). The stereo-photographing unit 90 photographs the calibration subject 11 in stereo (S152).

The corresponding subject image extracting part 25 extracts real images of the calibration subject 11 (first photographing direction) from the images photographed in stereo (S153). For example, when two images having shapes similar to each other but different in size are captured in the images photographed in stereo, the corresponding subject image extracting part 25 regards the lager image as the real image of the calibration subject 11. The detection of the targets' positions of the center of gravity (S154), association (S155), orientation calculation (S156), and calculation of stereo-photographing parameters (S157) are the same as those in steps S42, S44, S46 and S48, respectively, in FIG. 8. Then, the corresponding subject image extracting part 25 extracts mirror images of the calibration subject 11 (second photographing directions) from the images photographed in stereo. For example, when two images having shapes similar to each other but different in size are captured in the images photographed in stereo, the corresponding subject image extracting part 25 regards the smaller image as the mirror image of the calibration subject 11. The detection of the targets' positions of the center of gravity (S159), association (S160), orientation calculation (S161), and calculation of stereo-photographing parameters (S162) are the same as those in steps S42, S44, S46 and S48, respectively, in FIG. 8. Then, it is judged whether there is another direction from which stereo-photographing must be performed (S163). If yes, the process returns to step S151. If no, the measurement of the calibration subject 11 is completed.

Figure 32:
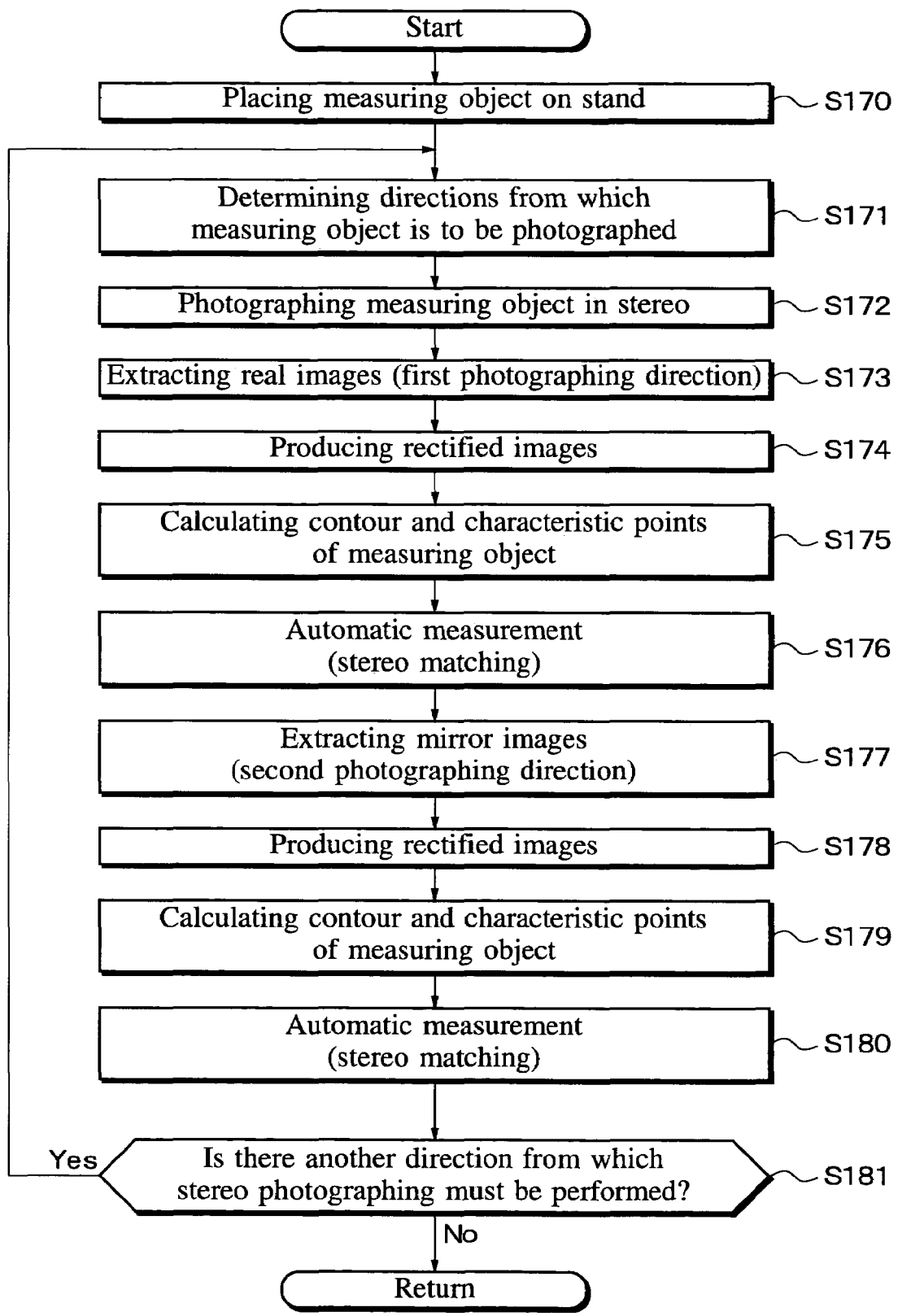
FIG. 32 is a flowchart for explaining the process for photographing a measuring object in stereo in the seventh embodiment.

FIG. 32 is a flowchart for explaining the process for photographing the measuring object in stereo in the seventh embodiment. First, the measuring object 1 is placed in a position such as on the table 2 (S170). Then, the direction from which the measuring object 1 placed in the position is to be photographed by the imaging devices 9R and 9L constituting the stereo-photographing unit 90 is determined (S171). The stereo-photographing unit 90 photographs the measuring object 1 in stereo (S172).

Then, the corresponding subject image extracting part 25 extracts real images of the measuring object 1 (first photographing direction) from the images photographed in stereo (S173). The production of rectified images (S174), the measurement of the contour and characteristic points of the measuring object (S175), and the automatic measurement (S176) are the same as those in steps S122 to S124, respectively, in FIG. 23. The measurement of the contour and characteristic points of the measuring object (S175) and the automatic measurement (S176) correspond to the process of measuring the surface shape of the measuring object 1 based on the stereo images of the measuring object 1. Then, the corresponding subject image extracting part 25 extracts mirror images of the measuring object 1 (second photographing directions) from the images photographed in stereo (S177). The production of rectified images (S178), the measurement of the contour and characteristic points of the measuring object (S179), and the automatic measurement (S180) are the same as those in steps S122 to S124, respectively, in FIG. 23. Then, it is judged whether there is another direction from which stereo-photographing must be performed (S181). If yes, the process returns to step S171. If no, the measurement of the measuring object 1 is completed.

In an apparatus constituted as described above, the front and back faces of the measuring object 1 can be photographed in stereo simultaneously. Thus, as compared with the case where only the real images or mirror images are photographed, the number of times the measuring object 1 is rotated to photograph the entire circumference of the measuring object 1 can be reduced. Namely, the measuring object 1 is rotated only half the times it has to be rotated in the case where only the real images are photographed. Although the stereo-photographing unit 90 is used in the above embodiment, the stereo-photographing is made with one imaging device 10 and stereo-photographing control part 24.

In the above embodiment, a real image and a mirror image are included in a single image photographed in stereo. In some cases, however, large images including only the real image or mirror image are required even if the number of photographs increases. In such a case, light-shielding devices such as liquid crystal shutters may be inserted in the first and second photographing directions and images photographed in stereo may be obtained with the light-shielding devices activated.

In the above embodiments, description has been made of a case where images covering the entire circumference of the measuring object 1 are needed as in the case of a buried cultural property. However, this invention is not limited to the above case. For example, in the case of a human body or a machine structure, the front face and right and left sides of the measuring object must be precisely measured, but precise information on the back face may not be necessary. In such a case, the photographing angles θ are set so that stereo images covering the necessary area can be obtained.

8. Eighth Embodiment

Figure 33:
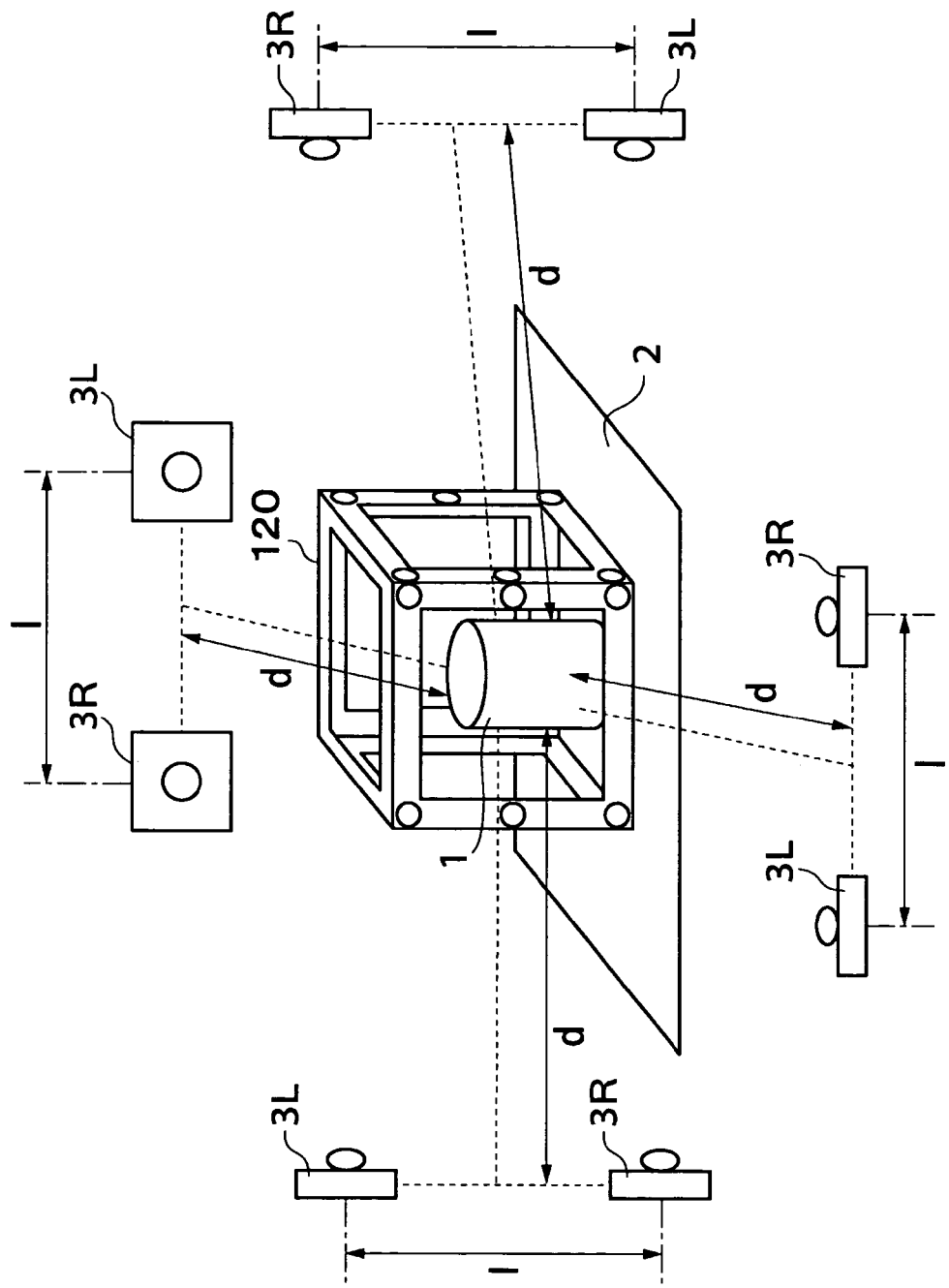
FIG. 33 is a view of illustrating the structure of an essential part of an eighth embodiment of this invention, showing the positional relation among a measuring object, calibration subject and a stereo-photographing part.

FIG. 33 is a diagram illustrating the structure of an essential part of an eighth embodiment of this invention, showing the positional relation among the measuring object, calibration subject and stereo-photographing part. In the drawing, a measuring object 1 is an object having a surface shape or surface pattern to be measured three-dimensionally in a non-contact manner such as a trove, human body, vehicle, or machine structure. A calibration subject 120 has reference point marks as reference points whose three-dimensional relative positional relations have been determined in advance. The calibration subject 120 will be described in detail later with reference to FIG. 36. A table 2 is a stand to place the measuring object 1 on together with the calibration subject 120, and may be a stage.

A stereo-photographing part 3 photographs the measuring object 1 and the calibration subject 120 placed on the table 2 in stereo and has stereo-photographing units for each stereo-photographing direction. Each of the stereo-photographing unit comprises two imaging devices 3R and 3L such as CCDs (charged-coupled devices), digital cameras or film-type cameras which are attached to a rod as an imaging device fixing body (not shown) at a distance l apart from each other.

FIG. 34 is a block diagram illustrating the structure of an essential part of the eighth embodiment of this invention, showing the function of processing the signals of images photographed in stereo by the stereo-photographing part. A photographing parameter calculating part 50 extracts images of the reference points on the calibration subject 120 from the image data photographed in stereo from each stereo-photographing direction by the stereo-photographing units of the stereo-photographing part 3 to obtain photographing parameters in each stereo-photographing direction based on the positions of the reference points.

A surface shape measuring part 60 obtains the surface shape of the measuring object 1 based on the photographing parameters obtained in the photographing parameter calculating part 50 and the positions of images of the measuring object 1 photographed together with the images of the reference points of the calibration subject 120 in the photographed image data from which the photographing parameters have been obtained. FIG. 35 is an explanatory diagram of a pair of images of the measuring object and the calibration subject photographed in stereo. FIG. 35(A) is an image photographed from the left photographing direction and FIG. 35(B) is an image photographed from the right photographing direction. As shown in FIG. 35, since a pair of right and left images photographed in stereo include the measuring object and calibration subject, the photographing parameters obtained based on the calibration subject 120 are applicable to the image of the measuring object 1.

The measurement of the surface shape of the measuring object 1 in the surface shape measuring part 60 uses an operation method for measuring unevenness of a surface based on stereo images for use in aerial photogrammetry or the like. It is preferred that the surface shape measuring part 60 extract the characteristic points of the measuring object 1, obtain the positions of the characteristic points, and then measure the entire surface shape of the measuring object 1 based on the thus obtained positions of the characteristic points. A displaying/plotting part 8 comprises a display device such as a CRT and liquid crystal display for displaying the surface shape of the measuring object 1 measured by the surface shape measuring part 60, a plotter or printer for producing graphics on a sheet of paper, a digital plotter for producing three-dimensional impression data, or the like. The photographing parameter calculating part 50, the surface shape measuring part 60 and the displaying/plotting part 8 may be incorporated in a digital plotter or a personal computer.

FIG. 36 is a perspective view illustrating the structure of calibration subjects for use in calculation of photographing parameters. FIG. 36(A) shows a calibration subject having a frame body with a rectangular cross-section, FIG. 36(B) shows a calibration subject having a frame body with a hexagonal cross-section, FIG. 36(C) shows another aspect of the calibration subject having a frame body with a rectangular cross-section, and FIG. 36(D) shows another aspect of the calibration subject having a frame body with a hexagonal cross-section. The calibration subject has a frame body so that it does not hide the surface of the measuring object 1 in photographing, measuring and plotting the measuring object 1 from each photographing direction. The calibration subject 120 is used to determine a coordinate system as a reference in rectifying images into stereo images and to obtain the positions and tilts of the two imaging devices 3R and 3L constituting the stereo-photographing part 3. To improve the accuracy in the rectification, the calibration subject 120 is preferably slightly larger than the measuring object 1.

As shown in FIG. 36(A), a calibration subject 120 having a frame body with a rectangular cross-section has four reference sides 121. On each of the reference sides 121, at least six reference point marks 123 are formed along the frames. This is because at least six known points are necessary to determine the attitude or coordinates of one plane. The reference point marks 123 may be a white mark on a black background or a black mark on a white background reflective mark, or a reflective mark such as a retroreflective target. The reference point marks 123 may be formed by attaching stickers on which the reference point marks 123 are printed or by directly printing the reference point marks 123 on the reference sides 121.

As shown in FIG. 36(B), a calibration subject 120B having a frame body with a hexagonal cross-section has six reference sides 121B. At least six reference point marks 123B are formed on each of the reference sides 121B, by which information necessary to determine the attitude or coordinates of one plane is provided. The positions of the reference point marks 123 on the calibration subject 120 must be measured using a three-dimensional coordinate system with a precise instrument in advance. In this embodiment, stereo-photographing is performed for each reference side 121 of the calibration subject 120. Thus, stereo-photographing is performed the same number of times as the number of the reference sides 121. The directions from which stereo-photographing is performed are the directions from which the stereo-photographing part 3 photographs the reference sides 111 in stereo and, preferably, coincident with the directions normal to the reference sides 121.

Figure 37:
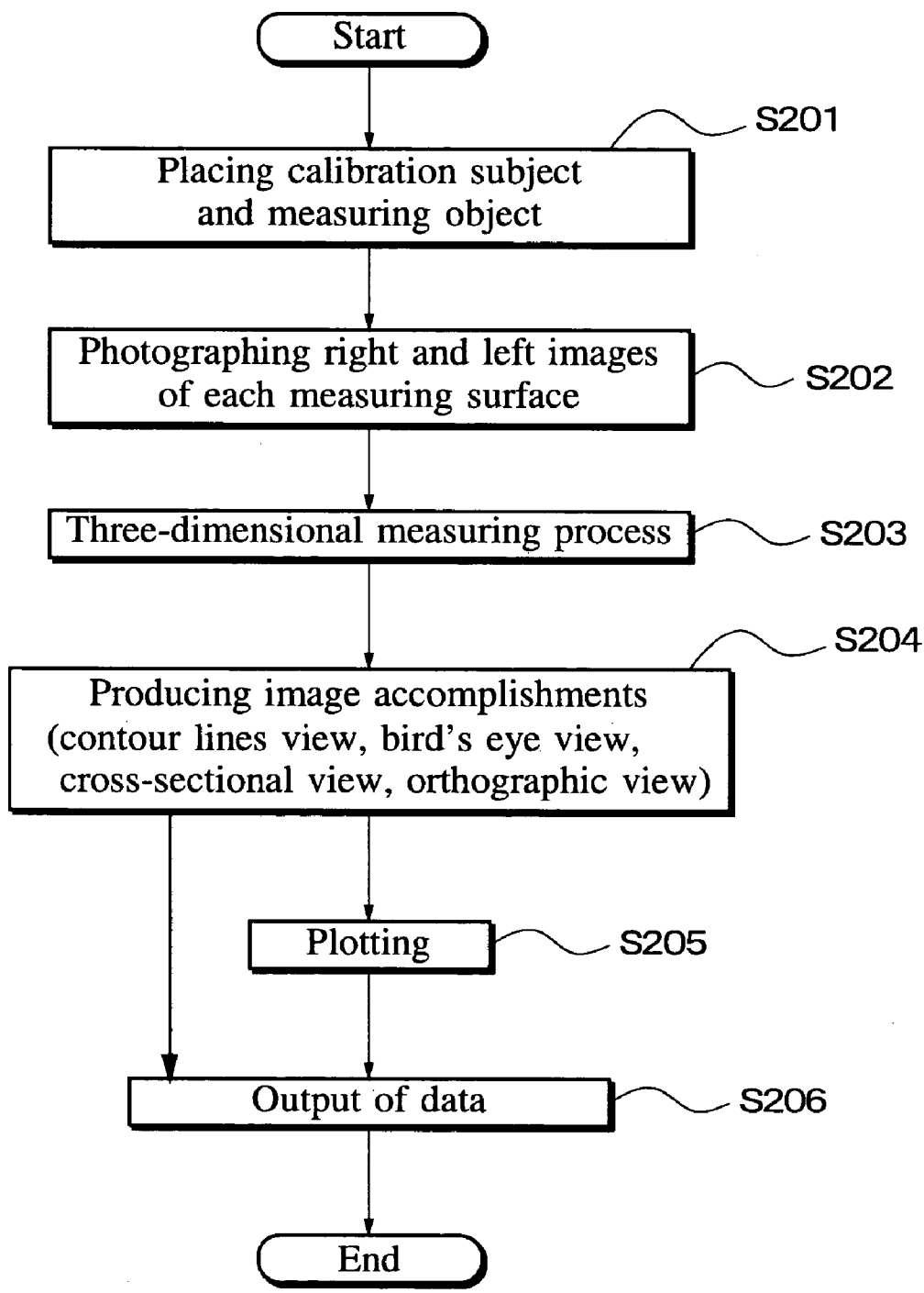
FIG. 37 is a flowchart for generally explaining the process for measuring a measuring object with an apparatus shown in FIG. 33 and FIG. 34.

Description will be made of the process for measuring the surface shape of the measuring object 1 with an apparatus constituted as described above. FIG. 37 is a flowchart for generally explaining the entire process for measuring the measuring object with the device shown in FIG. 33 and FIG. 34. First, the measuring object 1 and the calibration subject 120 are placed on the table 2 (S201). The position is so determined that the measuring object 1 is not hidden behind the calibration subject 120. Then, an operator photographs the reference sides 121 of the calibration subject 120 in stereo with the stereo-photographing part 3 (S202). Since the stereo-photographing is performed for each reference side 121, eight monaural images are taken in total by the imaging devices 3R and 3L in the case of the frame body with a rectangular cross-section as shown in FIG. 36(A). In the case of the frame body with a hexagonal cross-section as shown in FIG. 36(B), twelve monaural images are taken in total by the imaging devices 3R and 3L.

Then, the three-dimensional measuring process is executed on the images photographed in stereo from each stereo-photographing direction using the photographing-parameters obtained using the reference points on the calibration subject 120 (S203). Based on the result of the three-dimensional measurement of the measuring object 1, image accomplishments are produced (S204). The plotting of the result of the three-dimensional measurement is performed based on an orthogonal projection image of the measuring object 1 produced as a result of the three-dimensional measurement (S205). If the plotting is not performed, step S205 may be skipped. Then, the result of the three-dimensional measurement of the measuring object 1 is outputted as data (S206).

Description will be made in detail of the three-dimensional measuring process in step S203 with reference to the flowchart in FIG. 38. First, the photographing parameter calculating part 50 and the surface shape measuring part 60 read all the photographed images as photographed image data (S210). The thus read photographed image data are associated with the reference sides 121 of the calibration subject 120 (S220). When only one reference side 121 is measured and plotted, the process in step S220 is not necessary. When an operator performs the process in step S220 manually, the operator manually determines a stereo pair images on the displaying/plotting part 8. At this time, the characteristics of the side reference targets 122 such as the shape, pattern or color are useful.

The process in step S220 is suitable to be executed automatically by image processing. Namely, image processing is used to distinguish the side reference targets 122 on the side reference sides 121. For example, the images of the side reference targets on the reference sides 121 as template images are used to distinguish the marks by image correlation processing. In the image correlation processing, the sequential similarity detection algorithm (SSDA) or normalized correlation method may be used. In this case, the marks can be distinguished more reliably by the normalized correlation processing. The distinction of the side reference targets 122 may be made by a method of extracting characteristics or another pattern recognition method instead of by image correlation processing.

Then, stereo pairs of each reference side 121 are determined (S230). At this time, when the operator determines the stereo pairs, referring to the displaying/plotting part 8, possible errors which may occur when a pattern recognition method is mechanically applied can be avoided. The right and left images can be easily distinguished when photographing order is fixed to be from left to right, for example.

Then, the positions of the center of gravity of the side reference targets 122 and the reference point marks 123 are detected in a pair of stereo images of one reference side 121 (S240). The side reference targets 122 and the reference point marks 123 are also referred to simply as "targets". The positions of the reference point marks are detected roughly by, for example, a correlation method and the positions of the center of gravity of the reference point marks are then precisely calculated. The precise positions could be detected in one step. In that case, however, the operation takes a long time. It is thus preferred to use the sequential similarity detection algorithm as the process for detecting the rough positions.

Then, the reference point marks in the two images whose centers of gravity have been detected are associated with the reference point marks whose coordinates have been precisely measured in advance (S250). When there are six reference point marks, for example, the six points on the reference side 121 are associated with the corresponding points. Since the positions of the reference point marks are known in advance, it can be predicted where the reference point marks are positioned in the images. When the reference point marks are different from the other reference point marks, the association can be executed more reliably. Then, orientation calculation is executed to obtain the photographing parameters of the imaging devices 3R and 3L, such as the three-dimensional positions and tilts, the distance between the cameras (baseline length: l) and so on based on the coordinate system of the calibration subject 120 (S260). Then, the actual images of the measuring object 1 are reconstructed into rectified stereo images which can be stereoscopically viewed based on the thus obtained photographing parameters (S270).

Then, the contour and characteristic points on each measuring surface of the measuring object 1 are measured (S280). The measuring surfaces of the measuring object 1 have a close relation with the reference sides 121 of the calibration subject 120. The measurement of the contour and characteristic points of the measuring object 1 is executed by designating corresponding points on the right and left images with a mouse or the like, referring to stereo images displayed on the displaying/plotting part 8. In the measuring process in step S280, only by designating the corresponding points on the right and left images, the three-dimensional coordinates of the positions can be determined from the principle of the stereo method since rectified images parallel to the measuring object 1 have been obtained based on the photographing parameters of the images.

By designating the contour of the measuring object 1 in step S280, the automatic measurement area in step S290 is set. Thus, it is sufficient to designate a rough contour (automatic measurement area) on each image without measuring the characteristic points for the automatic measurement in step S290. The automatic measurement area may be automatically set using the information on the distance to the measuring object 1 or image processing such as characteristic point extracting process. When the characteristic points have been measured, the data are also used as initial values for the automatic measurement. When there is no need for three-dimensional measurement over the entire measuring surface and when there is need only for measurement of characteristic points, the data obtained in step S280 can be used without executing the process in step S290. However, when the process in step S290 is not executed, precise image accomplishments cannot be produced.

Then, automatic measurement (stereo matching) is executed (S290). In the stereo matching process, area-based matching using the normalized correlation process is used. When the characteristic points have been measured in step S280, the information is also used. A large number of three-dimensional coordinates on the surface of the object can be thereby obtained. From the coordinates of the corresponding points calculated by the automatic measurement, the three-dimensional coordinates of the positions are calculated by the equations (8), (9) and (10). When all the stereo pairs of the measuring sides of the measuring object 1 are processed, the process is ended (S100). Otherwise, steps S240 to S290 are repeated on the stereo pair images of the measuring surfaces of the measuring object 1.

Based on the thus measured three-dimensional coordinates, image accomplishments can be created. Since the image accomplishments are created based on three-dimensional coordinate values, as the number of coordinate values is larger, the image accomplishments can be more accurate. The coordinate system on each measuring surface is the coordinate system of the calibration subject 11, so that a complete circumferential image of the measuring object 1 can be produced only by connecting the images of the measuring surfaces of the measuring object 1.

9. Ninth Embodiment

Figure 39:
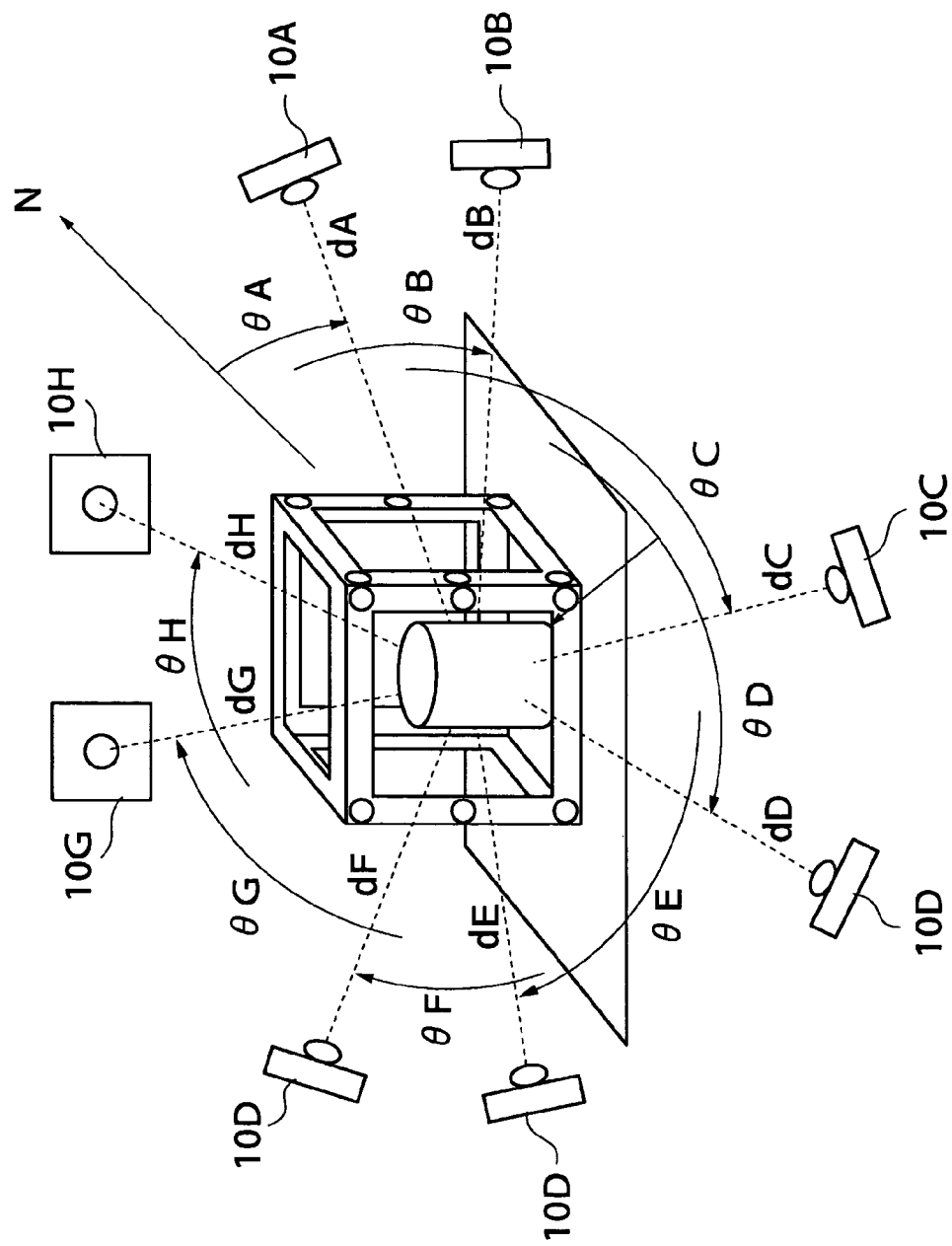
FIG. 39 is a view illustrating the structure of an essential part of a ninth embodiment of this invention, showing the positional relation among a measuring object, a calibration subject and a stereo-photographing part.

FIG. 39 is a diagram illustrating the structure of an essential part of a ninth embodiment of this invention, showing the positional relation among the measuring object, calibration subject and stereo-photographing part. In the eighth embodiment, the stereo-photographing part 3 has stereo-photographing units for each stereo-photographing direction, and each of the photographing units comprises a pair of imaging devices 3R and 3L. In the ninth embodiment, the stereo-photographing part 3 comprises independently arranged imaging devices 10A, 10B, . . . and 10H. Since a frame body with a rectangular cross-section is used as the calibration subject 120, eight imaging devices are arranged as the stereo-photographing part 3 so that four stereo-photographing directions can be obtained.

Each of the imaging devices 10A, 10B, . . . and 10H are arranged at angles of θA, θB, . . . and θH, respectively, in the clockwise direction with respect to a reference azimuth (such as the direction N of the polar star) and at distances dA, dB, . . . and dH, respectively, from the measuring object 1. Each of the imaging devices 10A, 10B, . . . and 10H photographs the measuring object 1 and the calibration subject 120 simultaneously and overlapping areas photographed by adjacent imaging devices are dealt with as image data photographed in stereo in the photographing parameter calculating part 50 and the surface shape state measuring part 60.

With a stereo-photographing part constituted as described above, the surface shape of the measuring object 1 can be obtained through a process similar to that in the eighth embodiment using the function of processing signals of images photographed in stereo by the stereo-photographing part shown in FIG. 34.

10. Tenth Embodiment

Figure 40:
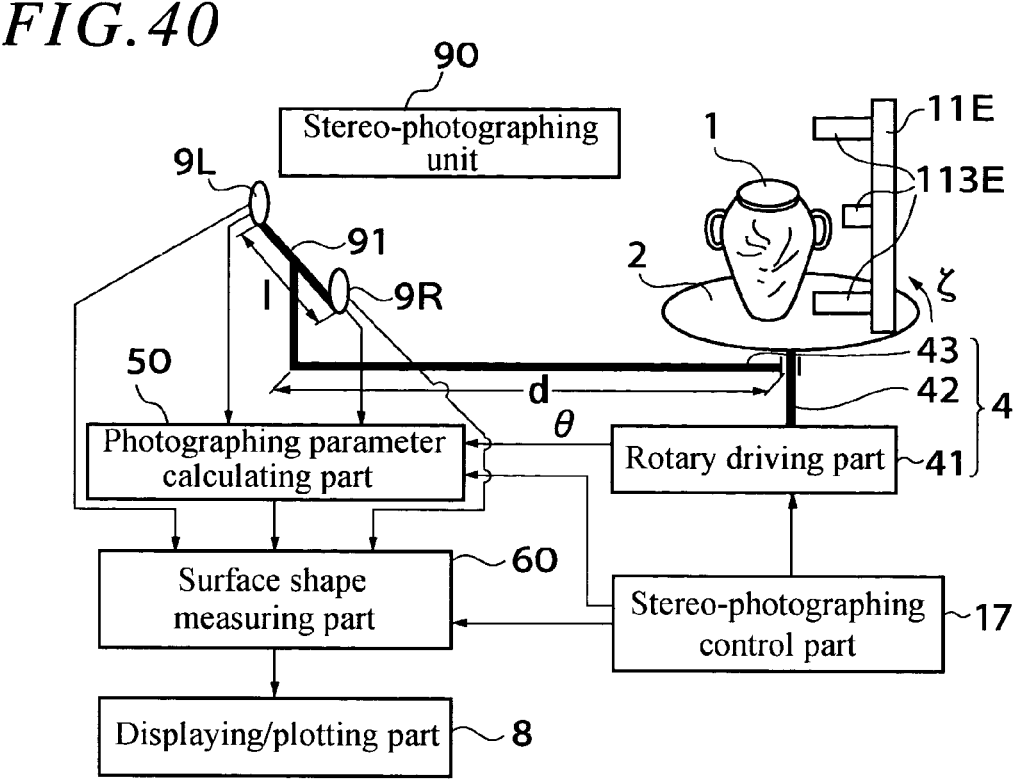
FIG. 40 is a block diagram illustrating the structure of a tenth embodiment of this invention.

FIG. 40 is a block diagram illustrating the structure of a tenth embodiment of this invention. The eighth embodiment has a stereo-photographing part 3 provided with a plurality of sets of stereo-photographing units each comprising imaging devices 3R and 3L which can simultaneously photograph the measuring object 1 and the calibration subject 11E from each stereo-photographing direction. The ninth embodiment has a stereo-photographing part 3 provided with imaging devices 10A, 10B . . . and 10H which can simultaneously photograph the measuring object 1 and the calibration subject 120 from each photographing direction. However, when the number of stereo-photographing directions is large, it is difficult to provide a required number of imaging devices from an equipment point of view. An apparatus with a small number of imaging devices which can photograph the measuring object 1 and calibration subject 120 from every stereo-photographing direction is also highly demanded. The tenth embodiment is an apparatus having a pair of stereo-photographing unit which can photograph from every stereo-photographing direction.

As shown in FIG. 40, the measuring object 1 is placed on the table 2 together with the calibration subject 11E. The relative position changing part 4 has a function of rotating the table 2 in a direction ζ and comprises a rotary driving part 41 such as a motor, a table rotating shaft 42 for rotating the table 2 by the driving force of the rotary driving part 41, and a stereo-photographing part connecting rod 43. The stereo-photographing part connecting rod 43 keeps the distance d between the table 2 and the stereo-photographing unit 90 constant and supports the two imaging devices 9R and 9L in positions oriented toward the table 2. The rotary driving part 41 may be a handle or grip which can be rotated by an operator since it can only generate a driving force to position the table 2 with an accuracy of a few degrees.

The stereo-photographing unit 90 comprises two imaging devices 9R and 9L such as CCDs, digital cameras or film-type cameras which are attached to a rod 91 as an imaging device fixing body at a distance l apart from each other. The optical axes of the imaging devices 9R and 9L are generally parallel to each other and oriented toward the measuring object 1. The direction θ from which the stereo-photographing unit 90 photographs the measuring object 1 is sent to the photographing parameter calculating part 50 and the surface shape measuring part 60 as a measurement signal from a rotational angle sensor attached to the table rotating shaft 42 or is tied to data of images photographed in stereo as photographing angle information.

The calibration subject 11E may be the calibration subject 120 shown in FIG. 36 or a three-dimensional calibration subject 11E having three-dimensional reference point marks 113E displaced concavely or convexly with respect to the reference sides. The three-dimensional calibration subject 11E has a front face as a single reference face on which at least six three-dimensional reference point marks 113E are provided. A stereo-photographing control part 17, which rotates the table 2 on which the measuring object 1 is placed with the rotary driving part 41 so that the stereo-photographing unit 90 as the stereo-photographing part 3 can photograph the measuring object 1 from a plurality of directions, comprises a sequence program loaded in a PLC (programmable logic controller).

Figure 41:
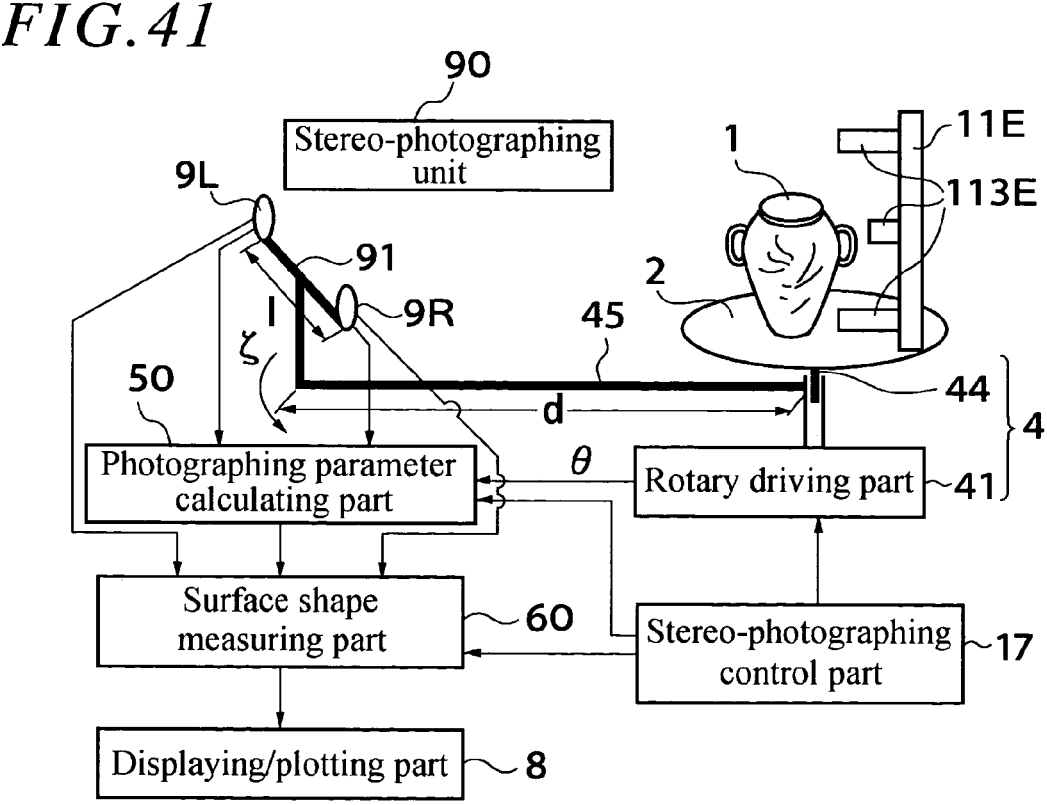
FIG. 41 is a block diagram illustrating the structure of a modification of the relative position changing part in the tenth embodiment.

FIG. 41 is a block diagram illustrating the structure of a modification of the relative position changing part in the tenth embodiment. The relative position changing part 4 comprises a rotary driving part 41, a supporting shaft 44 of the table 2, and a stereo-photographing part rotating shaft 45. The stereo-photographing part rotating shaft 45 keeps the distance d between the table 2 and the stereo-photographing unit 90 constant and supports the two imaging devices 9R and 9L attached to an imaging device fitting body 91 in positions oriented toward the table 2. The stereo-photographing control part 17 rotates the stereo-photographing part rotating shaft 45 about the supporting shaft 44 of the table 2 with the rotary driving part 41 to move the stereo-photographing unit 90 so that the stereo-photographing unit 90 can photograph the measuring object 1 from a plurality of directions.

Description will be made of the measuring process in the apparatus shown in FIG. 40 and FIG. 41 constituted as described above. The flow of the measuring process is the same as the flowchart for generally explaining the entire process for measuring the measuring object shown in FIG. 37. Especially, in step S202, when the stereo-photographing unit 90 photographs each measuring surface of the measuring object 1 in stereo, the table 2 or the stereo-photographing unit 90 is rotated so that the stereo-photographing unit 90 can be oriented to every measuring surface of the measuring object 1. The rotational angles θ of the table 2 or stereo-photographing unit 90 are determined depending upon the number of surfaces to be measured of the measuring object 1 and manually or automatically set. The other processes are the same as those in the eighth embodiment.

Figure 38:
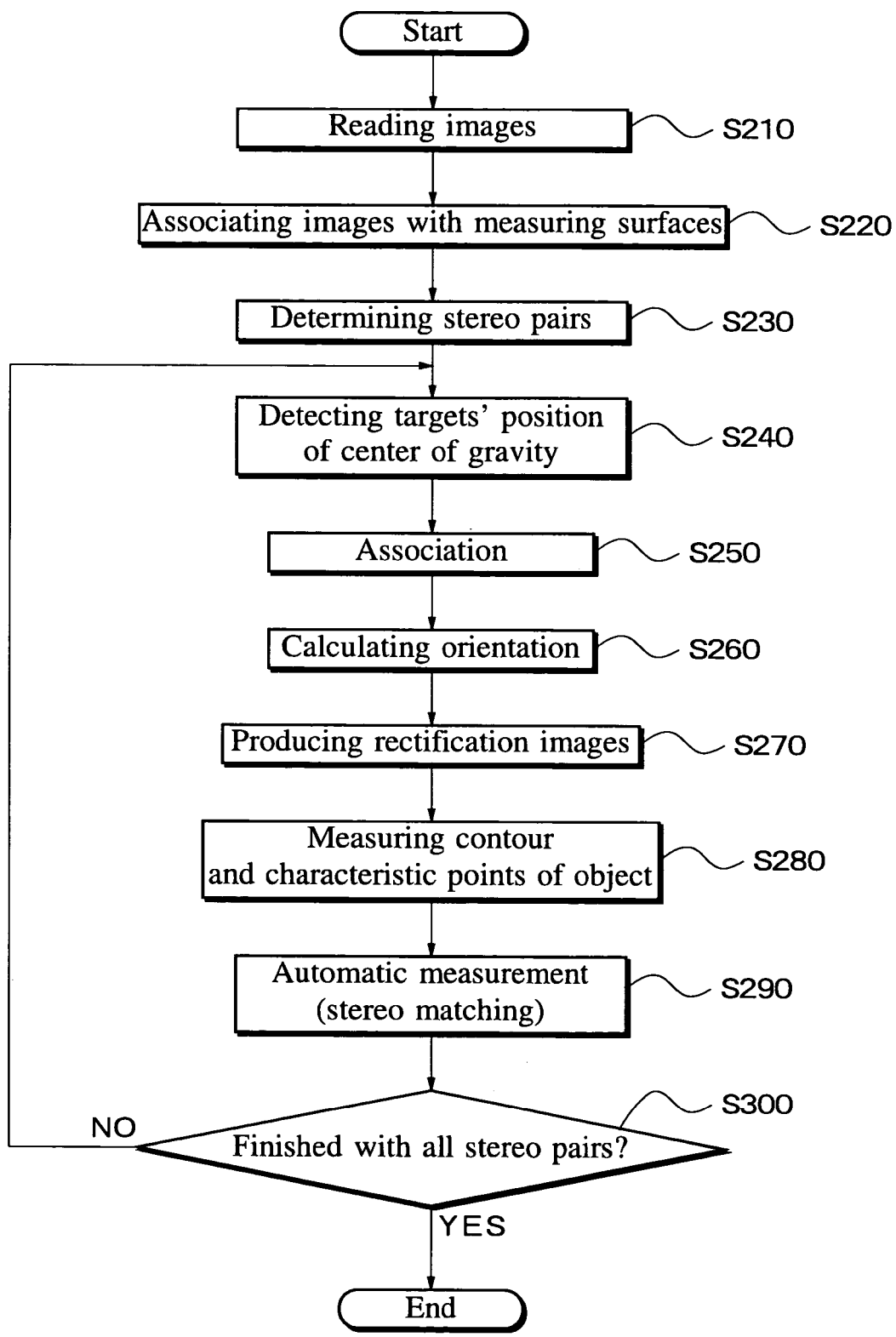
FIG. 38 is a flowchart for explaining a three-dimensional measuring process.

The three-dimensional measuring process is exactly the same as the three-dimensional measuring process shown by the flowchart in FIG. 38. The processes in steps S220 and S230 may be the same as those shown in FIG. 38. However, when an angle detection mechanism is provided in the rotary driving part 41, the process of associating the images with the measuring surfaces in step S220 can be executed based on the rotational angle θ without image processing. Also, when the order of photographing each measuring surface of the measuring object 1 is fixed to be from left to right, for example, the process of determining stereo pair images in step S230 can be executed even when no side reference target 122 is provided on the calibration subject 120. When side reference targets 122 are provided on the calibration subject 120, the reference sides 121 can be reliably distinguished.

11. Eleventh Embodiment

Figure 42:
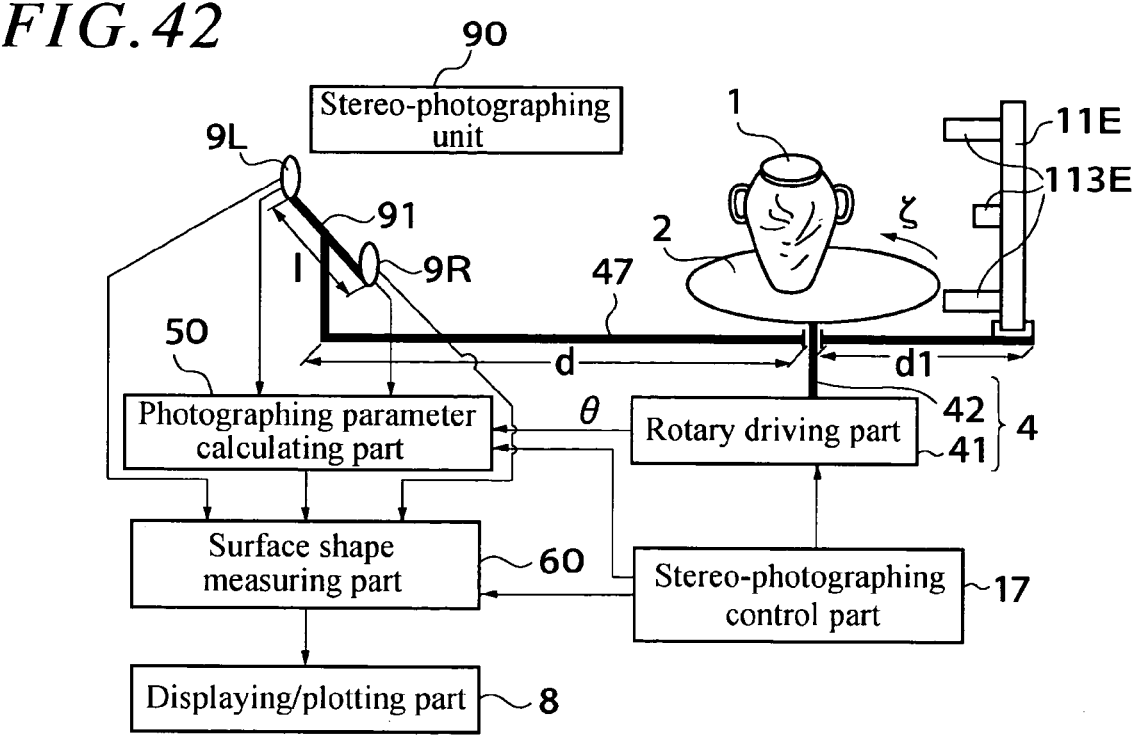
FIG. 42 is a block diagram illustrating the structure of an eleventh embodiment of this invention.

FIG. 42 is a block diagram illustrating the structure of an eleventh embodiment of this invention. In the tenth embodiment, the measuring object 1 is placed on the table 2 together with the calibration subject 11E. However, when the measuring object 1 is photographed from various directions, the measuring object 1 may be hidden behind the calibration subject 11E or the calibration subject 11E must be moved every time the photographing direction is changed.

In the eleventh embodiment, the relative position changing part 4 comprises a rotary driving part 41, a table rotating shaft 42 and a stereo-photographing part-calibrator connecting rod 47. The stereo-photographing part-calibrator connecting rod 47 keeps constant the distance d between the table 2 and the stereo-photographing unit 90 and the distance d1 between the table 2 and the three-dimensional calibration subject 11E, and supports the two imaging devices 9R and 9L attached to the imaging device fixing body 91 in attitudes oriented toward the table 2. The stereo-photographing control part 17 rotates the table 2 on which the measuring object 1 is placed with the rotary driving part 41 so that the stereo-photographing unit 90 as the stereo-photographing part 3 can photograph the measuring object 1 from a plurality of directions.

In an apparatus constituted as described above, even when the relative position changing part 4 rotates the table 2 on which the measuring object 1 is placed in the direction ζ, the front face of the three-dimensional calibration subject 11E is always included as the background of the measuring object 1 in an image photographed by the stereo-photographing unit 90. In this case, the front face of the three-dimensional calibration subject 11E is always included in an image photographed by the stereo-photographing unit 90 from whichever direction the measuring object 1 is photographed. Thus, although the three-dimensional reference point marks 113E are provided on a single reference face of the three-dimensional calibration subject 11E, when the relative position changing part 4 rotates the table 2 on which the measuring object 1 is placed in the direction ζ, the three-dimensional reference point marks 113E could be considered to be virtually arranged to surround the measuring object 1.

Namely, when the stereo-photographing control part 17 rotates the table 2 by 0°, 90°, 180°, and 270°, for example, so that the measuring object 1 can be photographed from four directions, the three-dimensional calibration subject 11E included in the images photographed by the stereo-photographing unit 90 is substantially equivalent to the calibration subject 120 having a frame body with a rectangular cross-section as shown in FIG. 36(A). When the stereo-photographing control part 17 rotates the table 2 by 0°, 60°, 120°, 180°, 240° and 300°, for example, so that the measuring object 1 can be photographed from six directions, the three-dimensional calibration subject 11E included in the images photographed by the stereo-photographing unit 90 is substantially equivalent to the calibration subject 120 having a frame body with a rectangular cross-section as shown in FIG. 36(B).

12. Twelfth Embodiment

Figure 43:
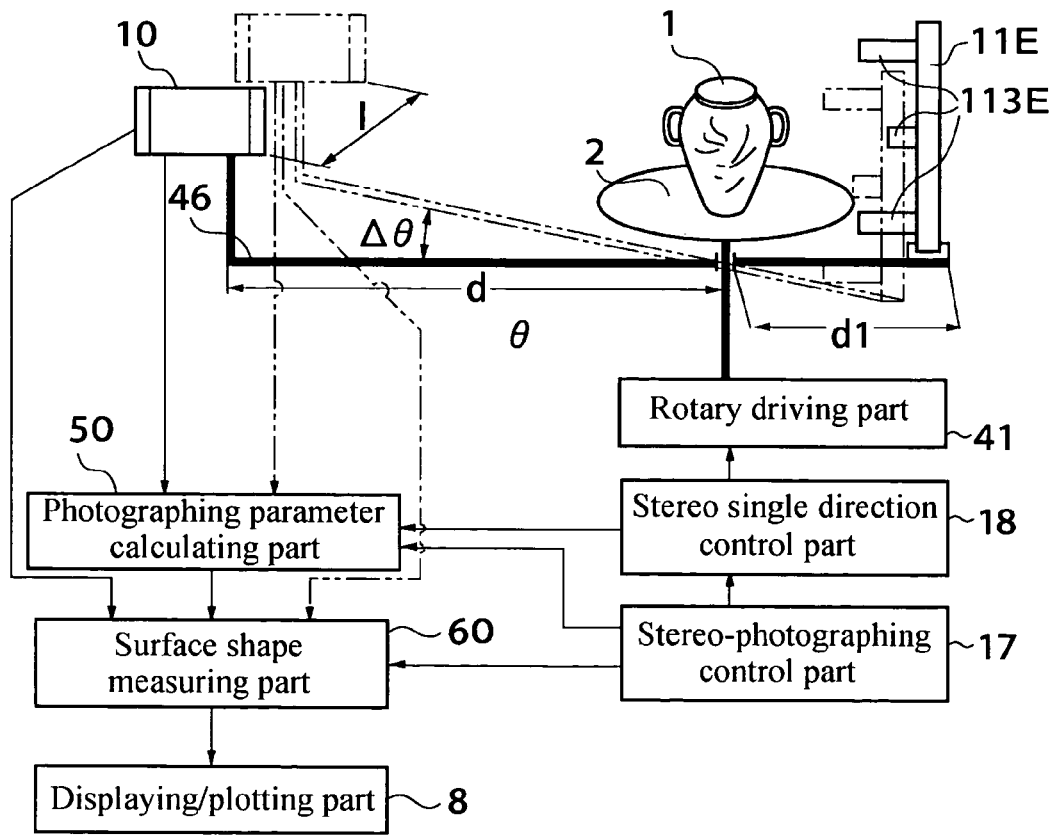
FIG. 43 is a block diagram illustrating the structure of a twelfth embodiment of this invention.

FIG. 43 is a block diagram illustrating the structure of a twelfth embodiment of this invention. In the twelfth embodiment, the function of the stereo-photographic unit 90 in the eleventh embodiment is accomplished by a single-lens imaging device 10 and a stereo single direction control part 18. The stereo single direction control part 18 controls the rotary driving part 41 of the relative position changing part 4 to rotate the table 2 in order to change the positional relation between the measuring object 1 and the imaging device 10 so that the imaging device 10 can perform stereo-photographing from first and second photographing directions. The stereo-photographing control part 17 controls the stereo single direction control part 18 to control the photographing direction of the imaging device 10 so that the imaging device 10 can photograph the measuring object in stereo from a plurality of directions.

Figure 44:
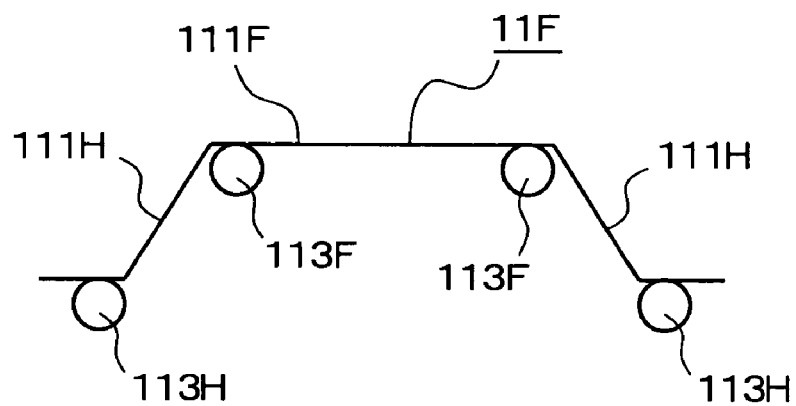
FIG. 44 is a plan view illustrating another example of the calibration subject for use in the tenth to twelfth embodiments.

FIG. 44 is a plan view illustrating another example of the calibration subject for use in the tenth to twelfth embodiments. The calibration subject 11E for use in the tenth to twelfth embodiments may be a folding screen type calibration subject 11F since it is measured from only one direction. The folding screen type calibration subject 11F has a center reference side 111F and inclined sides 111H provided on right and left sides of the reference side 111F. Six reference point marks 113F are arranged on the reference side 111F. Three reference point marks 113H are arranged on each of the right and left inclined sides 111H. With reference to the reference point marks 113F, the reference point marks 113H are projected in a three-dimensional manner.

Figure 45:
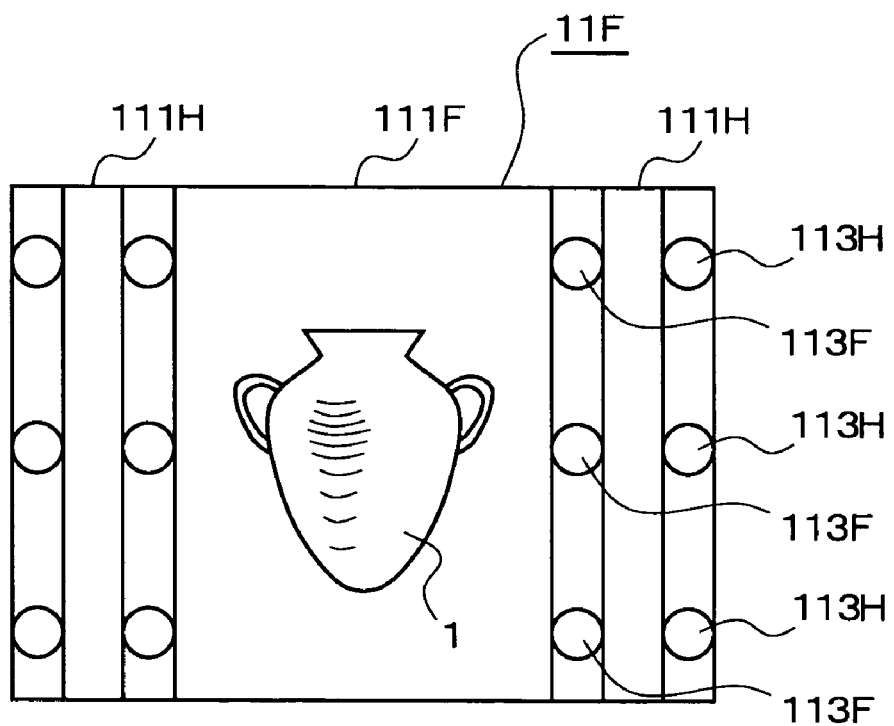
FIG. 45 is a view for explaining an image of a measuring object photographed with a folding screen type calibration subject.

FIG. 45 is a diagram for explaining the image of a measuring object photographed with a folding screen type calibration subject. In the data of an image photographed by the stereo-photographing unit 90, the measuring object 1 is included together with the folding screen type calibration subject 11F. Since the folding screen type calibration subject 11F has reference point marks 113F and reference point marks 113H which are arranged on different levels, the side shape, as well as the front shape, of the measuring object 1 can be measured.

FIG. 46 is a perspective view illustrating a frame body equivalent to the folding screen type calibration subject for use in the eleventh or twelfth embodiment. In the eleventh or twelfth embodiment, the folding screen type calibration subject 11F is placed on the table 2 in place of the three-dimensional calibration subject 11E. Then, when the table 2 is rotated by 0°, 90°, 180° and 270°, for example, and the measuring object 1 is photographed from four directions, the folding screen type calibration subject 11F in images photographed by the stereo-photographing unit 90 or the imaging device 10 is substantially equivalent to a calibration subject 11G having a frame body with a star-shape cross section as shown in FIG. 46.

In the ninth to twelfth embodiments, stereo-photographing is performed from a plurality of directions. However, stereo-photographing may be performed from one direction. For example, the apparatus can be used in an application in which the amount of granules carried on a sediment carrying vehicle is measured as the measuring object 1. Sediment carrying vehicles are often overloaded, and when overloaded sediment carrying vehicles are allowed to run on an elevated road, the service life of the elevated road is severely affected. Thus, the apparatus can be used to measure the volumes of sediment being carried on sediment carrying vehicles.

13. Thirteenth Embodiment

FIG. 47 is a diagram illustrating the structure of a thirteenth embodiment of this invention. A plurality of pairs of stereo-photographing units 90 are positioned above a sediment carrying vehicle as a measuring object 1. The stereo-photographing units 90 are arranged in the depth direction in the drawing so that stereo-photographing can be performed from a plurality of directions. The pairs of stereo-photographing units 90 may be arranged in another direction than the depth direction in the drawing to perform stereo-photographing. At least six three-dimensional reference point marks 113E are arranged on the ground surface. A group of three-dimensional reference point marks 113E constitute a calibration subject. Here, the three-dimensional reference point marks 113E are divided to the right and left, and three three-dimensional reference point marks 113E are arranged on the right and left, respectively, so that the sediment carrying vehicle can run easily.

In an apparatus constituted as described above, the stereo-photographing units 90 photograph the sediment carrying vehicle in stereo while it runs between the right and left three-dimensional reference point marks 113E. Then, by processing the images photographed in stereo in the photographing parameter calculating part 50 and the surface shape measuring part 60, the surface shape of the sediment carried on the sediment carrying vehicle can be measured. When the thus obtained surface shape of the sediment is integrated by a suitable method, the amount of sediment on the sediment carrying vehicle can be obtained.

In the eighth to twelfth embodiments, description has been made of a case where images covering the entire circumference of the measuring object 1 are needed as in the case of a buried cultural property. However, this invention is not limited to the above case. For example, in the case of a human body or a machine structure, the front face, right and left sides of the measuring object must be precisely measured, but precise information on the back face may not be necessary. In such a case, the photographing angles θ are set so that stereo images covering the necessary area can be obtained.

In the tenth, eleventh and thirteenth embodiments, the stereo-photographing units 90 photograph the measuring object 1 and the calibration subject 11E from right and left photographing directions simultaneously. However, as in the twelfth embodiment, the single-lens imaging device 10 may be used in place of the stereo-photographing unit 90 to photograph the measuring object 1 and the calibration subject 11E in stereo from right and left photographing directions in sequence.

INDUSTRAIAL APPLICABILITY

1) Effects Accomplished by First to Fourth Embodiments

As has been described previously, the surface shape measuring apparatus of this invention comprises a stereo-photographing unit for photographing an object in stereo; a relative position changing part for changing the positional relation between the stereo-photographing unit and the object; a stereo-image generating part for storing stereo-photographing parameters in a plurality of directions from which the stereo-photographing unit photographs the object in advance, and controlling the stereo-photographing unit to photograph the object from the plurality of directions and generating stereo images of the object; and a surface shape processing part for measuring the surface shape of the object based on the stereo images of the object. Thus, a precise measurement can be obtained even if the stereo-photographing unit and the object are not positioned precisely. In general, when an object placed on a rotating stage is measured, the object must be precisely positioned at the center of rotation or the center of rotation must be precisely obtained. However, such operations are unnecessary. The surface shape of an object can be simply and precisely measured using stereo-photographing parameters.

When the surface shape measuring apparatus is configured to obtain stereo-photographing parameters by the steps of placing a calibration subject on which reference points are three-dimensionally arranged in a position where the object is to be placed, setting the relative position changing part so that the stereo-photographing unit is pointed in a direction to photograph the calibration subject, photographing the calibration subject with the stereo-photographing unit, and calculating the stereo-photographing parameters based on the photographed stereo images of the calibration subject, stereo images of the measuring object located in the coordinate system of the calibration subject can be obtained. Thus, images of the circumference or primary peripheral surfaces of the object can be obtained by connecting the images photographed from each photographing direction.

Further, when the surface shape measuring apparatus is configured to produce an orthogonal projection image of the object, the surface shape of the object can be reproduced using the orthogonal projection image. When the orthogonal image is stored in a database as image information, it is very useful.

2) Effects Accomplished by Fifth to Seventh Embodiments

The surface shape measuring apparatus of this invention comprises a stereo photographing part having a plurality of stereo-photographing units for photographing a measuring object in stereo; a parameter storing part for storing stereo-photographing parameters in each of the plurality of directions from which the stereo-photographing units photograph the measuring object; a stereo image generating part for controlling the stereo-photographing part to photograph the measuring object from the plurality of directions with stored stereo-photographing parameters, and generating stereo images of the measuring object; and a surface shape measuring part for measuring the surface shape of the measuring object based on the stereo images of the measuring object. Thus, a precise measurement can be obtained even if the stereo-photographing part and the measuring object are not positioned precisely. Also, since the stereo-photographing part has at least two stereo-photographing units, the number the measuring object has to be rotated or number the stereo-photographing unit has to be rotated can be reduced or eliminated when a large part of the circumference of the measuring object must be photographed. Thus, the photographing can be performed quickly.

Further, when the surface shape measuring apparatus is configured to produce an orthogonal projection image of the object, the surface shape of the object can be reproduced using the orthogonal projection image. When the orthogonal image is stored in a database as image information, it is very useful.

3) Effects Accomplished by Eighth to Thirteenth Embodiments

The surface shape measuring apparatus of this invention comprises a stereo-photographing part for photographing in stereo a measuring object together with a calibration subject placed in the vicinity of the measuring object and having reference points whose three-dimensional relative positional relation have been determined in advance from a plurality of directions; a photographing parameter calculating part for extracting images of the reference points from image data photographed in stereo by the stereo-photographing part and obtaining stereo-photographing parameters in each stereo-photographing directions based on the positions of the reference points; and a surface shape measuring part for obtaining the surface shape of the measuring object based on the image position of the measuring object in the photographed image data from which the images of reference points have been extracted. Thus, the surface shape can be measured precisely even if the stereo-photographing part and the measuring object are not positioned precisely.

Further, when the surface shape measuring apparatus is configured to produce an orthogonal projection image of the measuring object, the surface shape of the measuring object can be reproduced using the orthogonal projection image. When the orthogonal image is stored in a database as image information, it is very useful.

The invention claimed is:

1. A surface shape measuring apparatus, comprising:
   a stereo-photographing unit for photographing a measuring object together with a calibration subject placed in the vicinity of the background of said measuring object in stereo and having reference points whose three-dimensional relative positional relation have been determined in advance from a specified direction;
   a relative position changing part for changing a positional relation between said measuring object and said stereo-photographing unit;
   a stereo-photographing control part for controlling said relative position changing part to move at least one of said measuring object and said stereo-photographing unit so that said stereo-photographing unit can photograph said measuring object from a plurality of directions;
   a photographing parameter calculating part for extracting images of said reference points from image data of said calibration subject photographed in stereo by said stereo-photographing unit and obtaining stereo-photographing parameters which include a baseline length, photographing position and tilt of said stereo-photographing unit, in each of the stereo-photographing directions based on the positions of said reference points, with coplanar conditional equations; and
   a surface shape calculating part for obtaining the surface shape of said measuring object based on said stereo-photographing parameters and an image position of said measuring object in said photographed image data from which said images of the reference points have been extracted.

2. The surface shape measuring apparatus as claimed in claim 1, wherein said relative position changing part has a stage for changing the position of said stereo-photographing unit or the position of said object.

3. The surface shape measuring apparatus as claimed in claim 1, wherein said stereo-photographing unit has at least two imaging devices attached to an imaging device fixing body in parallel to each other at a specific distance apart from each other.

4. The surface shape measuring apparatus as claimed in claim 1, further comprising:
   a parameter storing part for storing parameters calculated by comparing the position of reference points on said calibration subject stored in advance with positions of reference points calculated based on said stereo images of said reference points on said calibration subject photographed by said stereo-photographing unit.

5. The surface shape measuring apparatus as claimed in claim 1, further comprising an orthogonal projection image generating part for generating an orthogonal projection image of said object from stereo images of said object photographed by said stereo-photographing unit.

6. The surface shape measuring apparatus as claimed in claim 1, wherein a positional relation between said calibration subject and said stereo-photographing unit is fixed while said stereo-photographing unit is stereo-photographing from said plurality of directions.

7. A surface state plotting apparatus for plotting a surface state of the measuring object based on stereo images of said measuring object measured by the surface shape measuring apparatus according to claim 1.

8. A surface shape measuring apparatus, comprising:
- a single-lens imaging device for photographing a measuring object together with a calibration subject placed in the vicinity of the background of said measuring object and having reference points whose three-dimensional relative positional relation have been determined in advance from a specified direction;
- a relative position changing part for changing the positional relation between said measuring object and said imaging device;
- a stereo single direction control part for controlling said relative position changing part to change the positional relation between said measuring object and said single-lens imaging device so that said single-lens imaging device can photograph in stereo from first and second photographing directions;
- a stereo-photographing control part for controlling said relative position changing part to move at least one of said measuring object and said single-lens imaging device, and for controlling said stereo single direction control part so that said single-lens imaging device can photograph said measuring object from a plurality of directions;
- a photographing parameter calculating part for extracting images of said reference points from image data of said calibration subject photographed in stereo by said single-lens imaging device and obtaining stereo-photographing parameters which include a baseline length, photographing position and tilt of said single-lens imaging device, in each stereo-photographing directions based on the positions of said reference points, with coplanar conditional equations; and
- a surface shape calculating part for obtaining the surface shape of said measuring object based on said stereo-photographing parameters and an image position of said measuring object in said photographed image data from which said images of the reference points have been extracted.

9. The surface shape measuring apparatus as claimed in claim 8, further comprising:
- a parameter storing part for storing parameters obtained by the steps of placing a calibration subject on which reference points are three-dimensionally arranged in a position where said measuring object is to be placed, photographing said calibration subject with said single-lens device, and calculating said stereo-photographing parameters in each of said photographing directions of said single-lens devices units based on said photographed stereo images of said calibration subject.

10. The surface shape measuring apparatus as claimed in claim 8, further comprising:
- a stereo photographing part having a plurality of the single-lens imaging devices;
- a parameter storing part for storing values calculated by comparing the position of reference points on said calibration subject stored in advance with positions of reference points calculated based on said stereo images of said reference points on said calibration subject photographed by said stereo-photographing part as said stereo-photographing parameters.

11. The surface shape measuring apparatus as claimed in claim 8, further comprising an orthogonal projection image producing part for producing an orthogonal projection image of said measuring object from stereo images of said measuring object.

12. A surface state plotting apparatus for plotting a surface state of the measuring object based on stereo images of said measuring object measured by the surface shape measuring apparatus according to claim 8.

* * * * *